(12) United States Patent
Blake et al.

(10) Patent No.: US 11,898,368 B2
(45) Date of Patent: Feb. 13, 2024

(54) UNMANNED AERIAL VEHICLE HOUSING INCLUDING DEPLOYABLE LANDING PADS

(71) Applicant: WING Aviation LLC, Mountain View, CA (US)

(72) Inventors: Jesse Blake, Sunnyvale, CA (US); James Schmalzried, San Jose, CA (US); Evan Twyford, Mountain View, CA (US)

(73) Assignee: WING Aviation LLC, Mountain View, CA (US)

( * ) Notice: Subject to any disclaimer, the term of this patent is extended or adjusted under 35 U.S.C. 154(b) by 1115 days.

(21) Appl. No.: 16/434,570

(22) Filed: Jun. 7, 2019

(65) Prior Publication Data
US 2019/0383052 A1    Dec. 19, 2019

Related U.S. Application Data

(60) Provisional application No. 62/685,166, filed on Jun. 14, 2018.

(51) Int. Cl.
*B60L 53/30* (2019.01)
*B64U 70/90* (2023.01)
(Continued)

(52) U.S. Cl.
CPC ............... *E04H 6/44* (2013.01); *B60L 53/30* (2019.02); *B64U 70/90* (2023.01); *B64U 80/10* (2023.01);
(Continued)

(58) Field of Classification Search
CPC .......... B64C 2201/201; B64C 2201/20; B64U 70/90; B64U 80/10; B64U 80/25; B64U 80/40; B64U 80/00
See application file for complete search history.

(56) References Cited

U.S. PATENT DOCUMENTS 8,511,606 B1    8/2013 Lutke et al.
9,305,280 B1    4/2016 Berg et al.
(Continued)

FOREIGN PATENT DOCUMENTS

KR    20140115024 A    9/2014
RU          97112 A    8/2010
(Continued)

OTHER PUBLICATIONS

Australian Examination Report, dated Aug. 5, 2021, in corresponding Australian Patent Application No. 2019284919, 5 pages.
(Continued)

*Primary Examiner* — Brady W Frazier
*Assistant Examiner* — Shanna Danielle Glover
(74) *Attorney, Agent, or Firm* — CHRISTENSEN O'CONNOR JOHNSON KINDNESS PLLC

(57) ABSTRACT

A modular housing structure for housing a plurality of unmanned aerial vehicles (UAVs) includes a plurality of housing segments and a plurality of landing pads. The plurality of housing segments are shaped to mechanically join together to define an interior of the modular housing structure. The individual housing segments have a common structural shape that repeats when assembled to form the modular housing structure. The plurality of landing pads are positioned within the individual housing segments, each of the landing pads sized to physically support and charge a corresponding one of the UAVs.

7 Claims, 50 Drawing Sheets

(51) Int. Cl.
    *B64U 80/10*     (2023.01)
    *B64U 80/25*     (2023.01)
    *B64U 80/40*     (2023.01)
    *B64U 80/70*     (2023.01)
    *E04H 6/44*     (2006.01)
    *G08G 5/00*     (2006.01)
    *E04H 6/12*     (2006.01)

(52) U.S. Cl.
    CPC ............. *B64U 80/25* (2023.01); *B64U 80/40* (2023.01); *E04H 6/12* (2013.01); *G08G 5/0069* (2013.01); *B64U 80/70* (2023.01)

(56) References Cited

U.S. PATENT DOCUMENTS

| | | | |
|---|---|---|---|
| 9,346,560 | B2 | 5/2016 | Wang |
| 9,527,605 | B1 | 12/2016 | Gentry et al. |
| 9,777,502 | B2 | 10/2017 | Curlander et al. |
| 2014/0252168 | A1* | 9/2014 | Brody ................. E04H 6/44 244/114 R |
| 2015/0336669 | A1 | 11/2015 | Kantor et al. |
| 2016/0364989 | A1* | 12/2016 | Speasl ................. G08G 5/0069 |
| 2017/0144776 | A1 | 5/2017 | Fisher et al. |
| 2017/0175413 | A1* | 6/2017 | Curlander ............... E04H 14/00 |
| 2017/0225802 | A1 | 8/2017 | Lussier et al. |
| 2017/0240061 | A1 | 8/2017 | Waters |
| 2018/0141682 | A1 | 5/2018 | Blake et al. |
| 2018/0354649 | A1* | 12/2018 | Ortiz ................. B64C 39/024 |
| 2018/0362188 | A1* | 12/2018 | Achtelik ................ B64F 1/362 |
| 2019/0002127 | A1* | 1/2019 | Straus ................. B64F 1/007 |
| 2019/0367185 | A1* | 12/2019 | Zambelli ................ B64U 10/00 |
| 2021/0031947 | A1* | 2/2021 | Wankewycz ........... B64F 1/007 |

FOREIGN PATENT DOCUMENTS

| | | | |
|---|---|---|---|
| RU | 2593207 | A | 8/2016 |
| WO | 2016205415 | A1 | 12/2016 |
| WO | 2017029611 | A1 | 2/2017 |
| WO | 2017109780 | A1 | 6/2017 |
| WO | WO-2019071293 | A1 * | 4/2019 ............. B64C 39/00 |

OTHER PUBLICATIONS

Extended European Search Report, dated Jan. 27, 2022, in corresponding European Patent Application No. 19819385.6-1010, 7 pages.

Search Report and Written Opinion, dated Mar. 28, 2022, in corresponding Singapore Patent Application No. 11202012057U, 8 pages.

Australian Examination Report, dated Nov. 3, 2021, in corresponding Australian Patent Application No. 2019284919, 5 pages.

Search Report and Written Opinion dated Sep. 26, 2019 for corresponding International Patent Application No. PCT/US2019/036840, 8 pages.

Australian Examination Report, dated Jan. 24, 2023, in corresponding Australian Patent Application No. 2021245141, 5 pages.

European Examination Report, dated May 10, 2023, in corresponding European Patent Application No. 19819385.6-1004, 5 pages.

* cited by examiner

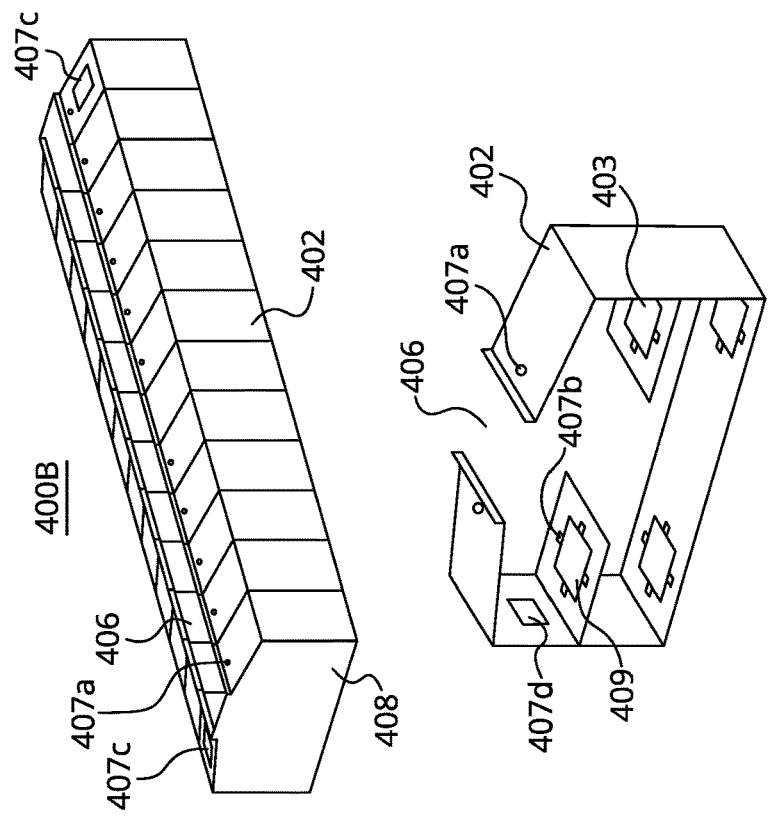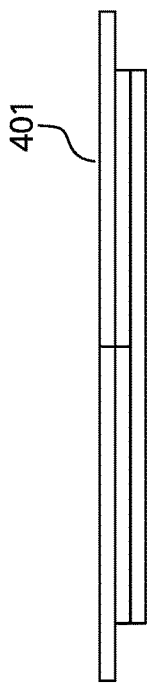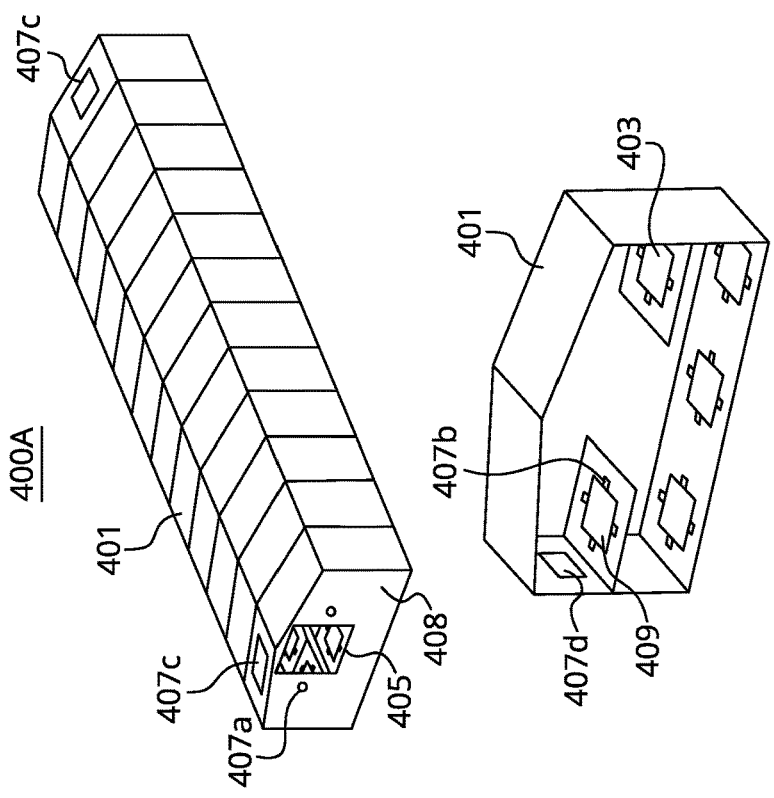

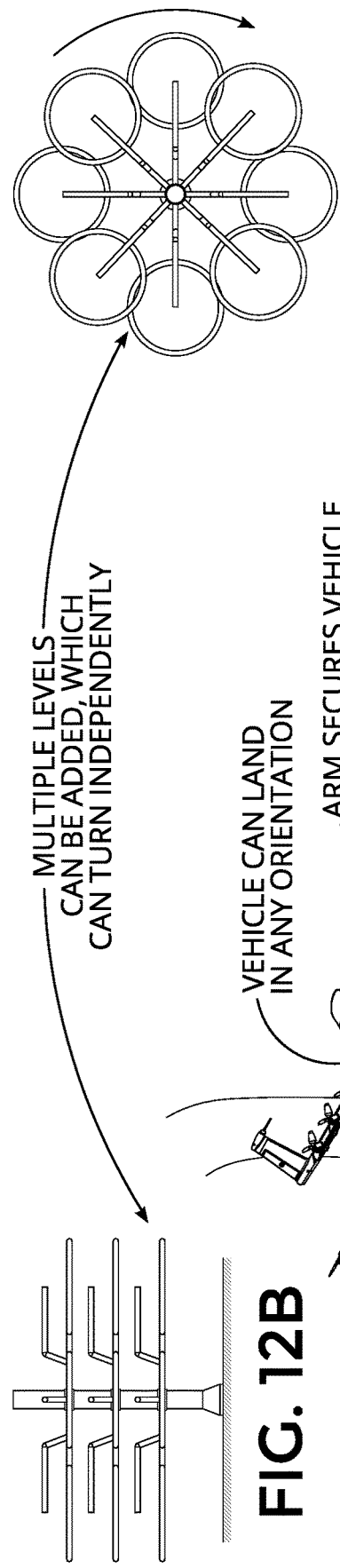
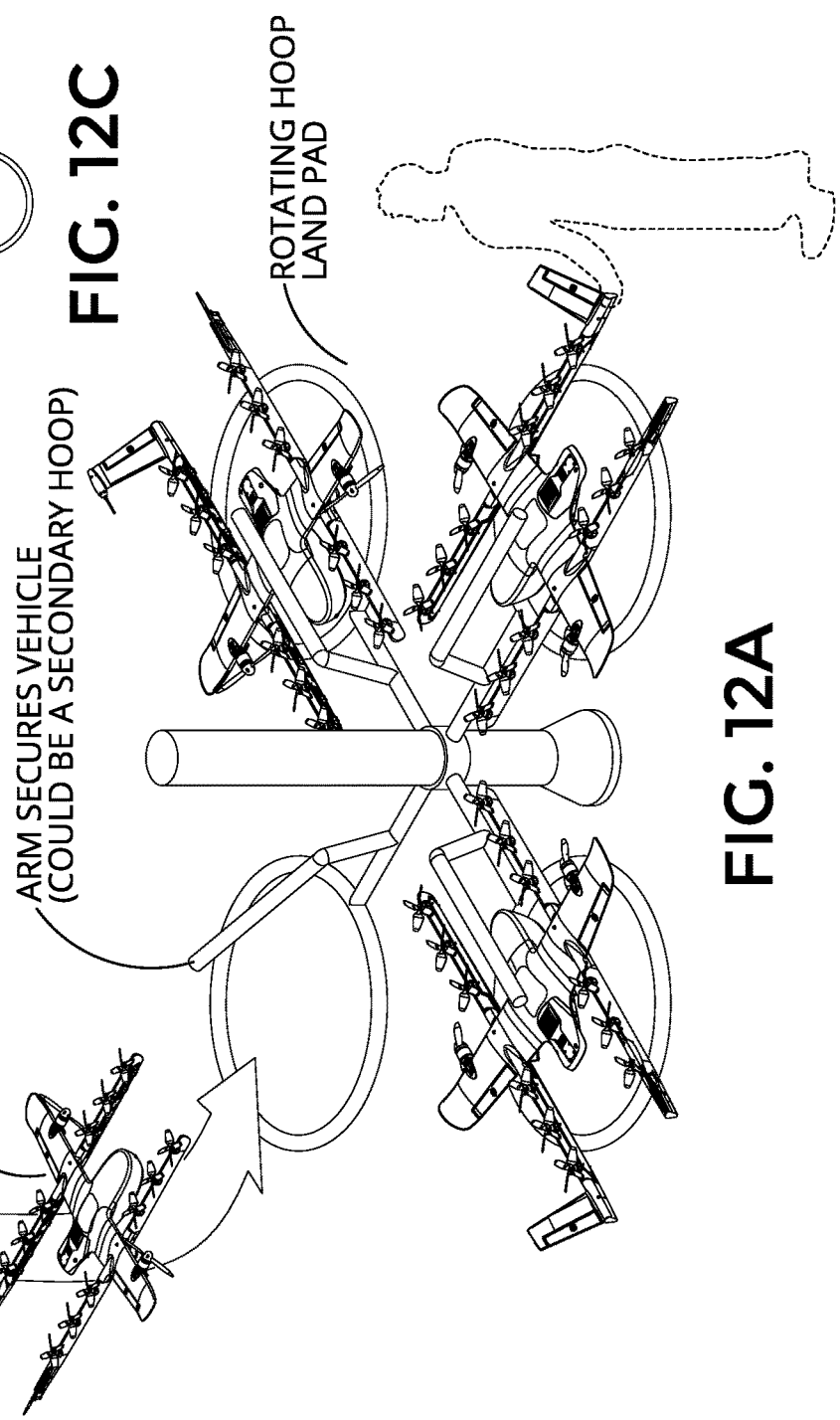

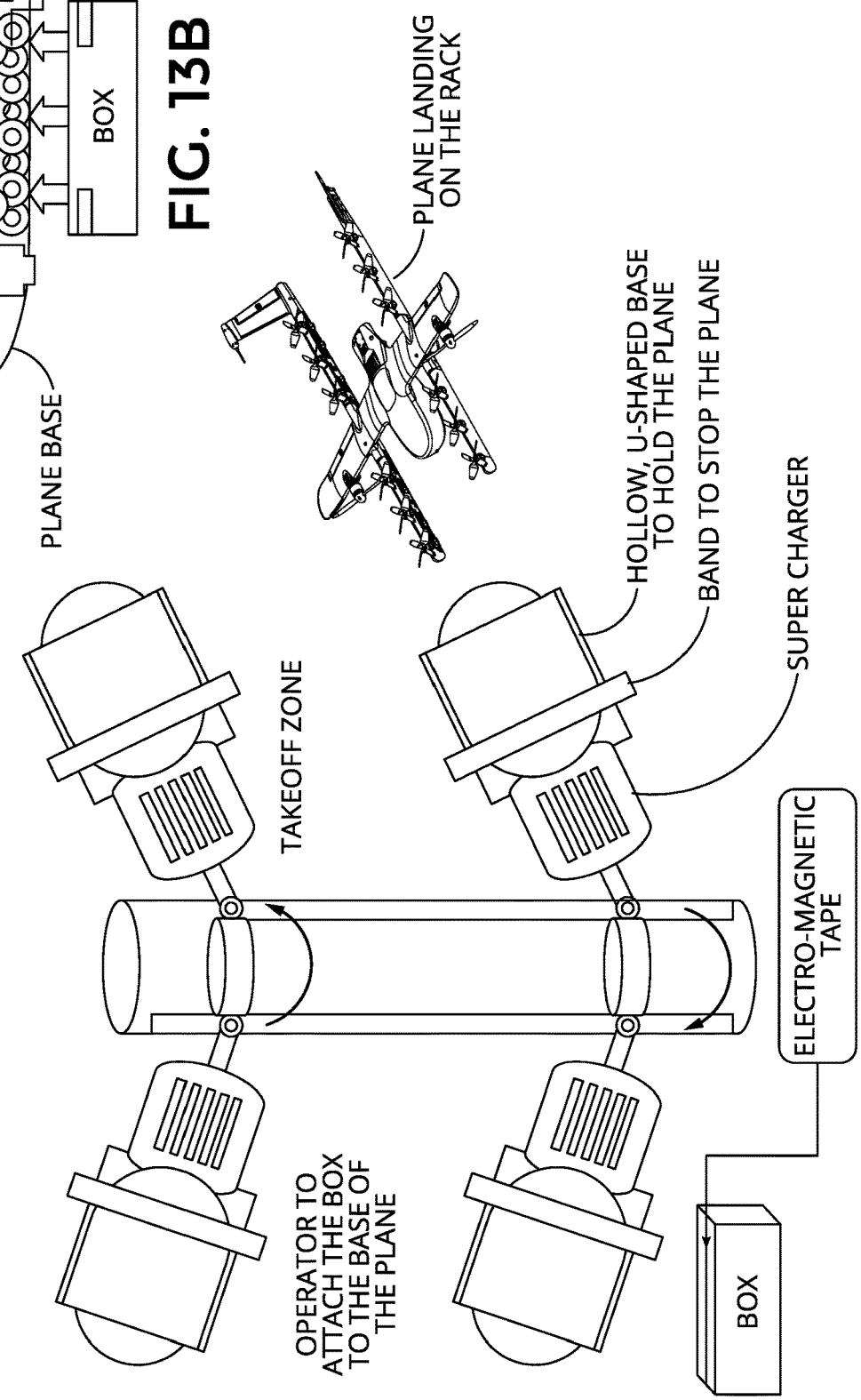

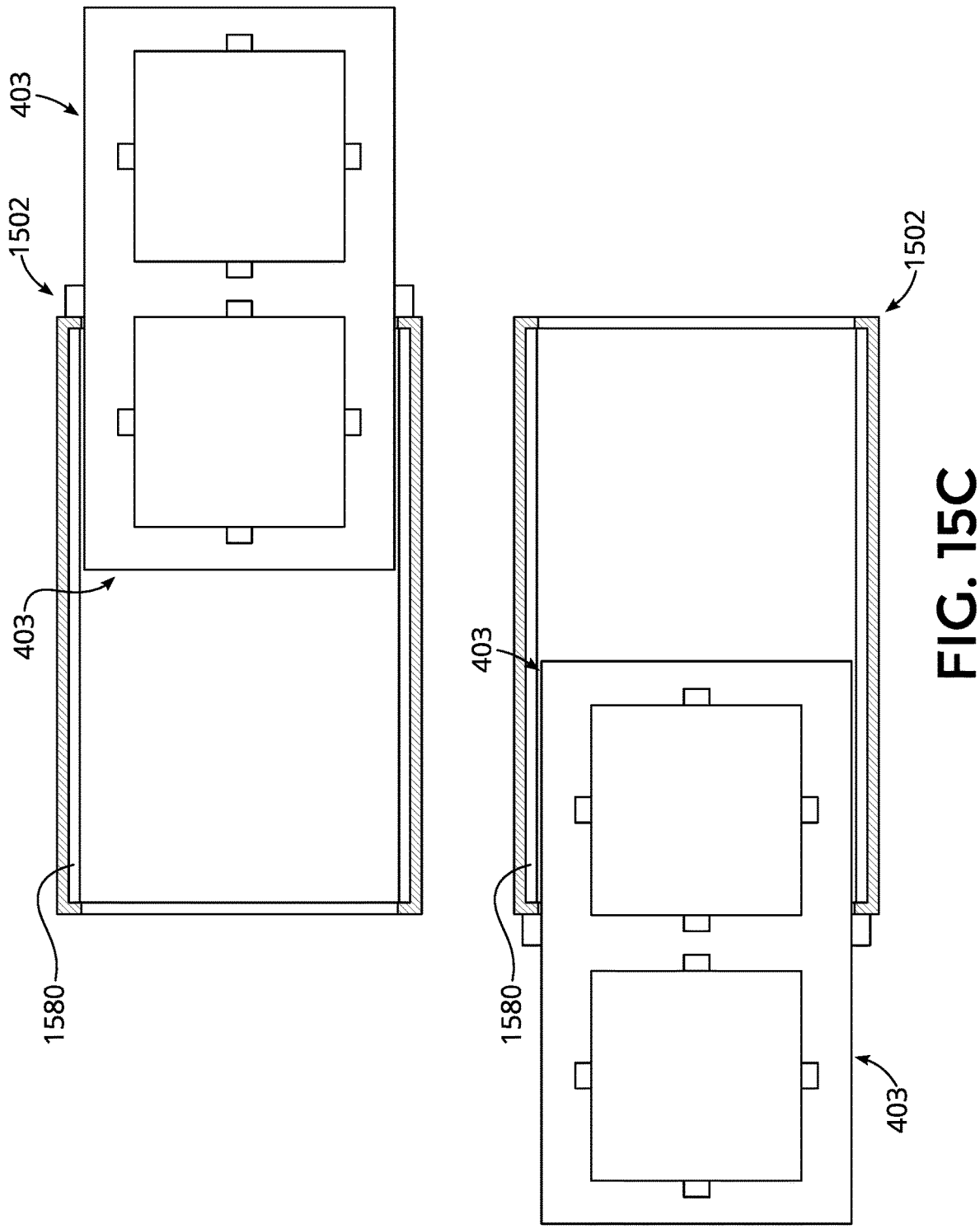

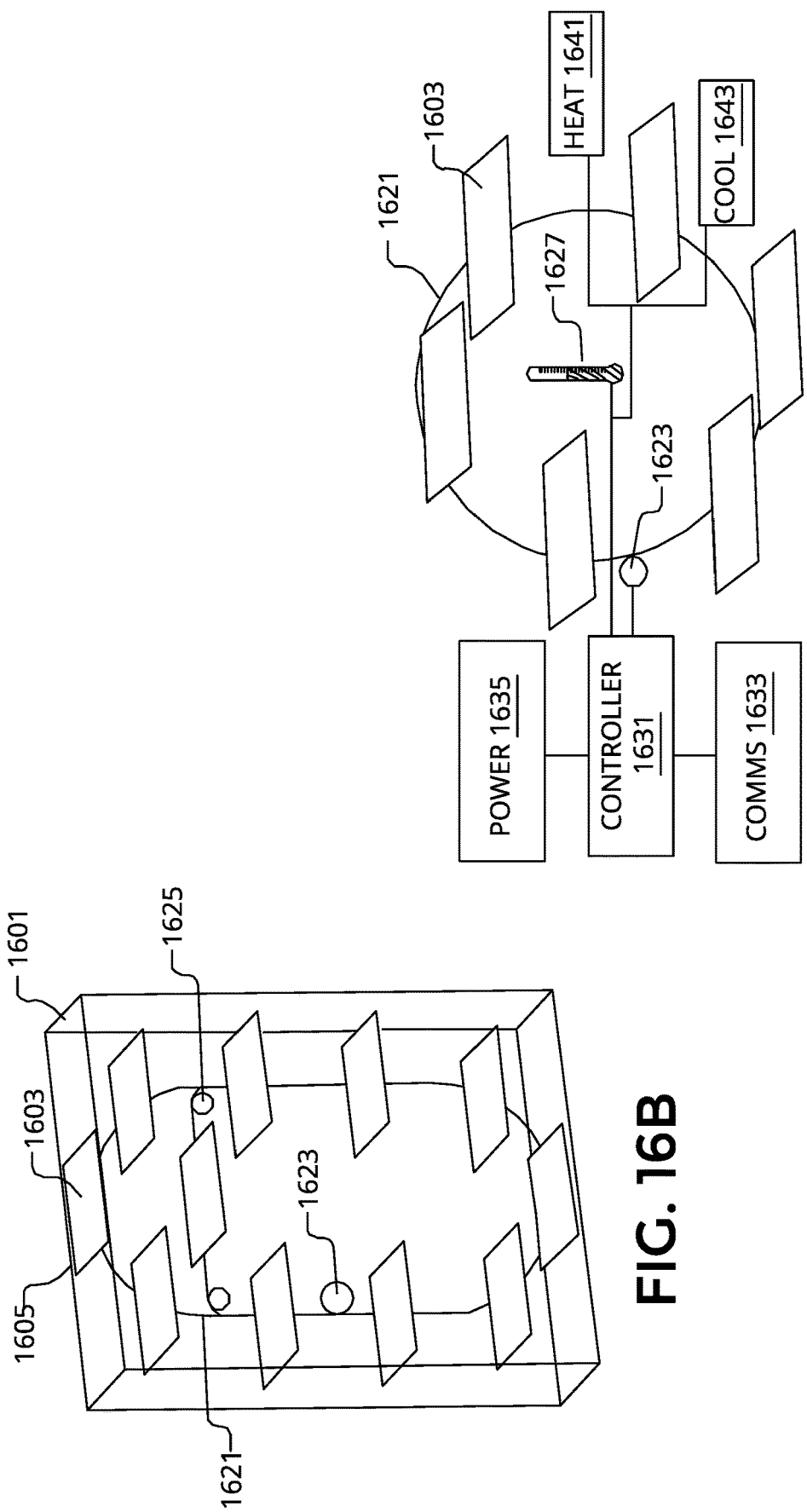

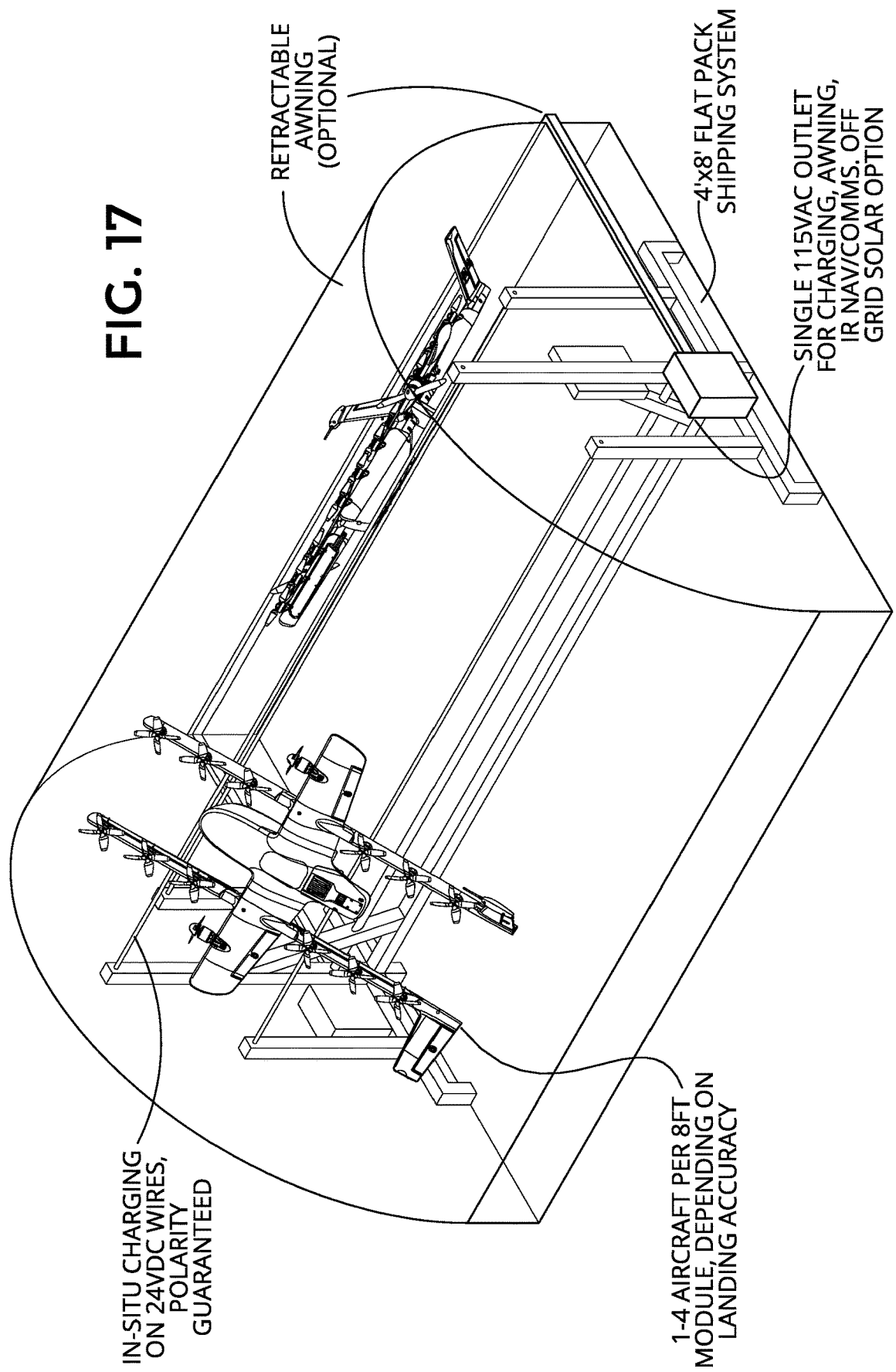

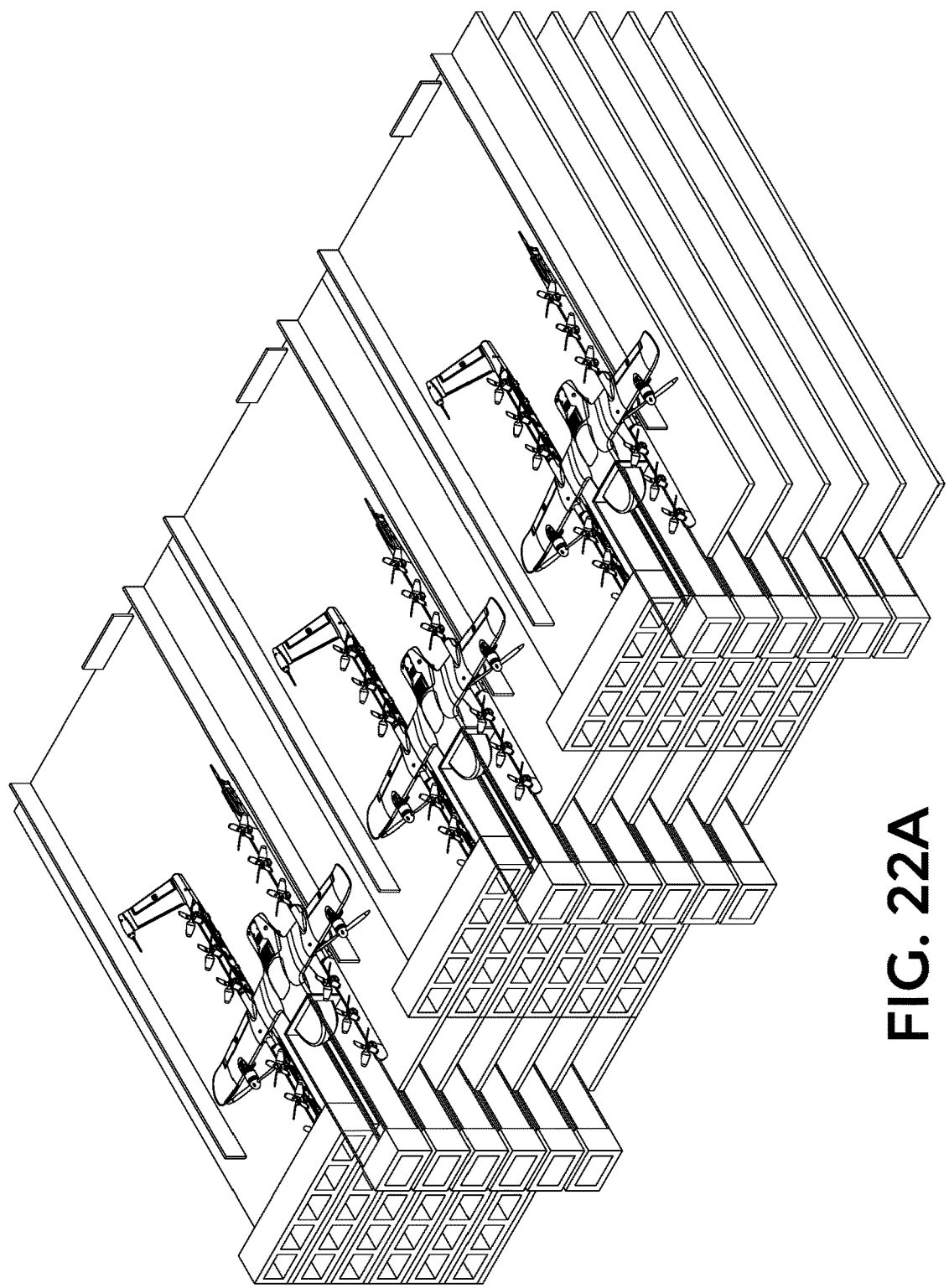
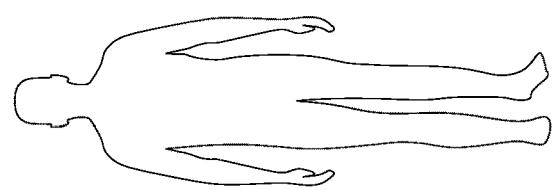
FIG. 22A

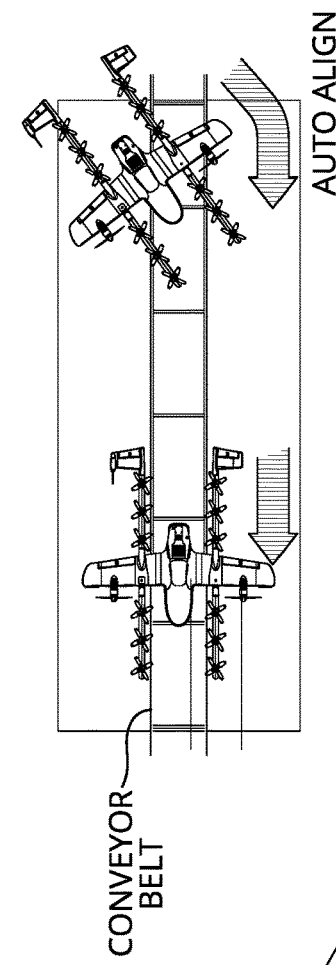
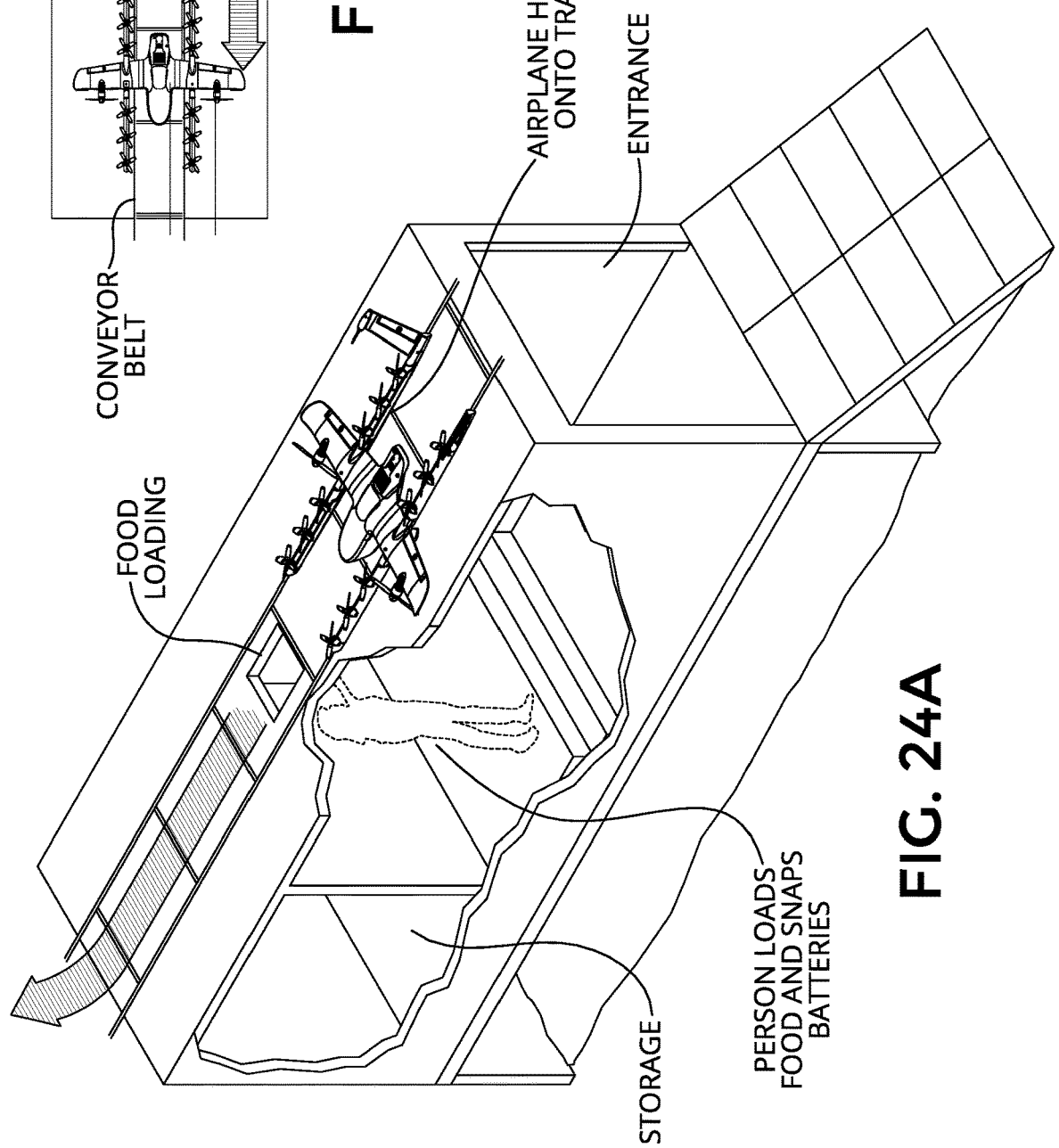

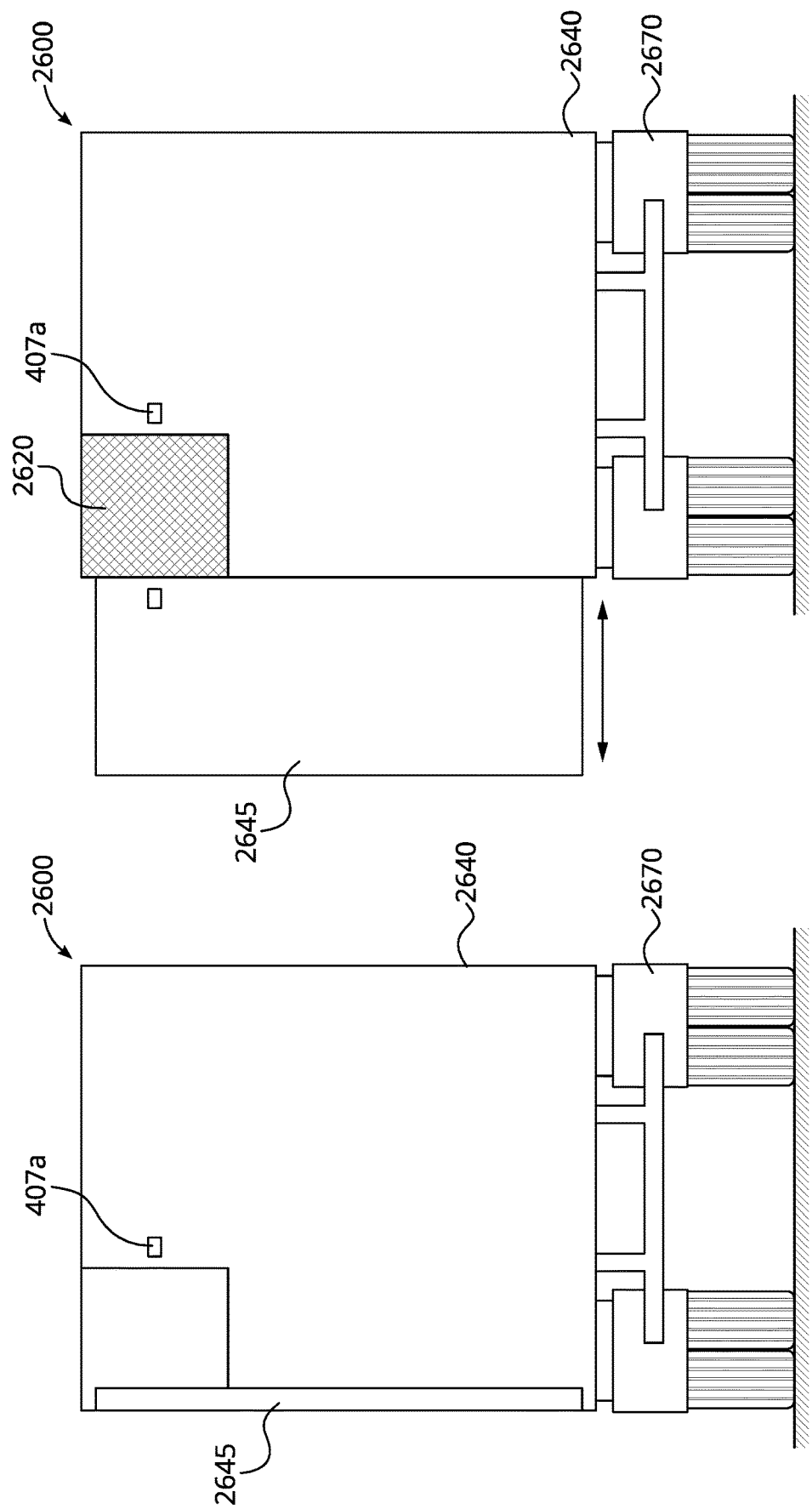

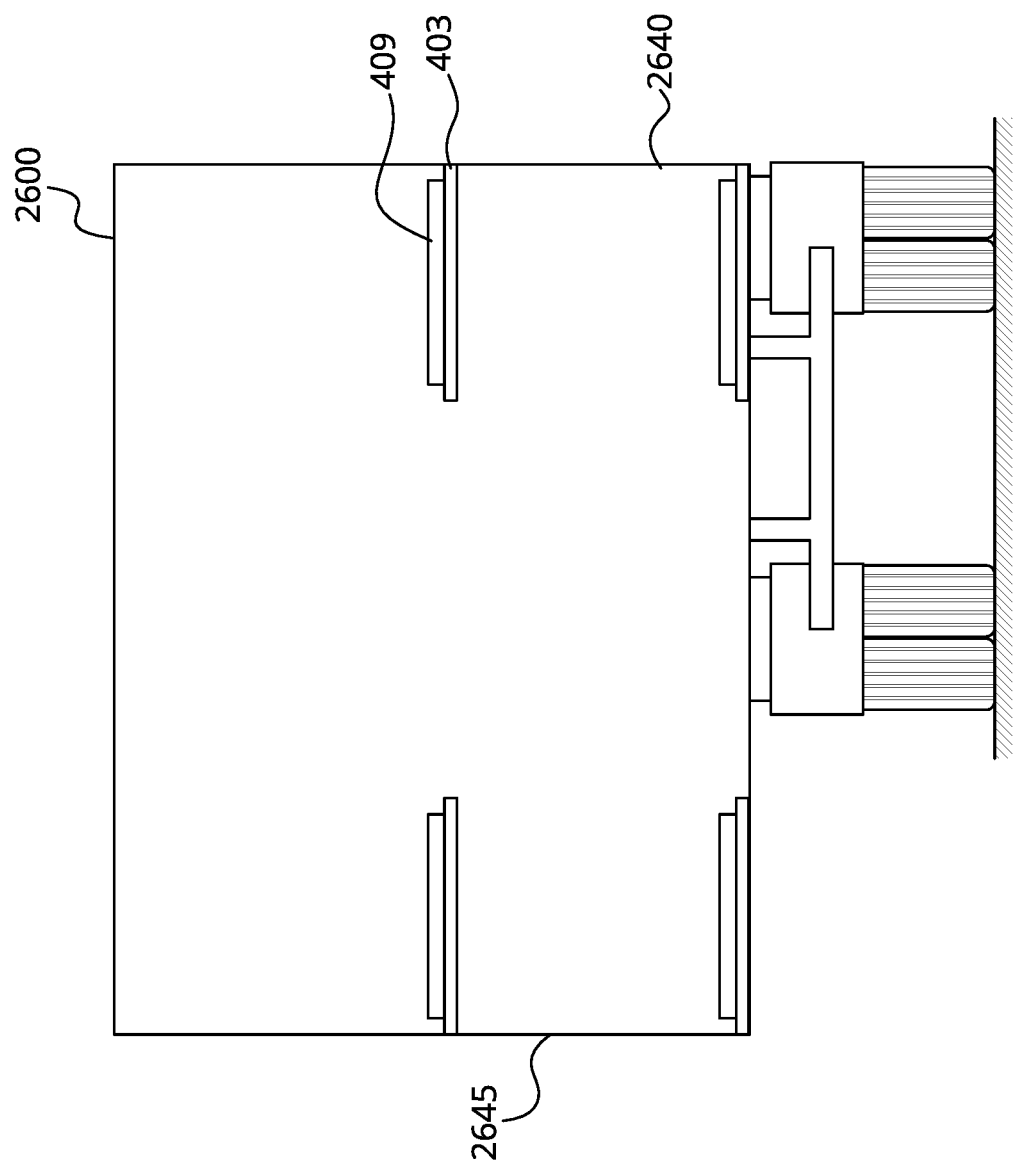

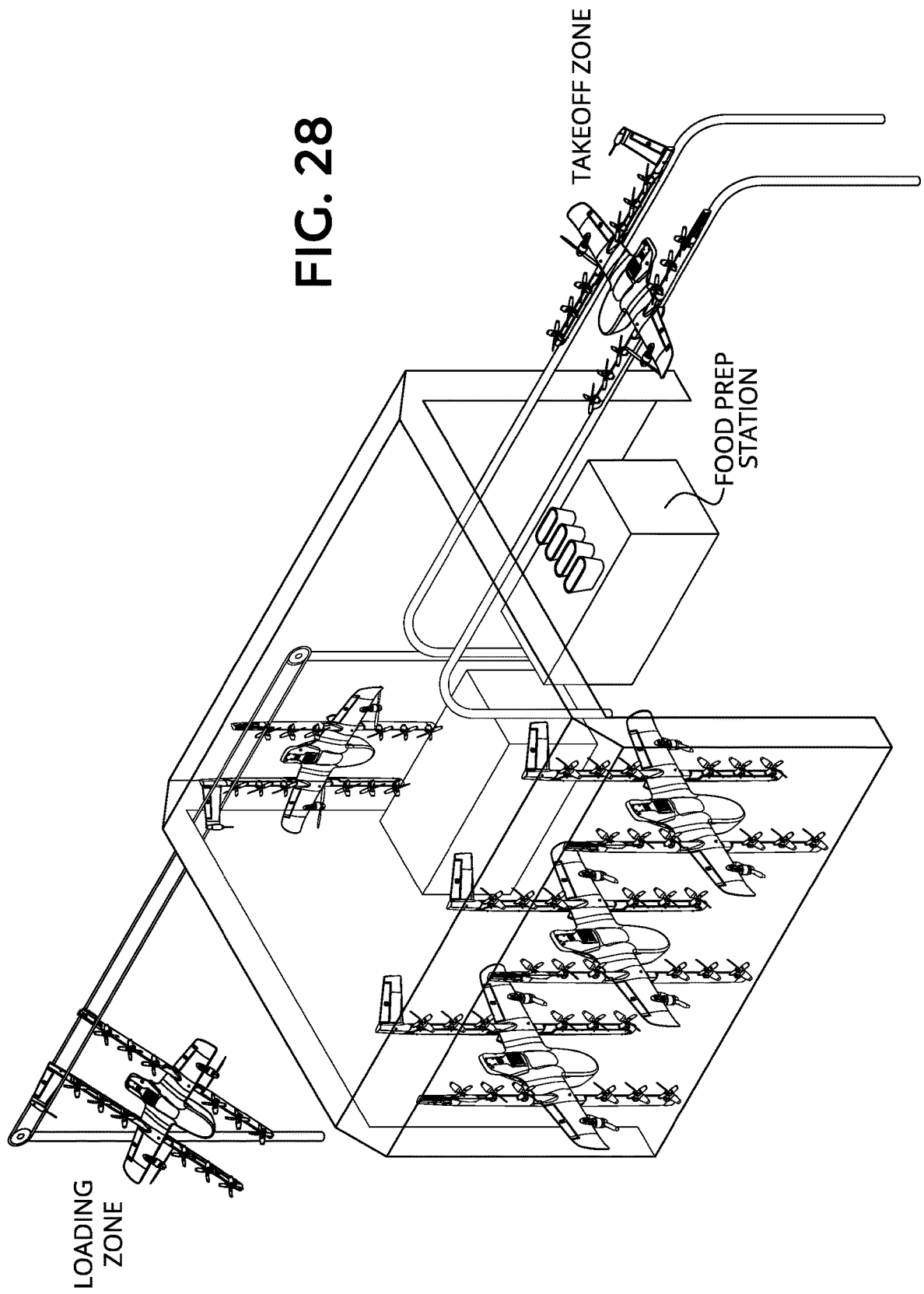

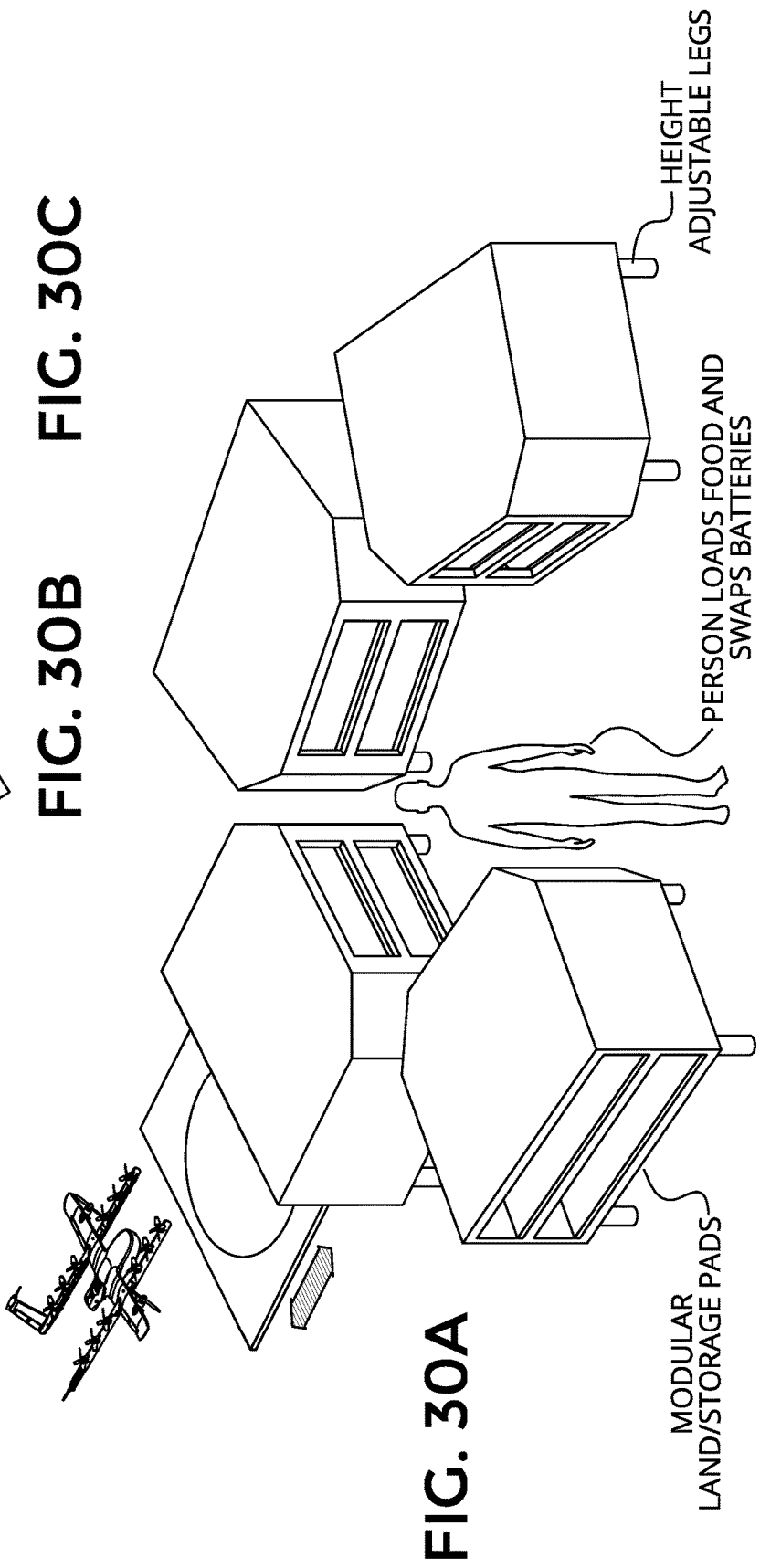

UNMANNED AERIAL VEHICLE HOUSING INCLUDING DEPLOYABLE LANDING PADS

This application claims the benefit of U.S. Provisional Application No. 62/685,166, filed Jun. 14, 2018, which is hereby incorporated by reference in its entirety.

BACKGROUND

The current disclosure relates to different housing structures for unmanned aerial vehicles ("UAVs"). UAVs may be powered by rechargeable batteries. When UAVs are not in use they may be stored and the rechargeable batteries may be recharged. Further, UAVs may need waystations to recharge in the middle of longer flights or may need shelter from inclement weather.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIGS. 4A-4C illustrate a modular housing structure, in accordance with embodiments of the disclosure.

FIGS. 6A-1 to 6A-4, 6B-1 to 6B-4, and 6C illustrate several examples of single-aircraft housing structures, in accordance with embodiments of the disclosure.

FIGS. 12A-C illustrate a spindle housing structure, in accordance with an embodiment of the disclosure.

FIGS. 13A and 13B illustrate a spindle housing structure, in accordance with an embodiment of the disclosure.

FIGS. 15A-D illustrate modular housing structures with retractable charging pads, in accordance with an embodiment of the disclosure.

FIGS. 16A-16C illustrate rotating charging pads in a housing structure, in accordance with an embodiment of the disclosure.

FIG. 17 illustrates a static wire charging station, in accordance with an embodiment of the disclosure.

FIGS. 22A and 22B illustrate a housing with slide-out takeoff and landing racks, in accordance with an embodiment of the disclosure.

FIGS. 24A and 24B illustrate a takeoff and landing pad with manual battery swap, in accordance with an embodiment of the disclosure.

FIGS. 26A-26E illustrate mobile charging stations, in accordance with embodiments of the disclosure.

FIG. 28 illustrates a housing structure with partially automated battery swap and storage, in accordance with an embodiment of the disclosure.

FIGS. 30A-C illustrate another example of slide-out cabinets for manual battery swap and storage, in accordance with an embodiment of the disclosure.

DETAILED DESCRIPTION

Embodiments of apparatuses, systems, and methods for automated aircraft housing are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Several example embodiments of housings for unmanned aerial vehicles ("UAVs") are described herein. UAVs may also be called automated aircraft ("AA"), automated remote-controlled aircraft, drones, or automated planes.

The individual example embodiments of housings for the UAVs may provide at least one of charging functions for the UAVs, shelter from weather for the UAVs, and storage of the UAVs when the UAVs are not in use. The housings may be passive or active. The active housings may communicate directly or indirectly with the UAVs and may move component parts of the housing to accommodate the UAVs. In various embodiments, the housing are modular for easy deployment and storage of a variable number of UAVs.

Figure 1:
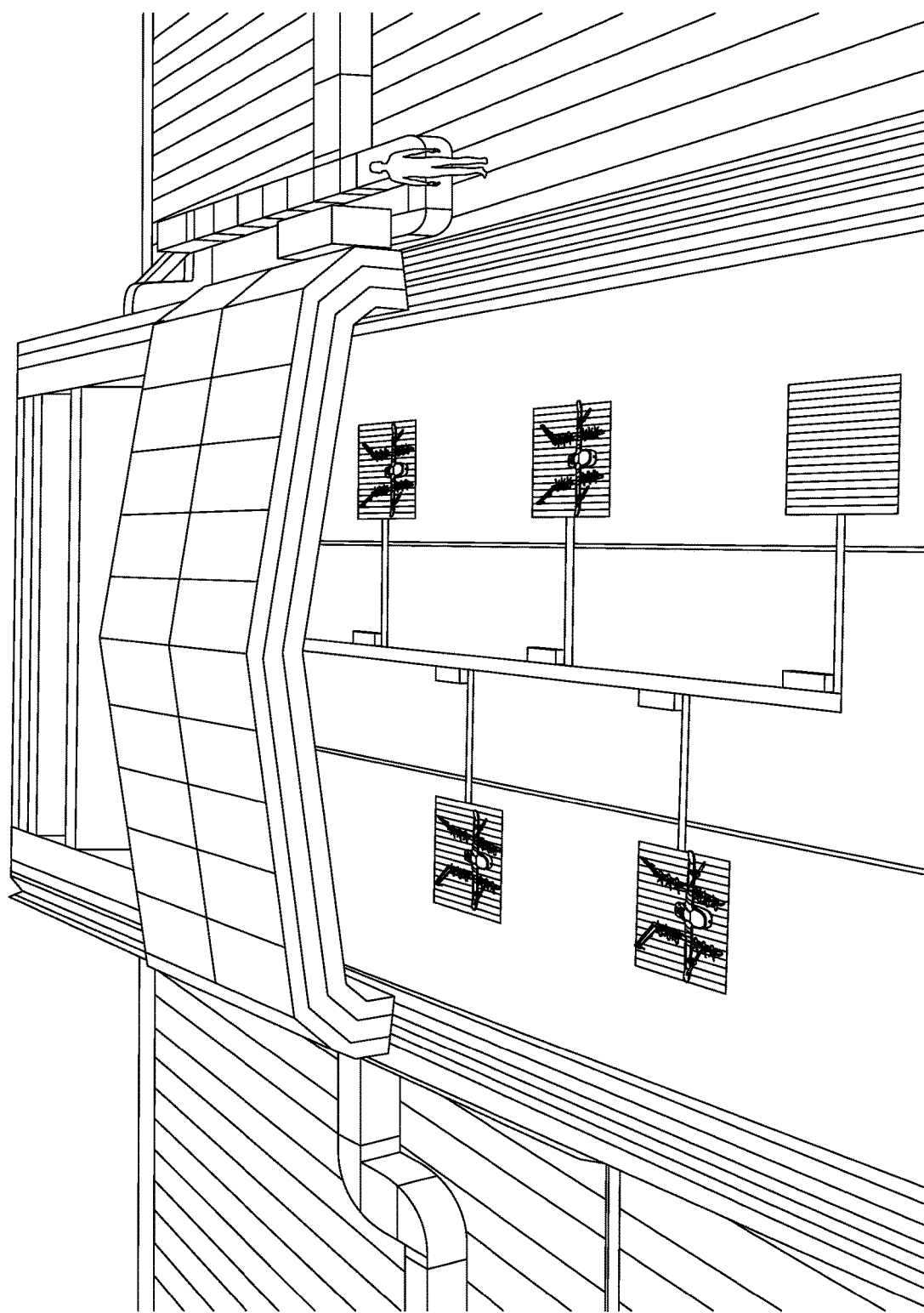
FIG. 1 illustrates a housing structure with a telescoping roof, in accordance with an embodiment of the disclosure.

FIG. 1 illustrates a housing structure with a telescoping roof, in accordance with an embodiment of the disclosure. As shown, the telescoping roof is divided into a plurality of segments, and the segments slide along a track to cover the automated aircraft landing and takeoff pads. As shown, the segments of the telescoping roof are shaped to stack when they are retracted. Like other embodiments depicted and described herein, the landing pads are coupled to a power supply (see, e.g., blocks on power line depicted) to charge the UAVs when the UAVs land on the pads. The charging may be direct (e.g., with linear electrodes shown) or inductive. The roof segments depicted may have wheels that slide along the track to extend the housing over the landing pads. In another embodiment, other structures such as cables or chains may be used to extend the roof segments over the landing pads.

In the depicted embodiment the substantially triangular roof segments may be covered with photovoltaic cells to provide power. The power generated may be stored (e.g., in a battery, capacitor, or the like) and then supplied to the automated aircraft via power supply circuitry to supply the proper voltage/current.

Figure 2:
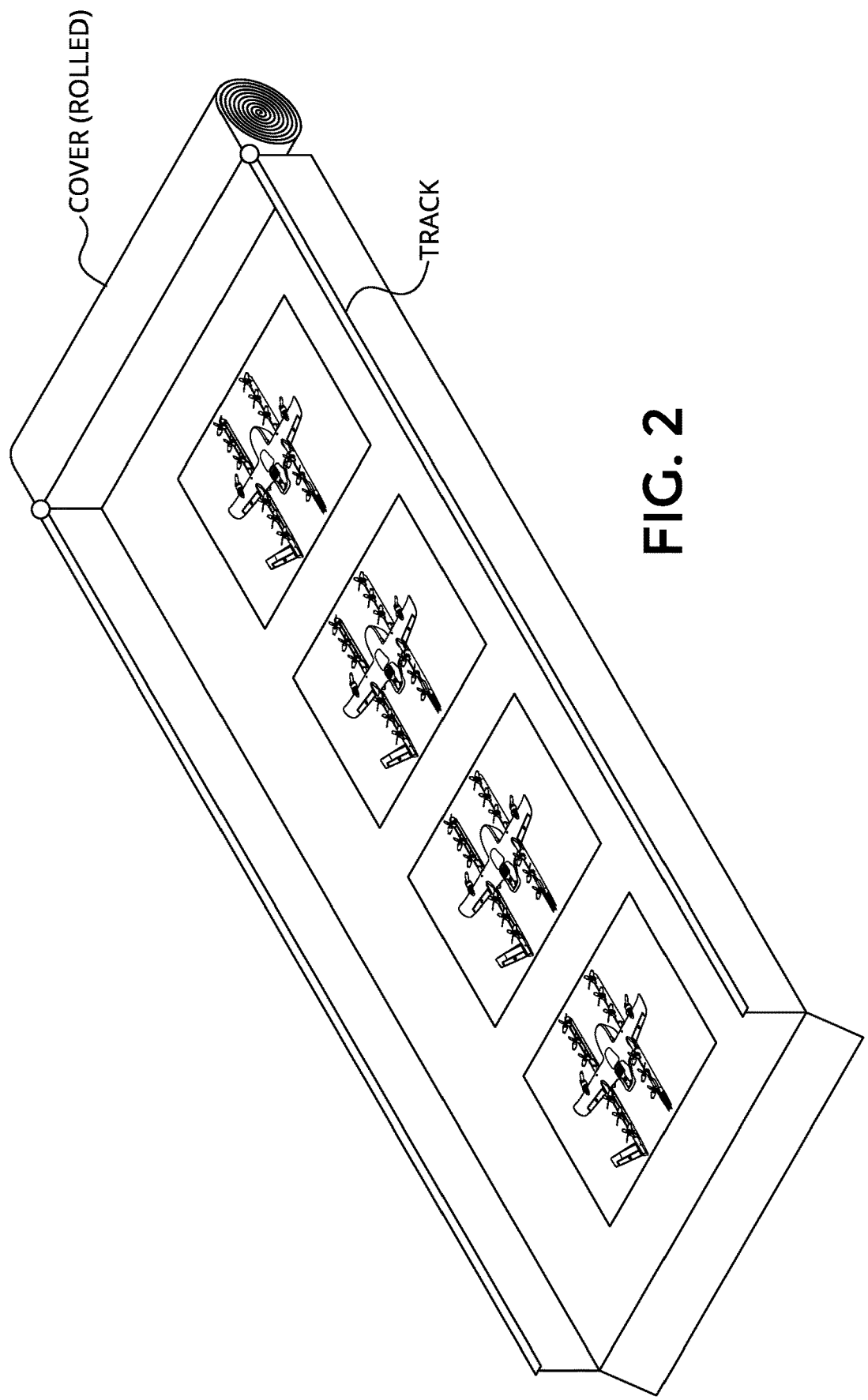
FIG. 2 illustrates a housing structure with a retractable (roll-up) cover, in accordance with an embodiment of the disclosure.

FIG. 2 illustrates a housing structure with a retractable (roll-up) cover, in accordance with an embodiment of the disclosure. The roof structure depicted may slide over the landing pads similar to how an automated pool cover extends over the surface of a pool: the cover may slide along tracks and unroll off of a spool. Here, the housing cover may be made from fabric, polymers, or other flexible materials. Alternatively or additionally, the cover could include rigid segments connected by flexible/pivoting segments (e.g., similar to a roll-up truck bed cover). The landing and takeoff pads may be disposed in a receptacle (e.g., a crate or the like) that the cover extends over.

Figure 3:
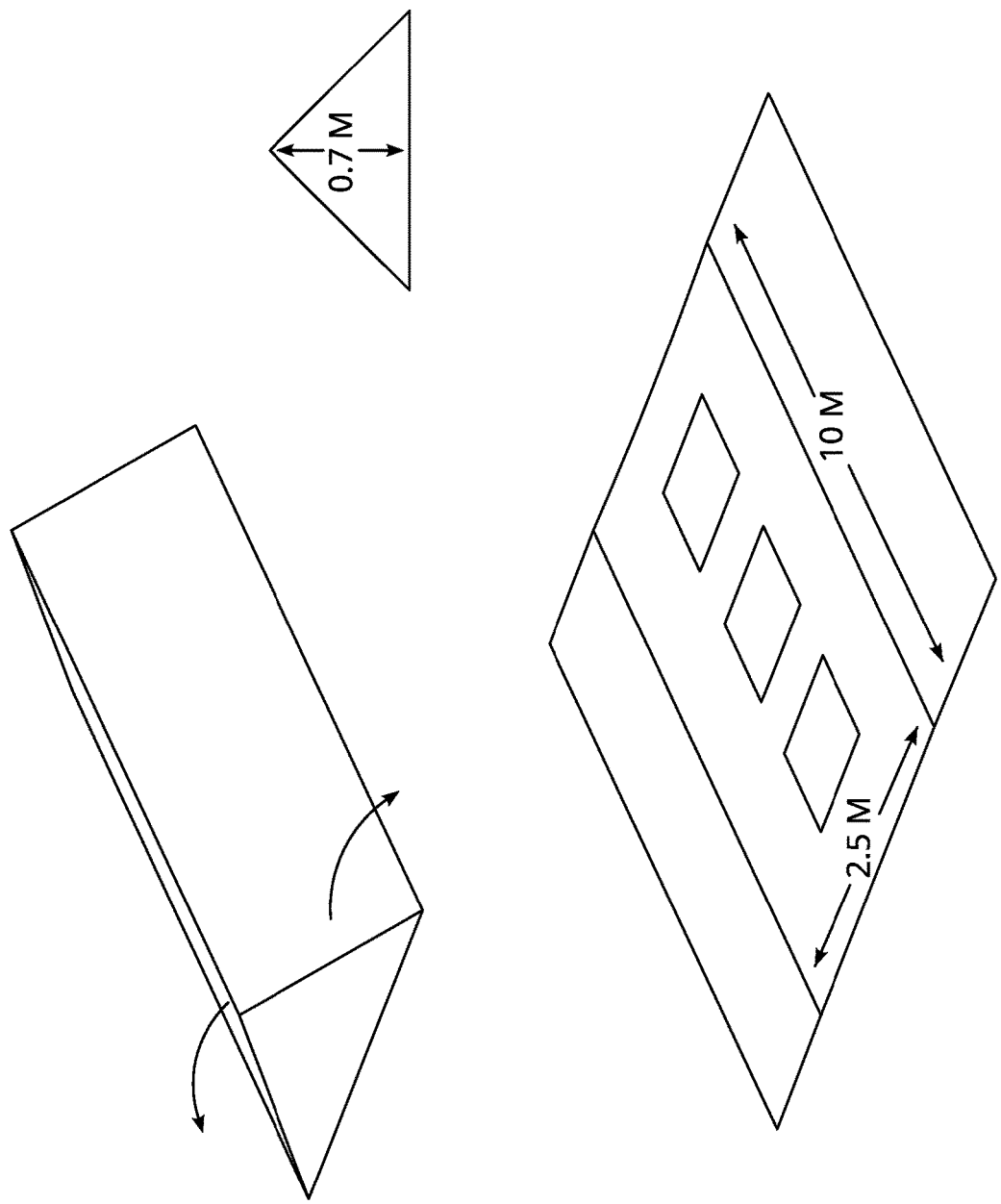
FIG. 3 illustrates a housing structure with a fold down roof, in accordance with an embodiment of the disclosure.

FIG. 3 illustrates a housing structure with a fold down roof, in accordance with an embodiment of the disclosure. As shown, the structure includes three segments, where two of the segments fold down to expose takeoff and landing pads. As shown, the approximate length of the structure may be 10 m, the width of the portion with the takeoff and landing pads may be 2.5 m, and the height of the closed housing structure may be 0.7 m. It is appreciated that the structure may be opened and closed with a motor. The motor may be coupled to a controller and the controller determines when the housing structure needs to be opened (e.g., when a signal from an UAV indicates that a takeoff or landing is imminent, for example, when the UAV is in close proximity to the structure).

FIGS. 4A-4C illustrate a modular housing structure, in accordance with embodiments of the disclosure. As depicted, the modular housing structure 400A of FIG. 4A includes a plurality of housing segments 401, endcap structures 408, landing pads 403, one or more ingress points 405, and navigational aids 407*a-d*. The individual housing segments 401 are shaped to be mechanically joined together to form an exterior of modular housing structure 400A. In some embodiments, the housing segments 401 may include geometry to click or slide segments 401 together. Alternatively or additionally, fasteners (e.g., Velcro, zip-ties, magnets, clips, locks, or the like) may be used to join and secure housing segments 401 to one another. As depicted, one or more landing pads 403 are positioned within individual housing segments 401, and the landing pad 403 is sized for the automated aircraft to land on the landing pad 403.

The landing pads 403 may be organized with three landing pads 403 evenly spaced on the floor, and two landing pads 403 attached to sidewalls elevated above the floor. Restated, the landing pads 403 may be organized into multiple levels such that some landing pads 403 are vertically above other landing pads 403. Each individual housing segment 401 may have the same layout or may have a different layout of the landing pads 403. If the individual housing segments 401 have the same layout, the landing pads 403 may include a center row of the landing pads 403 disposed below an access corridor. The access corridor extends down the interior of the housing structure 400A. The center row of the landing pads 403 is not covered by other landing pads 403. The access corridor connects to the ingress point 405 and extends past all of the landing pads 403.

The illustrated layout of landing pads 403 is only one possible embodiment, and it is anticipated that other layouts and numbers of landing pads 403 may be integrated into each housing segment 401.

One or more ingress points 405 are shaped to allow passage of the one or more UAVs into the plurality of housing segments 401. For example, the ingress point 405 may be a hole in a portion of the housing structure 400A that has a lateral dimension that is larger than the wingspan of the UAVs and a vertical dimension larger than a height of the UAVs. The ingress points 405 may be elevated or near the ground. In the embodiment of FIG. 4A, ingress point 405 is integrated into the sidewall of an endcap structure 408. In other embodiments (as illustrated and discussed in relation to FIG. 4B), ingress point 405 may be integrated into a roofing structure.

The individual housing segments 401 may have a frame of metal polls (e.g., steel, aluminum, etc.), plastic polls, or otherwise. The housing segments 401 may also include metal (e.g., steel, aluminum, etc.) or thermal plastic slats (or other similar materials) forming the faces of the housing segments 401 on the frame. Restated, housing segments 401 may have a metal or plastic frame with metal or plastic slats covering the frame. Alternatively the individual housing segments 401 may include a metal or plastic frame with a canvass or similar material over the frame. As another alternative, the individual housing segments 401 may be formed of metal or thermal plastic slats with connections, such as locking hinges, connecting the slats.

The individual housing segments 401 may have a common structural shape that repeats when assembled to form the modular housing structure 400A. A first and last of the housing segments 401 may include endcap structures 408 shaped to enclose an end of the exterior of the modular housing structure 400A. The endcap structures 408 may be made of the same materials as the housing segments 401. The endcap structure 408 may include or define ingress point 405.

As illustrated, housing structure 400A includes endcap structures 408 shaped to be mechanically joined to the plurality of housing segments 401, and the endcap structures 408 enclose the ends of the housing structure 400A when the plurality of housing segments 401 are jointed. In the depicted embodiment, the one or more ingress points 405 are positioned on the endcap structures 408 so the UAVs "fly through" the housing structure 400A to get to their landing pad 403. Although ingress points 405 are referred to as "ingress points" it is appreciated that ingress points may also serve as egress points as well.

As illustrated, the housing structure 400A may include several navigational aids 407*a-d*. The navigational aids 407*a-d* may include flashing lights, RFID devices, infrared beacons, sound emitting devices, Bluetooth beacons, fiducial markers and the like. Fiducial markers are objects used as optical points of reference and information. The fiducial markers may take the form of a mark or set of marks such as a barcode or quick response ("QR") code.

The navigational aids 407*a-d* are displayed on or by the housing structure 400A. First navigational aids 407*a* may be positioned proximate to the one or more ingress points 405 to guide the UAVs into the plurality of housing segments 401 (or interior of the housing structure 400A). Similar navigational aids may be placed around the ingress points 405 in the interior of the housing structure 400A to guide the UAVs out of the housing structure 400A. The first navigational aids 407*a* may be associated with and thus indicate an entry location, directions for entry to the housing structure 400A, or some other navigational information or identification information. Similarly, second navigational aids 407*b* may be placed on or around the one or more landing pads 403 to guide the UAVs onto the one or more landing pads 403. The second navigational aids 407*b* may indicate a landing pad number, directions for landing on the landing pad 403, or other navigational or identification information. The second navigational aids 407*b* may be smaller than the first navigational aids 407*a*.

Also third navigational aids 407*c* may be placed on an exterior of the housing structure 400A or next to the housing structure 400A. The third navigational aids 407*c* may indicate an identification of the housing structure 400A, an approach path, entry location, housing layout, or other identification or navigational information. The navigational aids 407*a-c* also may reference information stored in a network to which the UAVs are connected or stored onboard the UAVs. For example, the third navigational aids 407*c* may be fiducial markers which include a code for looking up navigational information or layout information of the housing structure 400A. The third navigational aids 407*c* may be larger, brighter or otherwise detectable by the UAVs from a greater distance than the first navigational aids 407*a*.

In some embodiments, there may be indoor navigational aids 407*d* to direct UAVs to their respective landing pads 403. For example, the indoor navigational aids 407*d* may be fiducial markers indicating an identification of the housing segment 401 or a relative physical position of the housing segment 401 from amongst the plurality of housing segments to aid navigation to a given landing pad 403 within the housing structure 400A. The UAVs may be programed to use the indoor navigational aids 407*d* to find an assigned landing pad 403 in one of the housing segments 401.

Restated, the housing structure 400A may include a plurality of navigational aids 407*a-c* and navigational aids 407*d* which assist the UAVs in navigating into the housing structure 400A and to the landing pads 403, and also from the landing pads 403 out of the housing structure 400A.

The third navigational aids 407*c* are designed to be detected by the UAVs from a great distance to assist the UAV in locating the housing structure 400A. The first navigational aids 407*a* are designed to assist the UAVs in locating and navigating through the ingress points 405 after the UAV has already located the housing structure 400A. Thus, the first navigational aids 407*a* are designed to be detected by the UAVs at a closer range and may provide more precise navigational information than the third navigational aids 407*c*. Accordingly, the first navigational aids 407*a* may be smaller than the third navigational aids 407*c*.

The second navigational aids 407*b* are designed to guide the UAVs onto the landing pads 403 within the interior of the housing structure 400A. Thus, the second navigational aids 407*b* are designed to be detected by the UAVs at a close range and provide precise navigational information. Accordingly, the second navigational aids 407*b* may be smaller or otherwise detectable by a UAV from a lesser distance than the first navigational aids 407*a*.

The indoor navigational aids 407*d* are designed to provide general navigational information to the UAVs within the interior of the housing structure 400A. Thus, the indoor navigational aids 407*d* are designed to be detected by the UAVs at close range. If the navigational aids 407*a-d* are fiducial markers, the indoor navigation aids 407*d* may be larger than the second navigational aids 407*b* and smaller than the third navigational aids 407*c*. Thus, navigational aids 407*a-d* provide a comprehensive visual based navigation system to UAVs.

Landing pads 403 may include charging circuitry 409 positioned (e.g., integrated into landing pads 403) to supply charge to the one or more UAVs, when the one or more automated aircraft are on landing pads 403. It is appreciated that charging circuitry 409 may include: electrical contacts disposed on the one or more landing pads 403 and positioned to contact electrodes on the one or more UAVs; inductive charging circuitry 409 disposed on the one or more landing pads 403 and positioned to transfer charge inductively to the one or more UAVs; as well as other techniques to provide charge, in accordance with the teachings of the present disclosure.

FIG. 4B depicts modular housing structure 400B, which has similar features to modular housing structure 400A. However, in the depicted example, one or more ingress points 406 are positioned proximate to the top of the individual housing segments 402. Thus, each of the housing segments 402 may include a separate ingress point 406 to allow passage of the UAVs in or out of the modular housing structure 400B. Accordingly, the UAVs may fly in through the "roof" of housing segments 402 and be guided by first navigational aids 407*a* disposed on the roof. The ingress points 406 on the roof of housing segments 402 may be open gaps in the roof of the individual housing segments. The individual ingress points 406 in the roofs of the individual housing segments may join together to form a one or more larger ingress points (e.g., a larger strip opening).

As depicted in FIG. 4B, the housing segments 402 of the housing structure 400B may have one less landing pad 403 than the housing segments 401 of housing structure 400A (e.g., housing segments 401 of housing structure 400A have three landing pads 403 evenly spaced on the floor, and two landing pads 403 attached to sidewalls elevated above the floor, whereas housing segments 402 of housing structure 400B are missing the middle landing pad 403 on the floor, which may be so the landing pad 403 does not get wet or receive direct sunlight since the roof of housing structure 400B is partially open). Embodiments are not limited to these disclosed organizations of the landing pads 403, any organization of the landing pads 403 may be used in the housing structures 400A or 400B.

Housing structures 400A and 400B may be passive housing structures. Accordingly, housing structures 400A and 400B may not have any communication elements or actively controlled moving parts. If the housing structures 400A and 400B are passive, the UAVs may communicate with a control server via a wireless network (such as a cellular network) in order to know which landing pad 403 to land on and when to take off.

Alternatively, the housing structures 400A and 400B may be active structures with an integrated local communication controller (similar to other communication controllers discussed below). The communication controller may communicate with the UAVs to manage which UAVs land on which landing pads 403. The communication controller may also actively manage which landing pads 403 receive electric power to charge the UAVs. The housing structures 400A and 400B may also include active ingress points 405 with doors. The doors may open and close based on communications from the UAVs and/or a control server requesting the doors to open to allow the UAVs to enter or exit the housing structure 400A or 400B.

The housing structures 400A and 400B are modular, meaning that the size of the housing structures may be altered by connecting more housing sections 401 or 402 between the endcap structures 408. Similarly, the number of UAVs that the housing structures 400A and 400B may support is scalable by connecting more or fewer housing sections 401 between the endcap structures 408, thus changing the number of landing pads 403 in the housing structure 400A or 400B.

FIG. 4C illustrates a housing segment 401 (or 402) in a folded, substantially flat configuration. In some example embodiments the individual housing segments 401 or 402 are foldable into a substantially flat configuration. In the substantially flat configuration the housing segments 401 may be stacked for easy transportation. The housing segments 401 or 402 are erectable into one of the forms shown in FIGS. 4A and 4B and connected to form the housing structures 400A or 400B.

The frame of the housing segment 401 (or 402) may include joints, which allow for the housing segments 401 to fold into the substantially flat configuration. Alternatively, if the housing structures 400A or 400B do not have a frame, the connectors between the slats may allow the housing segments 401 to fold into the substantially flat configuration. Restated, the housing segments 401 may be foldable into a substantially flat configuration without the housing segments 401 being disassembled. In some example embodiments, the landing pads 403 may have to be repositioned or adjusted before the housing segment 401 can be folded into the substantially flat configuration.

Figure 5:
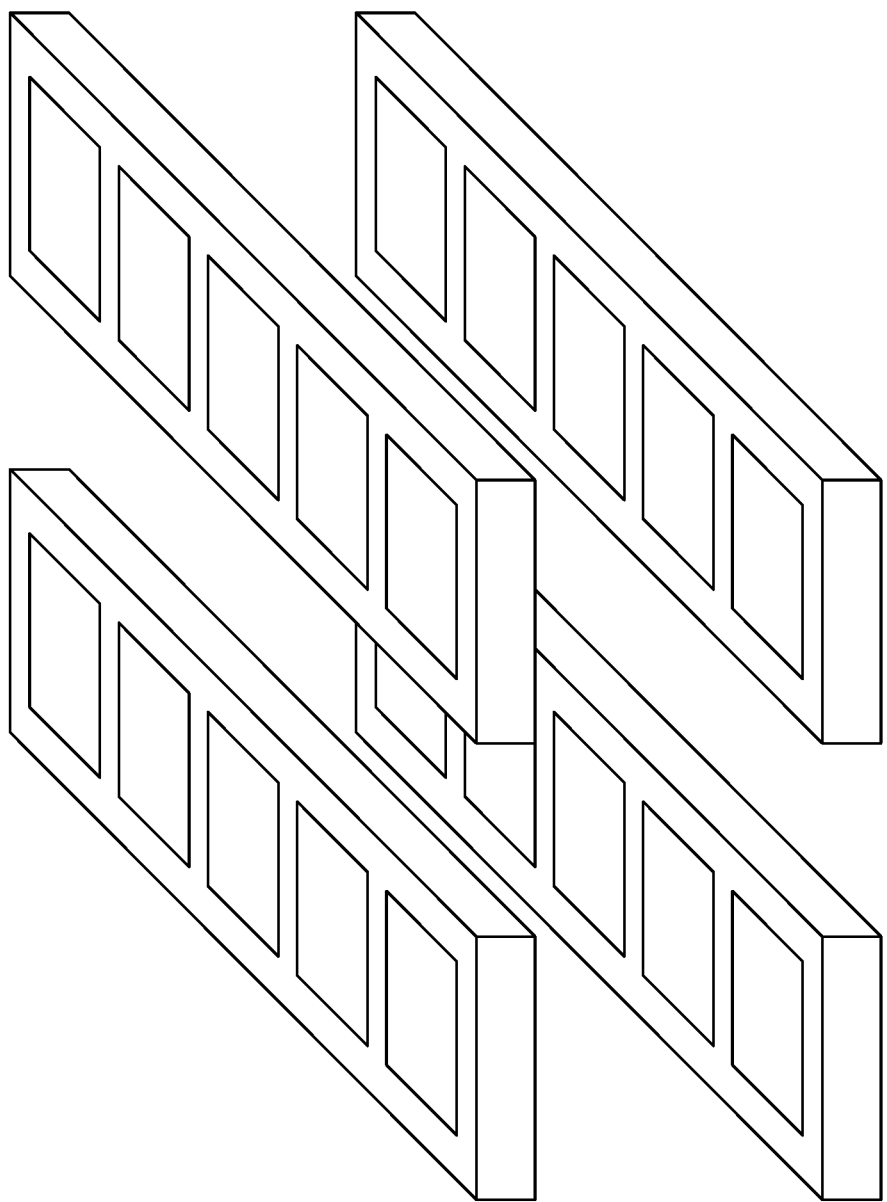
FIG. 5 illustrates a modular housing structure, in accordance with an embodiment of the disclosure.

FIG. 5 illustrates a modular housing structure, in accordance with an embodiment of the disclosure. FIG. 5 depicts an 8'×40' module, which may be used with any of the structures disclosed herein. This provides the 8'×40' base structure with five-plus pads, chargers, wiring, IT and optional ventilation prebuilt into a self-contained unit with internal wiring. Various retractable tops could be added or the modules could be built into a larger modular structure similar to the "fly in modular" structure proposed in FIGS. 4A and 4B. Since the modules depicted are relatively flat, the modules could stack ~10 high in a standard container or trailer bed for mobile deployment.

Figures 1, 6A:
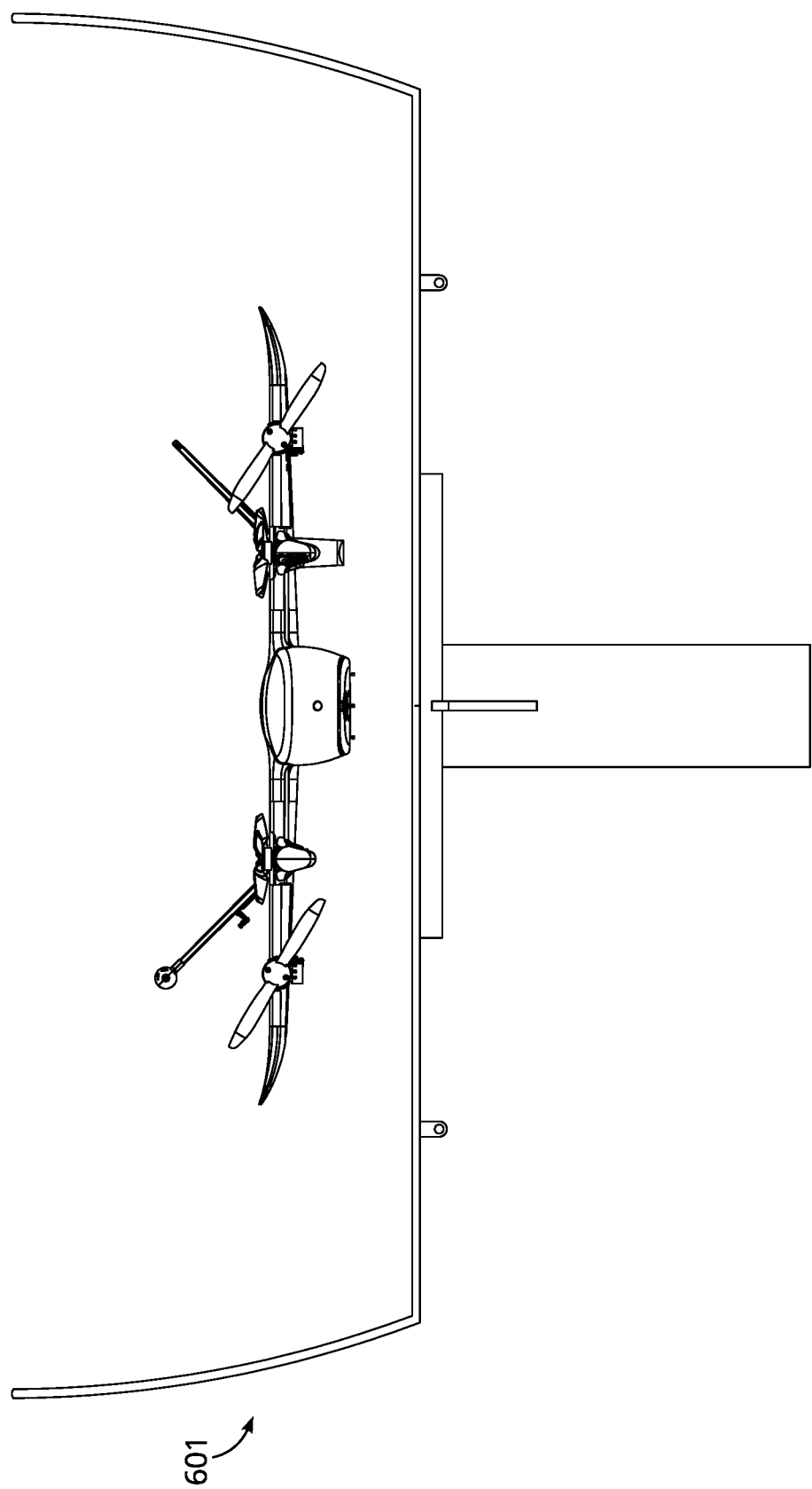
Figures 2, 6A:
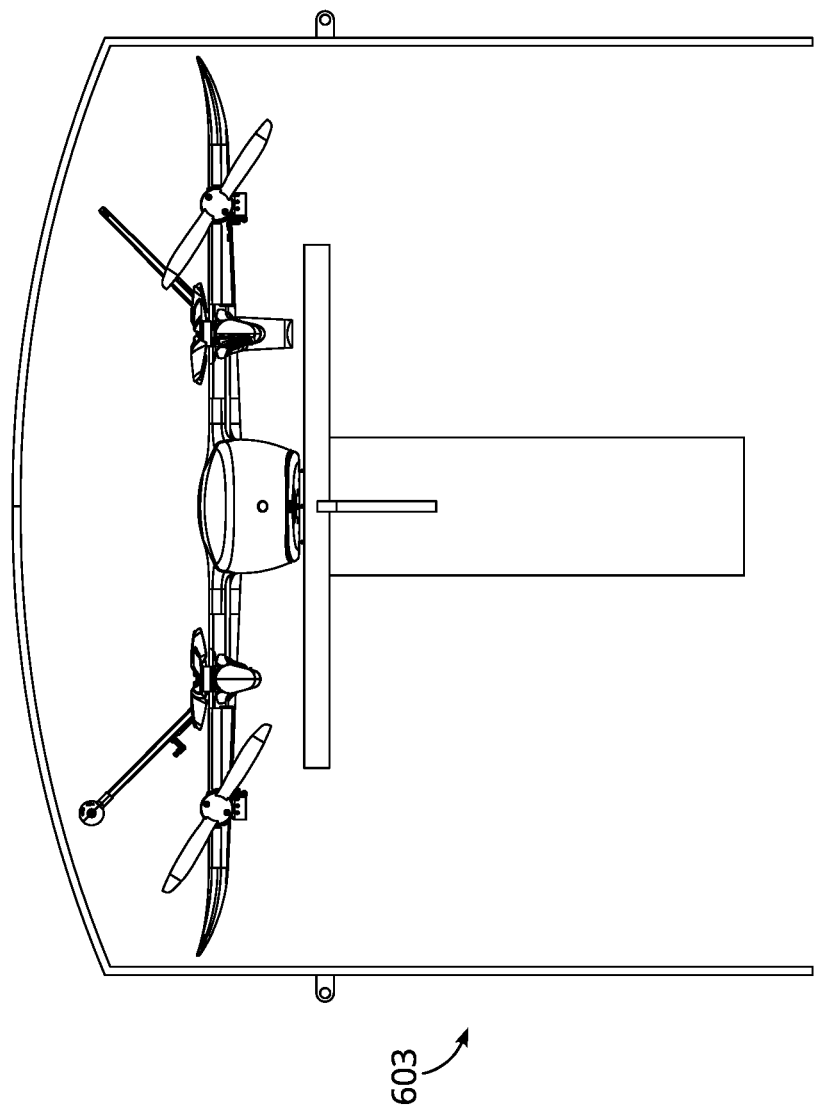
Figures 3, 6A:
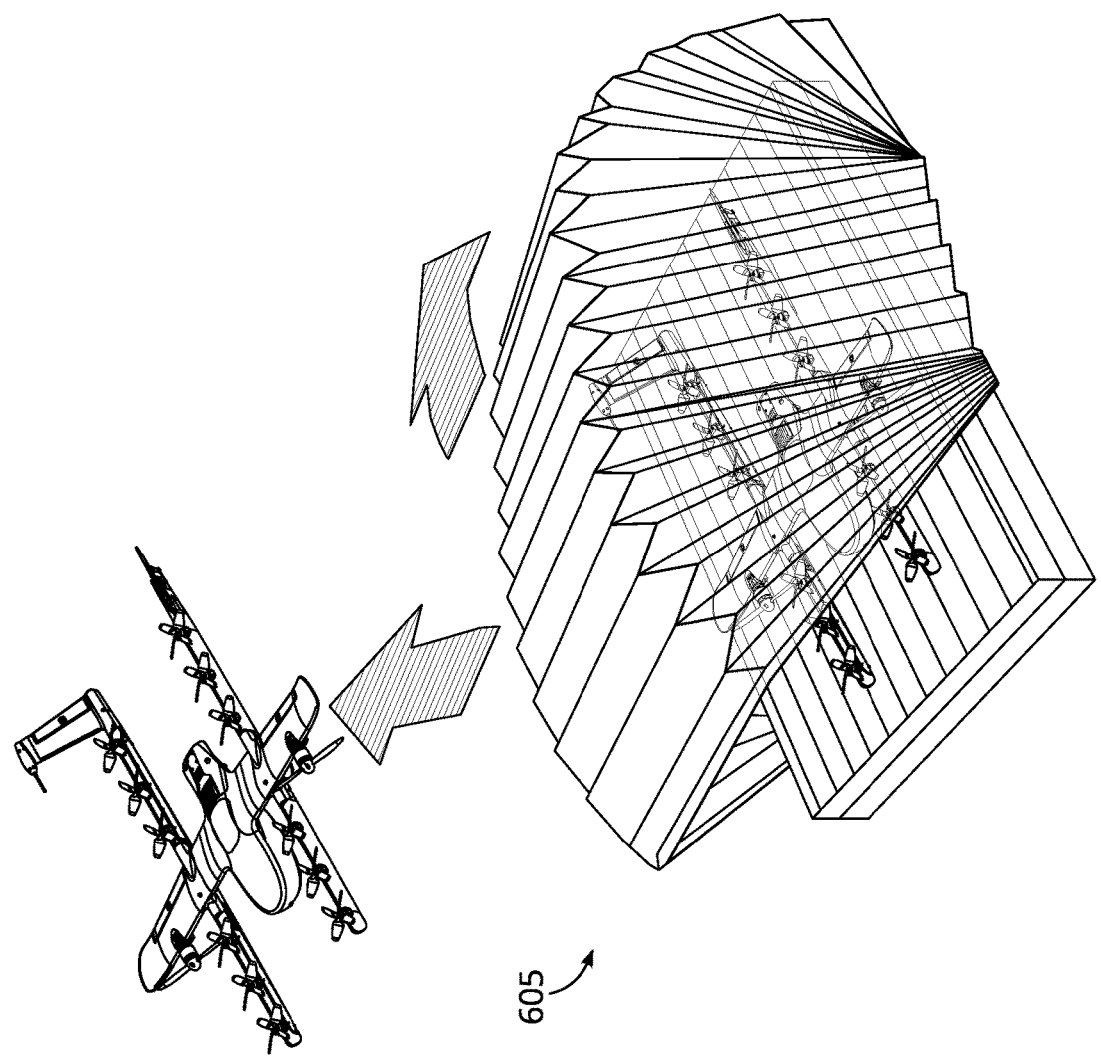
Figures 4, 6A:
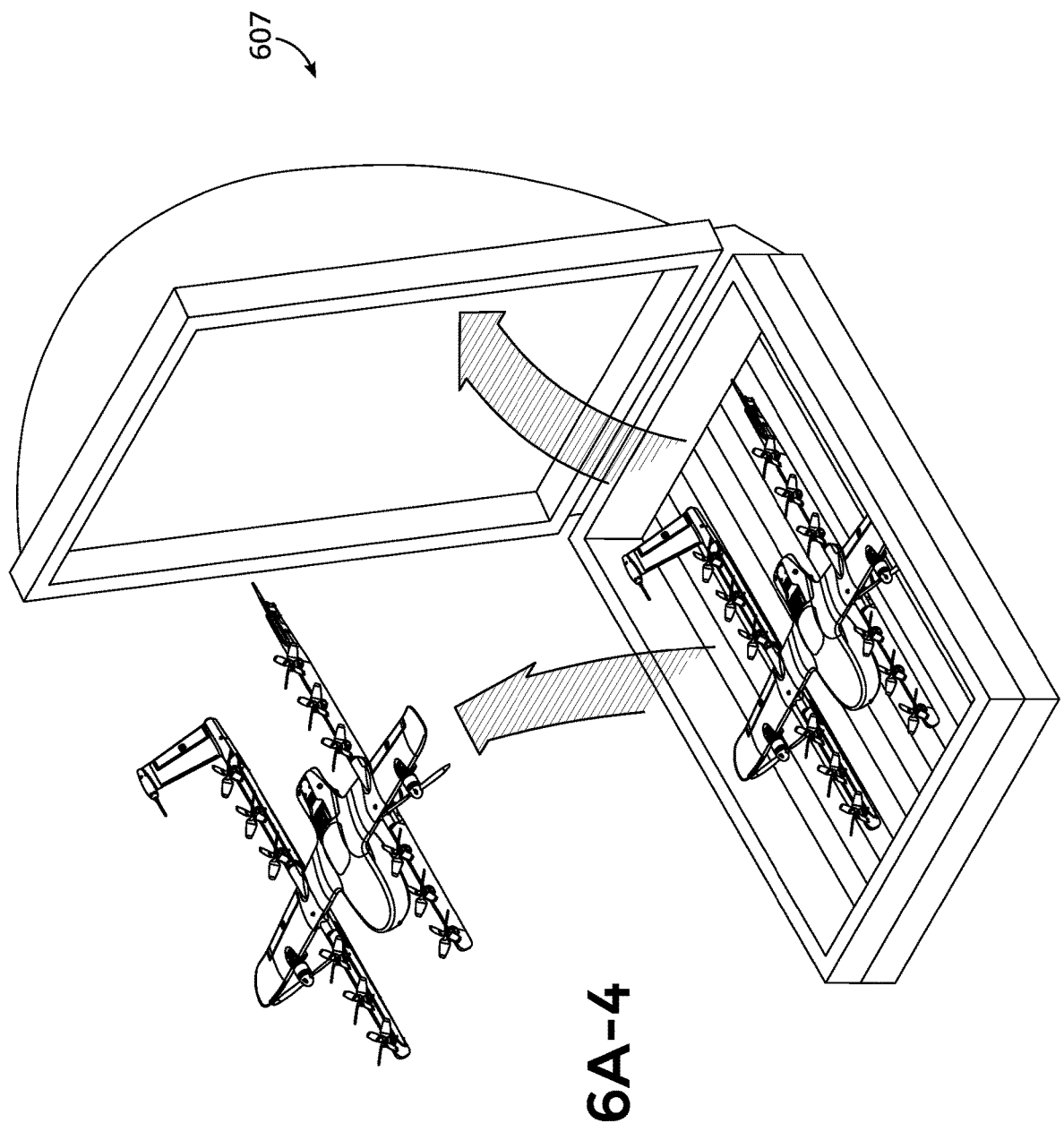
Figures 1, 6B:
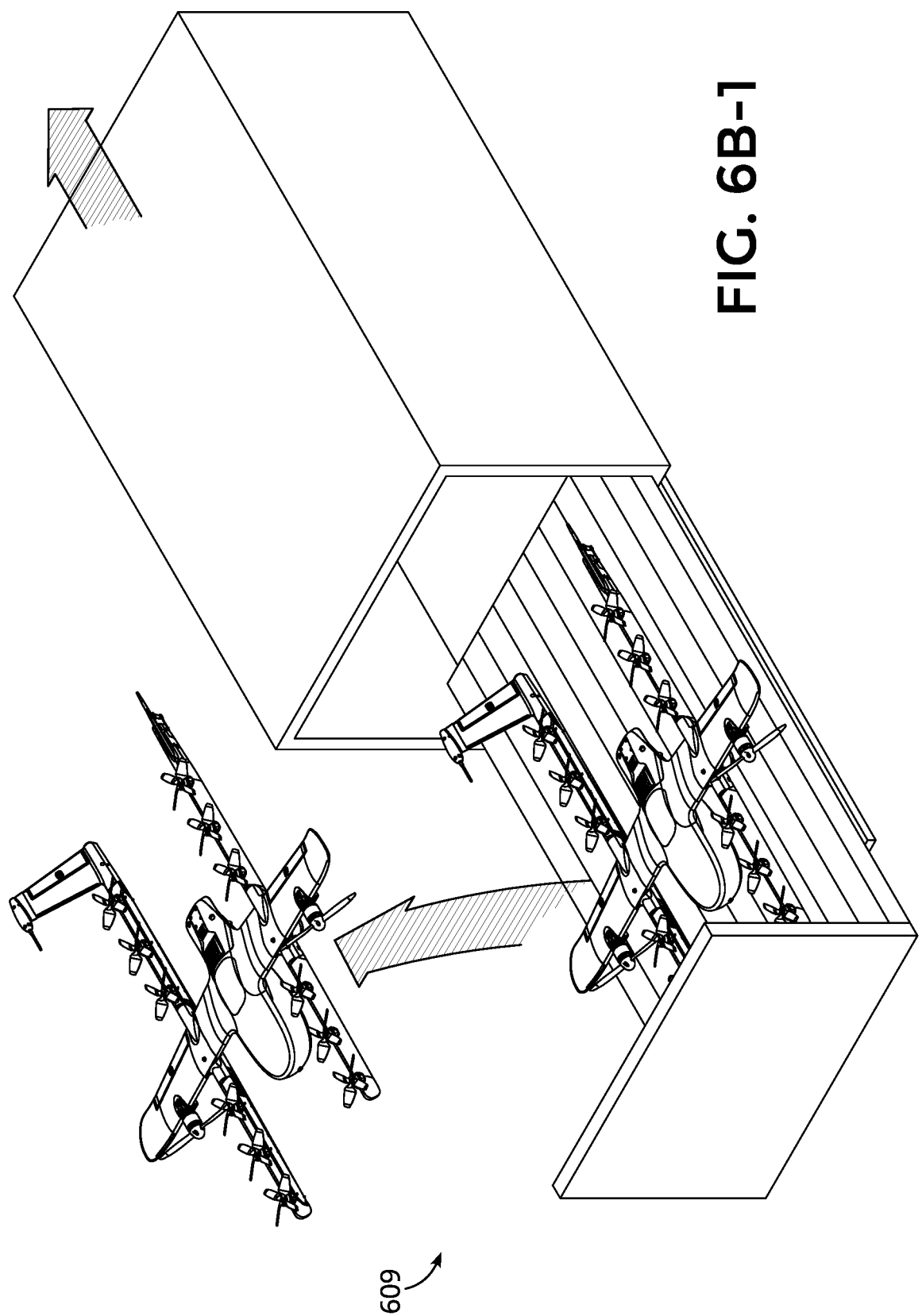
Figures 2, 6B:
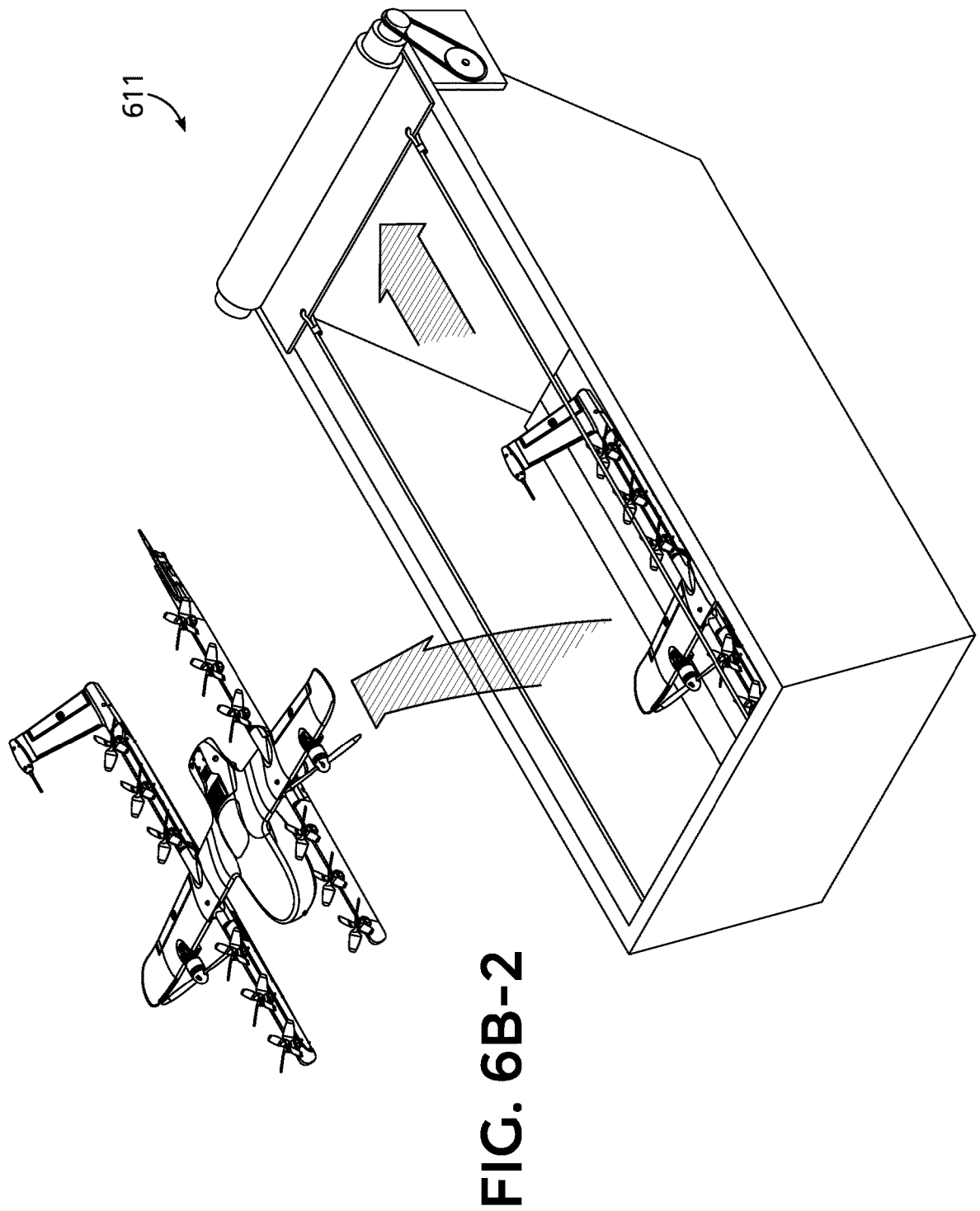
Figures 3, 6B:
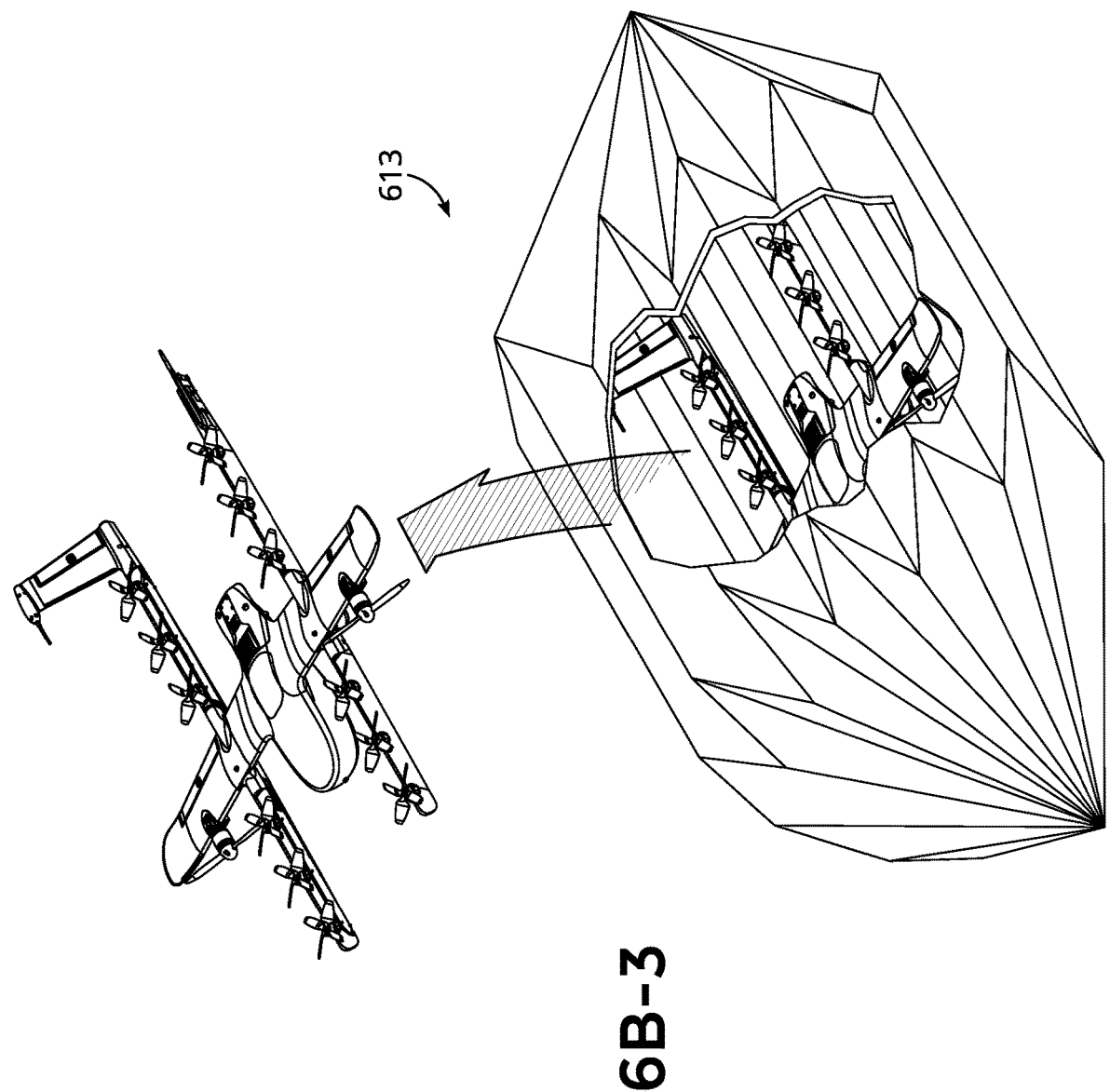
Figure 6B:
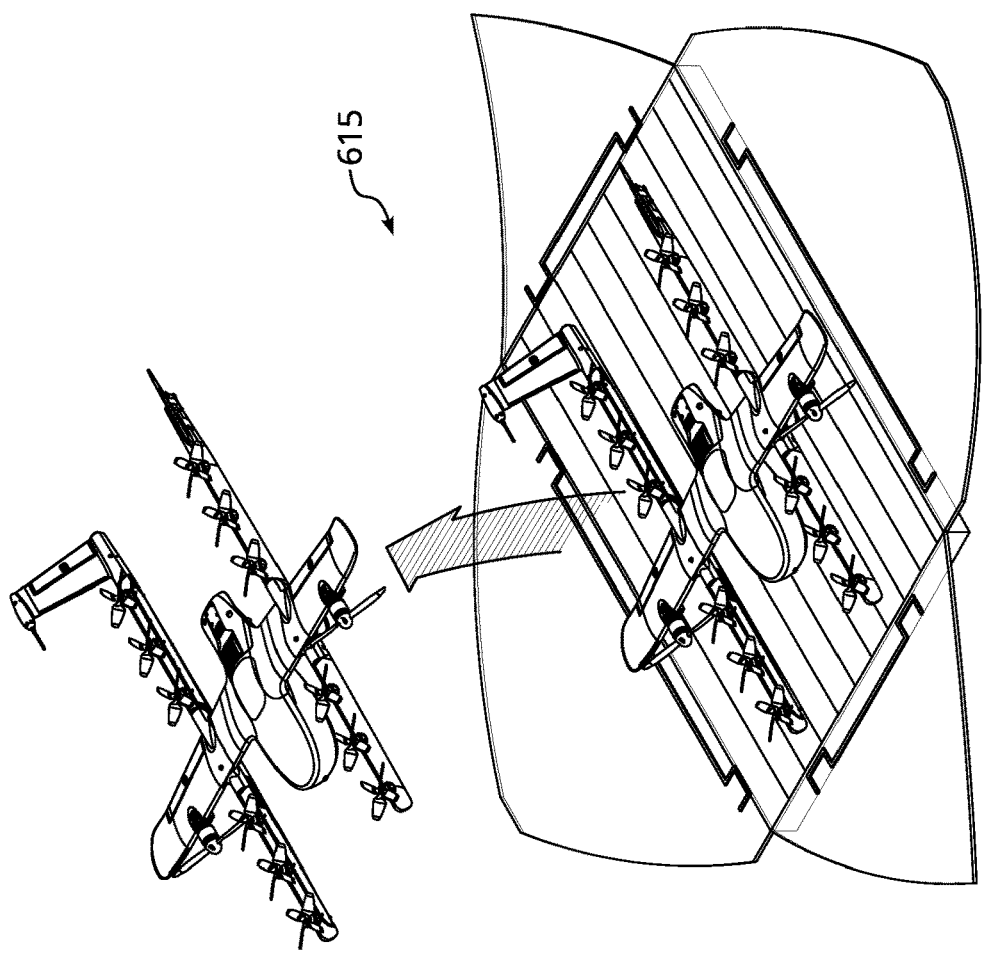
Figure 4:
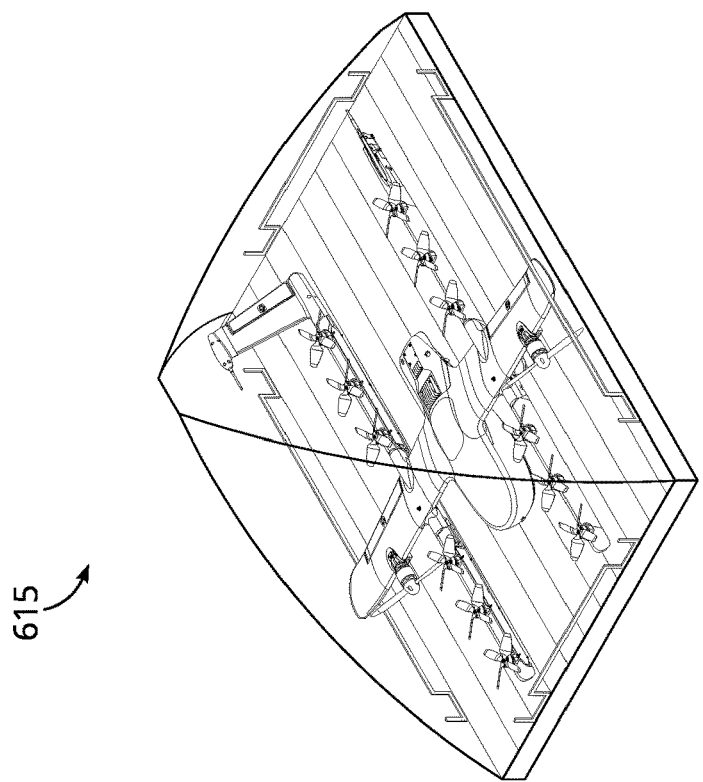
Figure 6C:
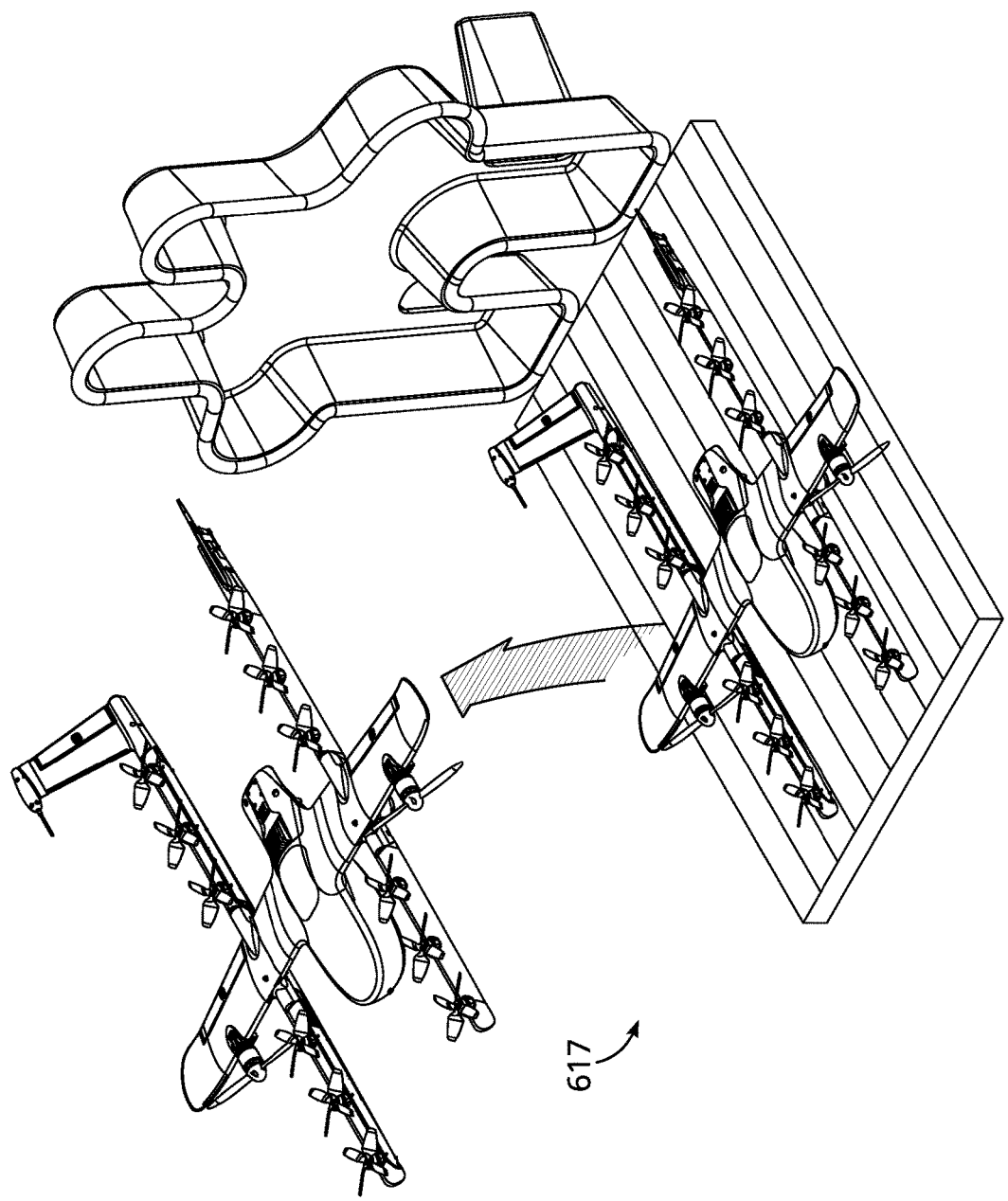

FIGS. 6A-6C illustrate several examples of single-aircraft housing structures, in accordance with an embodiment of the disclosure. As shown in FIG. 6A-1, a first embodiment 601 illustrates a fold open roof structure to enclose the UAV, and the UAV is elevated on a pedestal. The roof is slightly curved so water may run off. The pedestal may include a landing pad as discussed elsewhere herein. As shown in FIG. 6A-2, the second housing structure embodiment 603 has a similar curved roof structure, but the roof may be pulled off, or the sides of the roof may fold under the pedestal to open the top of the roof.

As shown in FIG. 6A-3, the third embodiment 605 of the housing structure depicted shows a retractable folding (origami-like—similar to an accordion) roof structure. The roof is made from a corrugated sheet of material (e.g., plastic or the like) that folds into a small space when retracted. This housing structure may be advantageous because the roof structure can be fabricated from inexpensive materials and is semi-deformable. The roof may be folded back manually or automatically (e.g., the roof is on one or more tracks that cause the roof to retract). This single UAV housing structure may have a relatively small footprint (e.g., 4'×4', which is just slightly larger than the lateral dimensions of a single UAV). As shown in FIG. 6A-4, the housing structure may include a landing pad with charging circuitry and a dedicated power source (e.g., one or more batteries, capacitors, or the like).

The fourth embodiment 607 of the single UAV housing structure depicted in FIG. 6A-4 illustrates a plastic dome that folds down over the UAV via a hinge on one side. The dome may open or close manually or via a motor. The dome may have spring-loaded assistance to reduce stress on the motor. It is appreciated that this embodiment conveys storage advantages, for example, the dome components may be separated from the landing pads and stacked. Moreover, the dome may be made from a transparent polymer or glass in order for operators to see which structures contain an UAV and which are empty.

FIG. 6B illustrates several other embodiments of single UAV housing structures. The first embodiment 609 in FIG. 6B-1 illustrates a housing structure where the landing pad slides out of a box similar to how a shoebox may open. It is appreciated that either the cover or the landing pad may move. This may be achieved by putting the cover or the landing pad on tracks. In the depicted embodiment, the closed housing structure may be substantially rectangular shaped (e.g., a 4'×8' floor plan box).

The second embodiment 611 in FIG. 6B-2 illustrates a single UAV housing structure similar to that of FIG. 2, where a rolling cover is used to cover the UAV. In the depicted embodiment, the sides may be hard while the cover is soft (to permit rolling) or, as stated above in connection with FIG. 2, the cover may be hard segments linked together with flexible segments similar to hard-top rolling truck bed covers. In other embodiments, the sides may be soft as well. The rolling of the cover may be manual or automatic (e.g., a motor coupled to the spool to roll and unroll the over). Unrolling of the cover may be guided with tension wires and the cover may slide along tracks. As depicted, the housing structure may be 4'×5'.

The third embodiment 613 depicted in FIG. 6B-3 illustrates a second origami-type housing structure. Unlike the first origami-style housing structure, the one depicted here does not have a rectangular roof base (the roof base of the embodiment 613 is substantially elliptical). The folding roof structure also folds in a direction perpendicular to the length of the landed UAV (whereas in the other folding embodiment, the roof collapses lengthwise relative to the landed UAV).

The fourth embodiment 615 in FIG. 6B-4 illustrates a "lotus flower" inspired housing structure where four transparent (or opaque in some embodiments) roof segments open from a dome shape to reveal the UAV inside. The roof structure may be a hard shell made from a plastic or the like. This structure when unfolded may have a large footprint (e.g., 7'×7').

FIG. 6C illustrates an additional embodiment 617 of an UAV housing structure. The housing structure depicted is similar to embodiment 607 of FIG. 6A-4; however, the housing structure depicted here is conformal to the shape of the UAV. Thus the roof of the housing takes up as little space as possible since it follows the contours of the UAV disposed within.

Figure 7A:
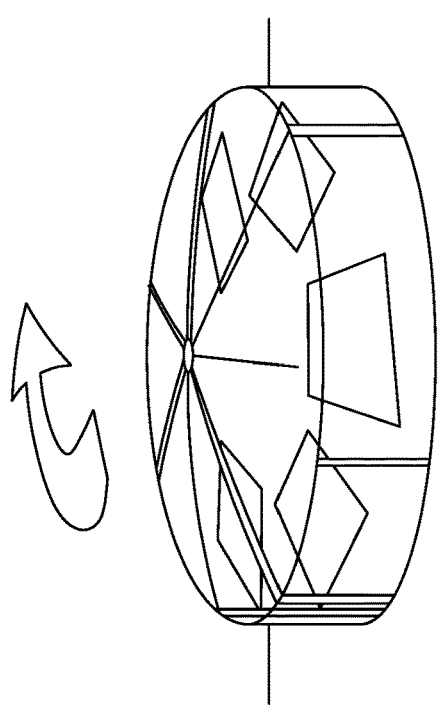
FIGS. 7A and 7B illustrates a radial housing structure, in accordance with an embodiment of the disclosure.
Figure 7B:
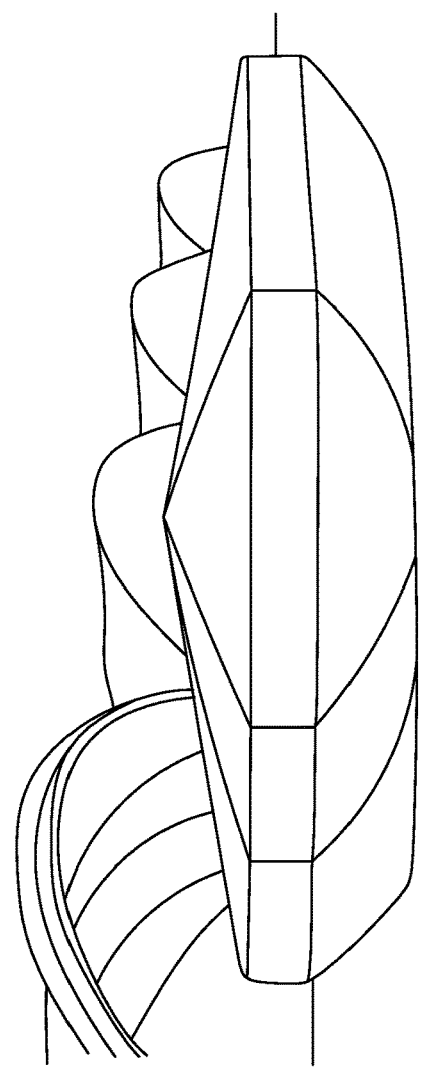

FIGS. 7A and 7B illustrate a radial housing structure, in accordance with an embodiment of the disclosure. In the depicted example, a substantially circular radial cover is positioned to cover all of the landing pads and is held up by a thin metal frame. The cover may be soft-top or hardtop. In some embodiments, the housing structure may be unfolded and assembled like a tent to cover all of the landing pads. The cover may open to expose all of the landing pads simultaneously. Alternatively, only part of the cover may open, and the UAV may fly in through this small opening to their respective pad through the use of fiducials or signals within the housing structure. In some embodiments, the landing pads may be disposed on a rotating platform, where the location that the UAV that is about to take off or land from is rotated to the exposed position. The rotating platform may be controlled by a motor, a controller, and communication logic (e.g., radio WiFi or the like) to communicate with incoming and outgoing UAVs and one or more control stations.

Figure 8:
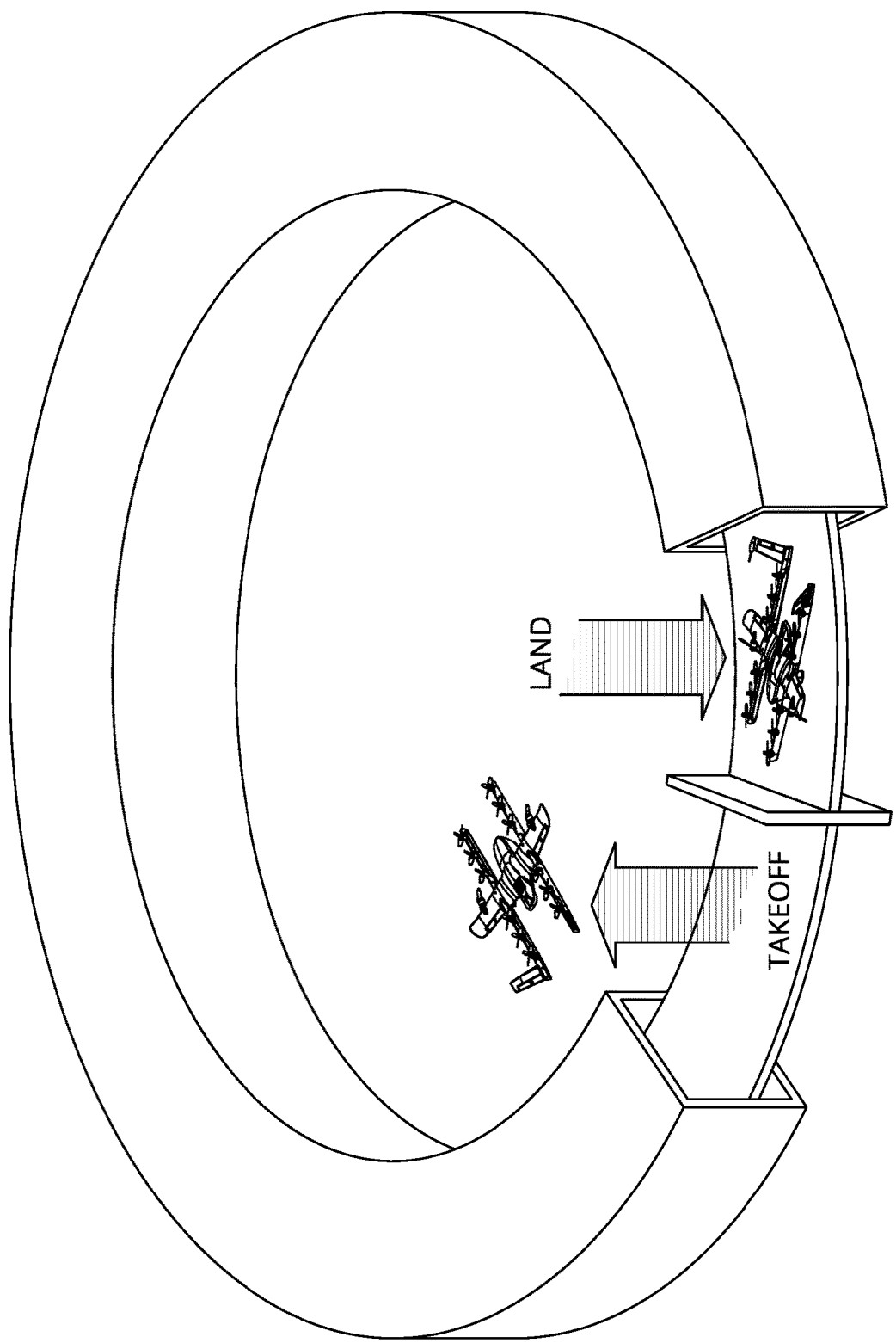
FIG. 8 illustrates a circular housing structure, in accordance with an embodiment of the disclosure.

FIG. 8 illustrates a circular housing structure, in accordance with an embodiment of the disclosure. FIG. 8 is similar to FIG. 7 in that a circular housing structure with possible rotating internals is employed. However, in the depicted example, the UAVs may land, and then a conveyor belt or track of landing pads may be employed to move the UAVs into the housing structure (moving counter clockwise). When an UAV is schedule to take off, the conveyer belt moves the UAV into the takeoff position. After the UAV takes off, the empty charging pad is moved counter clockwise to the landing position to receive an UAV.

Figure 9:
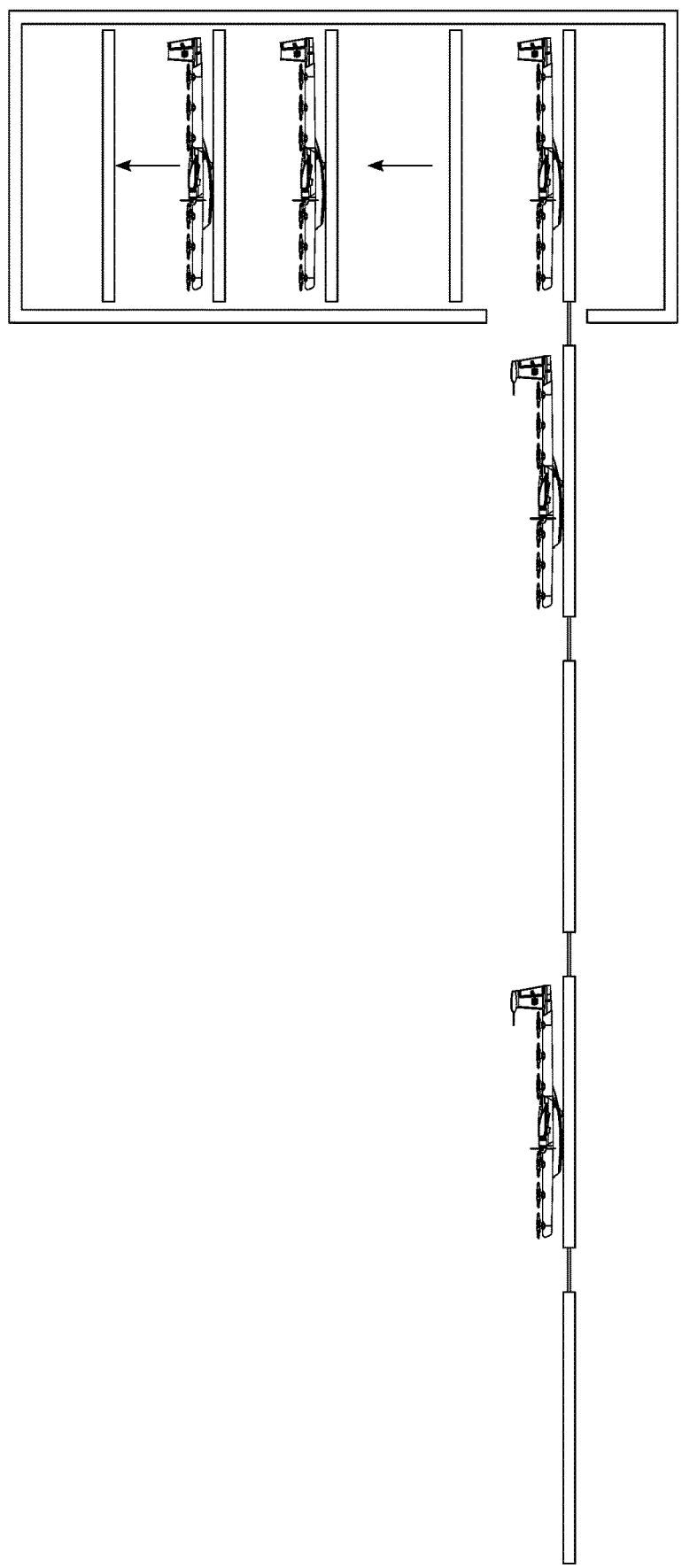
FIG. 9 illustrates "a bottom dealing card deck" housing structure, in accordance with an embodiment of the disclosure.

FIG. 9 illustrates "a bottom dealing card deck" housing structure, in accordance with an embodiment of the disclosure. In the depicted embodiment, landing pads are deployed from the bottom of the housing structure similar to dealing cards from the bottom of a deck. As shown, the landing pads may be connected and slide-out of the bottom of the housing structure on a rail or the like. One advantage of this structure is that a single actuator may be required to deploy and retract aircraft via a cable. Another advantage is that the housing structure may have a very small footprint (e.g., 5'×5').

Figure 10:
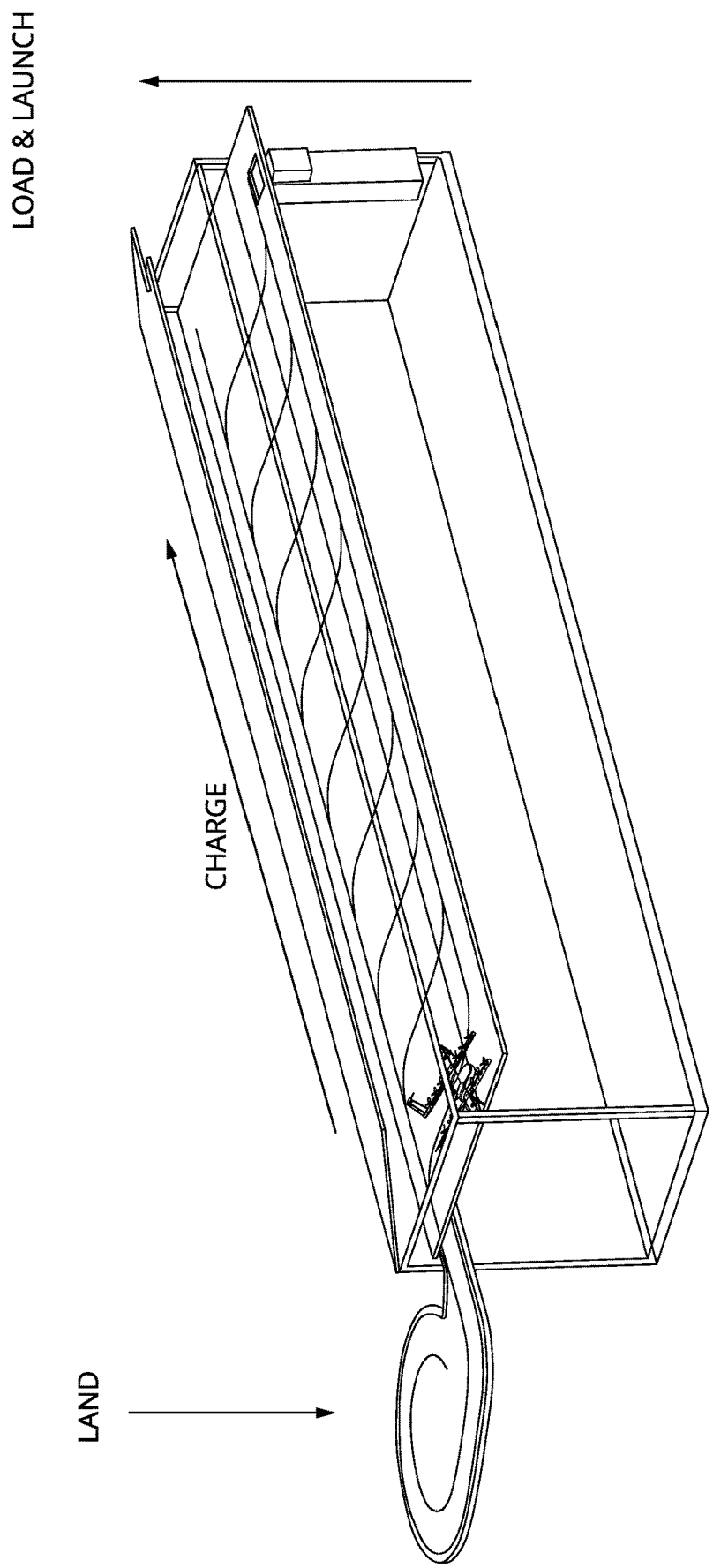
FIG. 10 illustrates a continuous landing, charging, and taking off housing structure, in accordance with an embodiment of the disclosure.

FIG. 10 illustrates a continuous landing, charging, and taking off housing structure, in accordance with an embodiment of the disclosure. In the depicted embodiment, the UAV may land on the landing pad (left), which extends outward from the housing structure. The aircraft may then engage a slot/track where the aircraft is carried (or travels under its own power) along the track to a charging location and/or a package loading location. In some embodiments, when the aircraft engages the track, the aircraft receives charge through a power rail in the track.

Although the depicted embodiment shows a single level housing structure, other embodiments may have multiple levels. Moreover, the roof may include photovoltaic cells to provide at least some of the power to the aircraft with a power rail or other charging mechanism. In some embodiments, the housing structure depicted could be mounted on a vehicle.

Figure 11A:
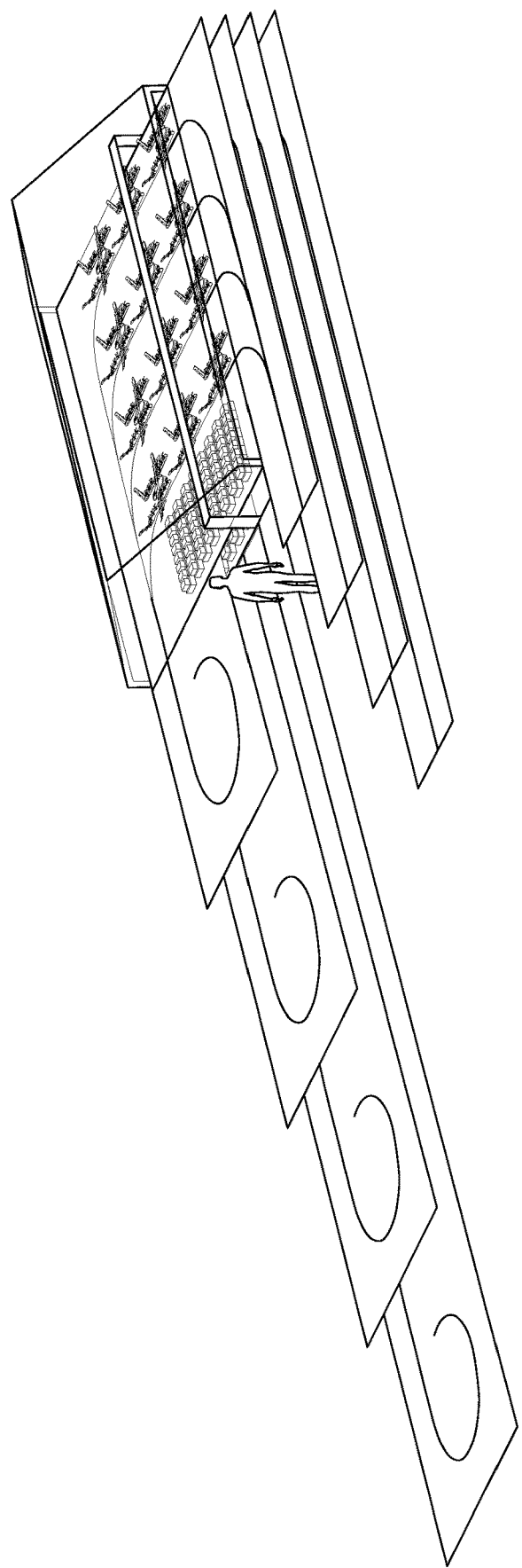
FIGS. 11A and 11B illustrate a housing with a slot taxi and battery swap gantry, in accordance with an embodiment of the disclosure.
Figure 11B:
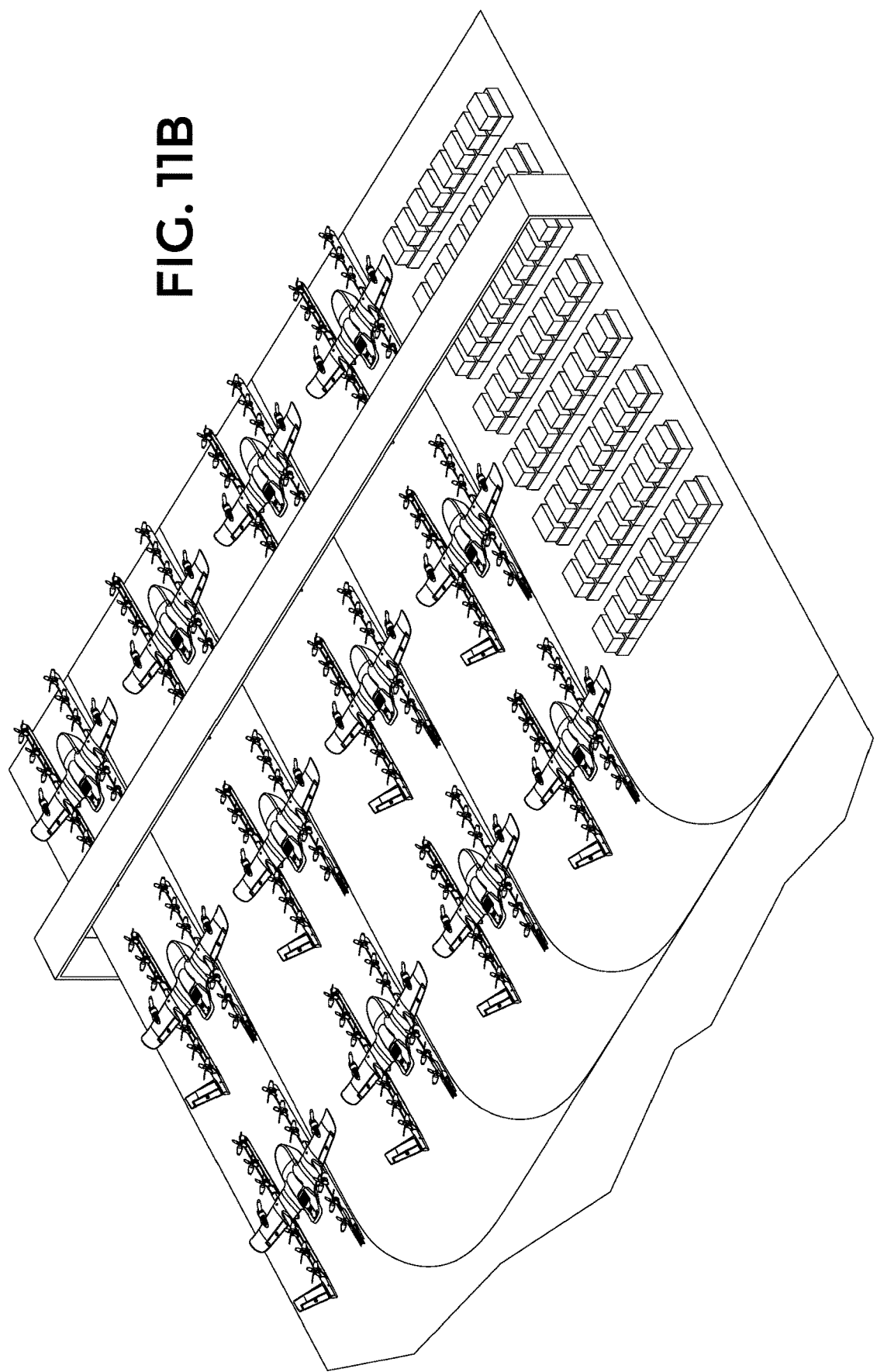

FIGS. 11A and 11B illustrate a housing with a slot taxi and battery swap gantry, in accordance with an embodiment of the disclosure. The embodiment depicted in FIG. 11A is similar to the embodiment depicted in FIG. 10; however, the embodiment depicted in FIG. 11A has multiple levels where the UAVs can land, batteries are exchanged via the gantry, and the UAVs pick up packages. FIG. 11B depicts one level of the embodiment depicted in FIG. 11A. In the depicted embodiment, the UAVs land on the terraced landing pads on the left hand side of the page, and take off from the terraced takeoff points on the right hand side of the page. As shown, between the takeoff and landing points the UAVs may reside on charging stations, or have batteries exchanged from the rows of batteries depicted, or the like. As in other embodiments, the UAVs may be guided to the landing pads, or the landing pads may be marked, with visual, electronic, or magnetic aids (e.g. the UAV magnetically clips to the tracks).

FIGS. 12A-C illustrates a spindle housing, in accordance with an embodiment of the disclosure. As shown in FIG. 12A, the UAVs may land on hoops or another type of landing pad (e.g., the square landing pads depicted elsewhere). An arm may extend down to secure and adjust the UAV in position once it has landed. In the depicted example in FIGS. 12B and 12C, there are multiple tiers of landing pads, and each tier of pads, and individual pads themselves, may be able to rotate separately. As depicted, the UAV may be able to land in the hoop in just about any orientation, and the arm associated with each hoop may adjust the orientation of the UAV after landing. In some embodiments, the pads may be able to move up and down (vertically) on the spindle.

FIGS. 13A and 13B illustrate a spindle housing structure, in accordance with an embodiment of the disclosure. Like the housing structure of FIG. 12A, the housing structure of FIG. 13A shows a spindle with multiple UAVs landing pads. As depicted, the UAV may land on a pad on the rack, and a hollow U-shaped base may hold the UAV in place. A band or the like may be used to hold the UAV in place. Either electrodes or inductive charging may be used to charge the one or more batteries on the UAV.

Figure 14:
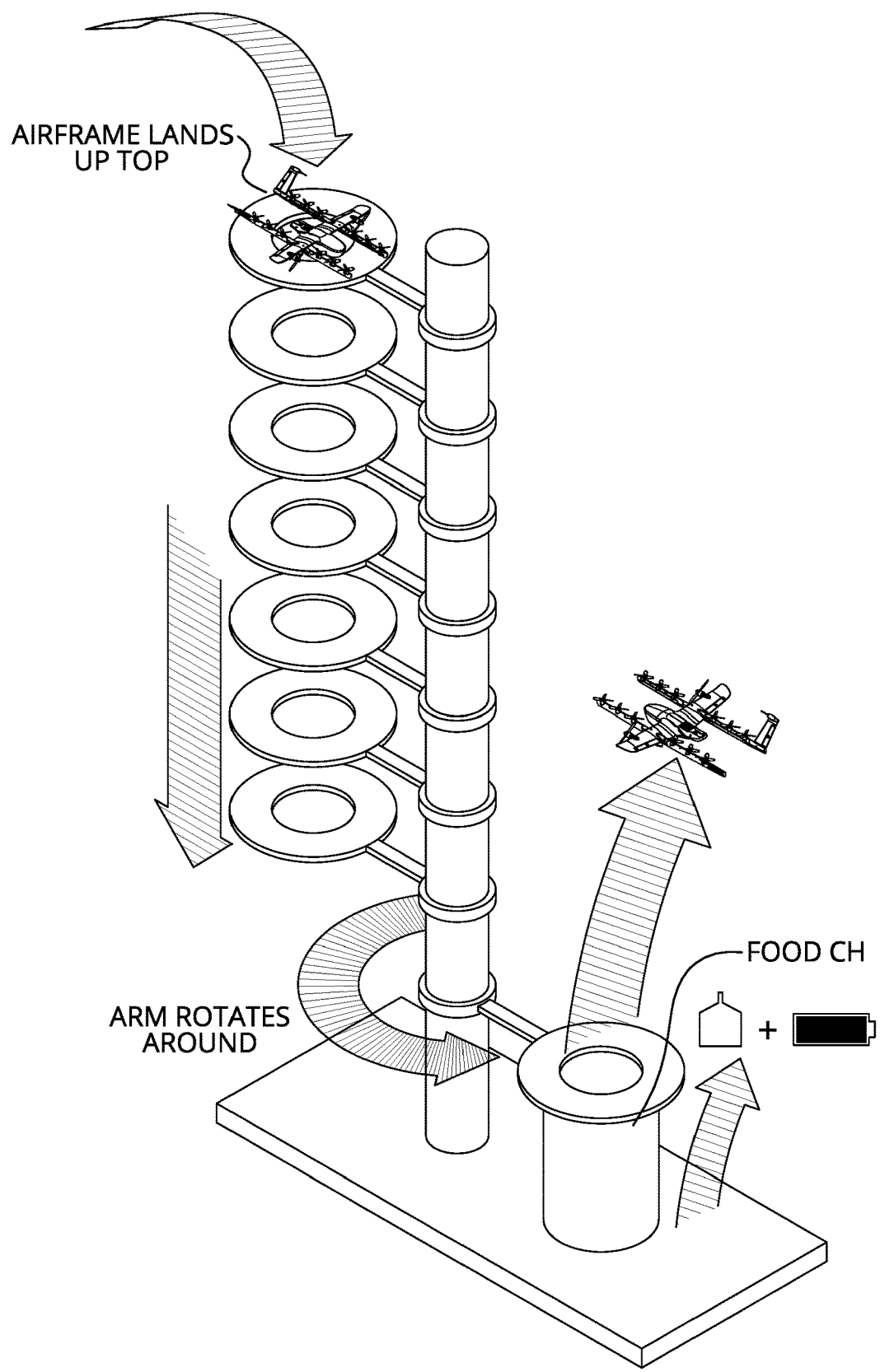
FIG. 14 illustrates a landing and takeoff platform, in accordance with an embodiment of the disclosure.

Once the UAV has landed, the pad may swing to a different side of the spindle to get the UAV away from the landing zone. An operator (e.g., a human or a robotic arm) may attach a package (including a magnetic tape) to the underside of the UAV. As shown in FIG. 13B, the package may be held to the UAV by the tape due to magnetic force between the tape and UAV. For example, there may be electromagnetic coils in or on the UAV that interact with the tape to hold the package in place. After the package is attached to the UAV, the landing pad may be raised and rotated into a launch position for package delivery FIG. 14 illustrates a landing and takeoff platform, in accordance with an embodiment of the disclosure. In the depicted example, a landing pad is positioned at the top of a spindle (e.g., to avoid having the UAV crash into people and things at ground level). Once the UAV lands on the landing pad, the landing pad extends down the spindle and then rotates to a charging and package pickup station. The charging station may rapidly recharge the UAV, or replace the battery as a package is attached to the underside of the UAV. Once the UAV receives the package and is sufficiently charged (e.g., above a threshold charge to complete the delivery), the UAV may take off from the charging positon. The empty charging pad may then be returned to the top of the spindle to receive another UAV. In some embodiments, there may be a plurality of charging pads per spindle, and as the landing/charging pads descend on the spindle they deliver charge to the UAVs.

FIGS. 15A-D illustrate modular housing structures 1500 with retractable charging pads, in accordance with an embodiment of the disclosure.

Figure 15A:
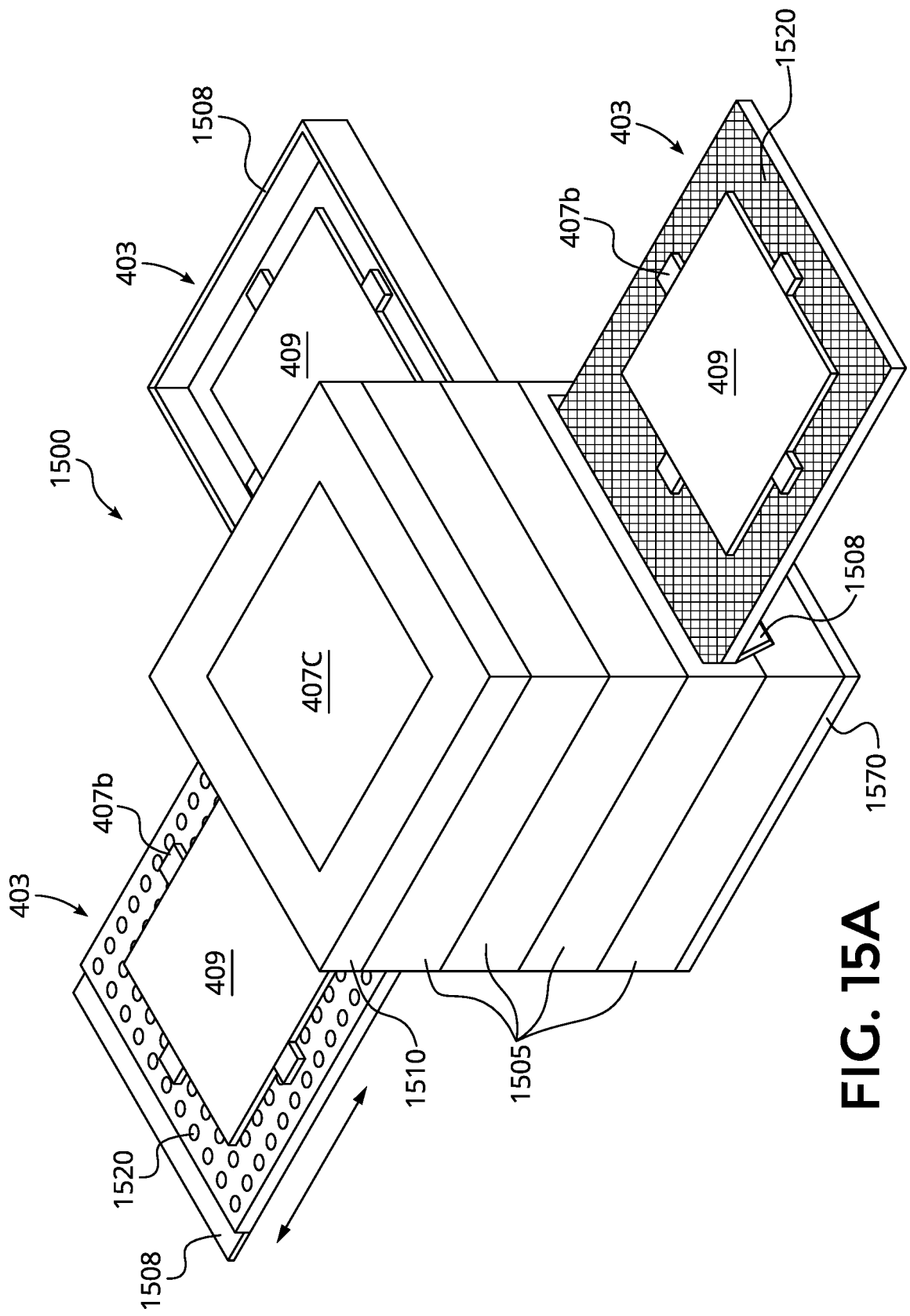

FIG. 15A illustrates a modular housing structure 1500, in accordance with an embodiment of the disclosure. FIG. 15A depicts a plurality of modular housing sections 1505 stacked with a capping structure 1510 on top to form a modular housing structure 1500, which may be used with any of the structures disclosed herein. The modular housing structure 1500 may also include third navigational aids 407c. Each of the stacked modular housing sections 1505 may include a landing pad 403, with charging circuitry 409, and second navigational aids 407b. The landing pads 403 may also include airflow openings 1520. In some example embodiments, the modular housing structure 1500 includes a base structure 1570.

The modular housing sections 1505 are stackable such that the modular housing structure 1500 supports a scalable number of the UAVs based on a number of modular housing sections 1505 vertically stacked on each other at a time. Restated, the modular housing sections 1505 are stackable on each other to form a modular housing structure 1500. Any number of modular housing sections 1505 may be stacked.

The landing pads 403 may be mechanically actuated to extend from an interior of a given modular housing section 1505 to receive and deploy the UAV and withdraw or retract into the interior to shelter the UAV from weather. The individual modular housing section 1505 may have a door 1508 which opens when the landing pad is mechanically actuated to extend from the interior of the modular housing section 1505, and closes when the landing pad is mechanically actuated to withdraw into the interior of the modular housing section 1505. Alternatively, the door 1508 may be attached to the landing pad 403 such that when the landing pad 403 is mechanically actuated the door moves with the landing pad 403. The door 1508 may fold down when the landing pad 403 is extended from the interior of the modular housing section 1505 or may remain upright.

The landing pads 403 may be actuated by an electric motor (not shown). Each modular housing section 1505 may have an electric motor. Alternatively, the modular housing structure 1500 may have an electric motor with mechanical energy transfer mechanisms (such as chains, gears, drive rods, etc.) connected to each of the modular housing sections 1505.

The landing pads 403 may extend in any direction from the modular housing structure 1500. A first portion of the modular housing sections 1505 may actuate the landing pad 403 out a first side of the modular housing structure 1500 and a second portion of the modular housing sections 1505 may actuate the landing pad 403 out a second side of the modular housing structure 1500 different from the first side.

In some locations, such as on an open rooftop, it may be useful to have the landing pads 403 extend in all directions from the modular housing structure 1500 to increase the number of UAVs that may enter and exit the modular housing structure 1500 at any given time from different approach angles. In other environments, such as near a wall or other obstacle, it may be advantageous to have the landing pads 403 only extend in one or two directions to avoid the obstacles or more efficiently use limited space.

When a landing pad 403 is within the interior of the modular housing section 1505, an exterior of the modular housing section 1505 along with the door may enclose a UAV on the landing pad 403 to protect the UAV from weather or from being stolen. Restated, the modular housing structure 1500 may enclose and protect the landing pad 403 and a UAV on the landing pad 403 when the landing pad 403 is within the interior of the modular housing section 1505.

The airflow openings 1520 in the landing pads 403 may come in several forms. For example, the landing pad 403 may include portions of a grating or a mesh that define the airflow openings 1520 between the grating or mesh material. Alternatively, the airflow openings 1520 may be holes in the landing pad 403. As another alternative the airflow openings 1520 may be gaps or ducting between the landing pad 403 and the sidewall structure of the modular housing sections 1505.

The depicted embodiment is a case where charging pads may slide-out from the sides of the structure on tracks. The UAVs are pulled into the housing structure 1500 for safe storage. The landing pads 403 may slide-out of the modular housing structure 1505 in response to an UAV landing or departure being requested from either the UAV or a control server. As described below, the electronics to communicate with the UAV and extend and retract the pads may be enclosed in the modular housing structure 1500.

The base structure 1570 may encase the bottom side of the lower most of the modular housing sections 1505. The base structure 1570 may serve as a stable platform for the modular housing structure 1500. The base structure may also act to prevent moisture from entering and the climate controlled air from leaving the modular housing structure 1500.

Figure 15B:
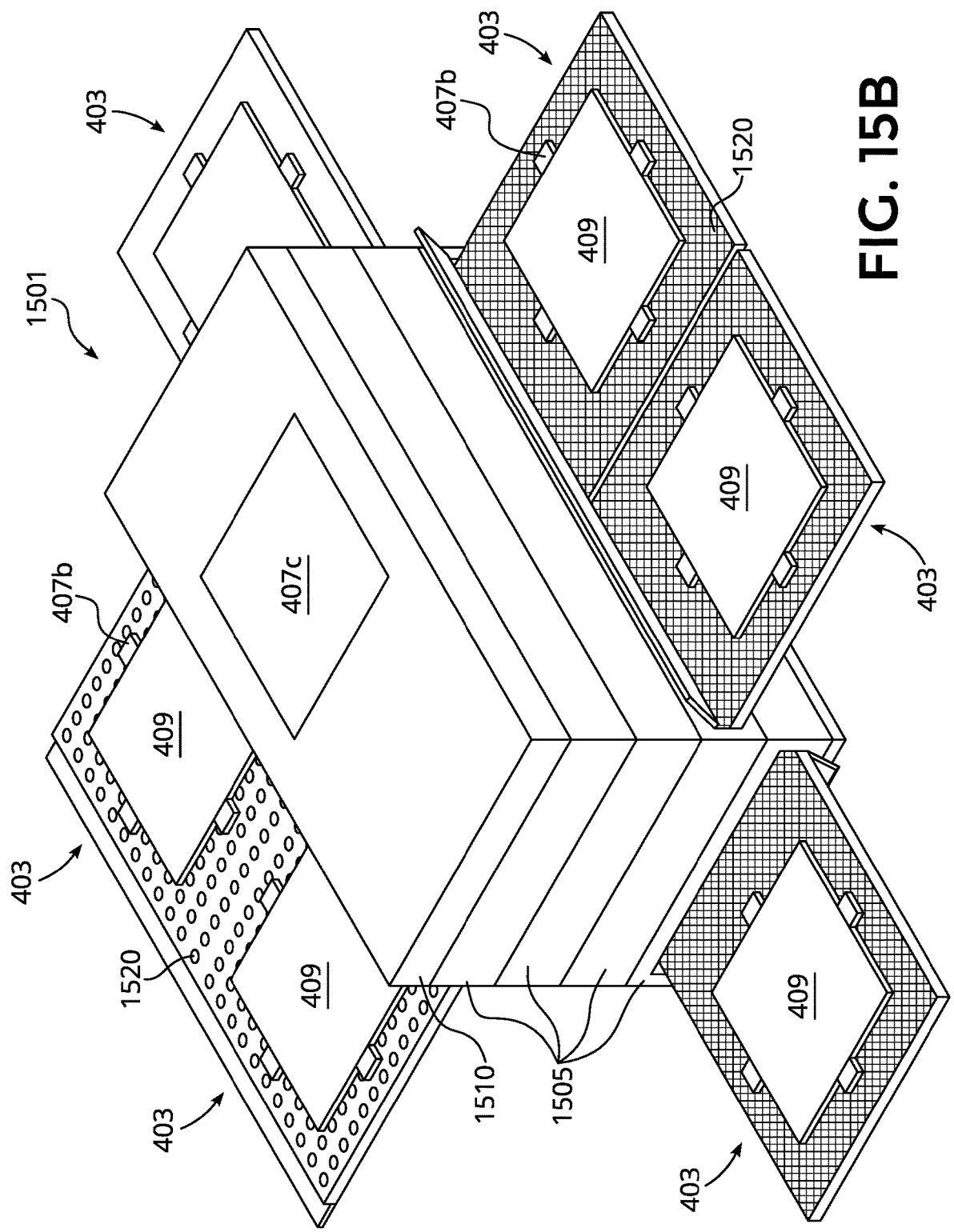

FIG. 15B illustrates a modular housing structure 1501 similar to the modular housing structure 1500 of FIG. 15A, except that the modular housing structure 1501 has two landing pads 403 side by side within each modular housing section 1505. In the modular housing structure of FIG. 15B the landing pads 403 are arranged in a 2×1 pattern. However, other patterns are also possible, such as 2×2 or 3×1.

The landing pads 403 which are side by side when in an interior of the modular housing section 1505 may be connected such that the landing pads 403 are mechanically actuated together. In other embodiments, the side-by-side landing pads 403 may be disconnected such that the landing pads 403 are mechanically actuated separately. Further, the landing pads 403 which are side-by-side when in an interior of the modular housing section 1505 may be mechanically actuated in different directions from each other such that the landing pads 403 are not side-by-side when they are extended from the interior of the modular housing section 1505. Restated, each modular housing section 1505 may include multiple landing pads 403, which may or may not be connected and may or may not be mechanically actuated together.

FIG. 15C illustrates a modular housing structure 1502 similar to the modular housing structure 1501 of FIG. 15B. In FIG. 15C the side-by-side landing pads 403 are on a track 1580 which runs perpendicular to the direction in which the landing pads 403 are side by side. The side-by-side landing pads 403 are connected such that the landing pads 403 are mechanically actuated together in the direction perpendicular to the direction in which the landing pads 403 are side by side.

Figure 15D:
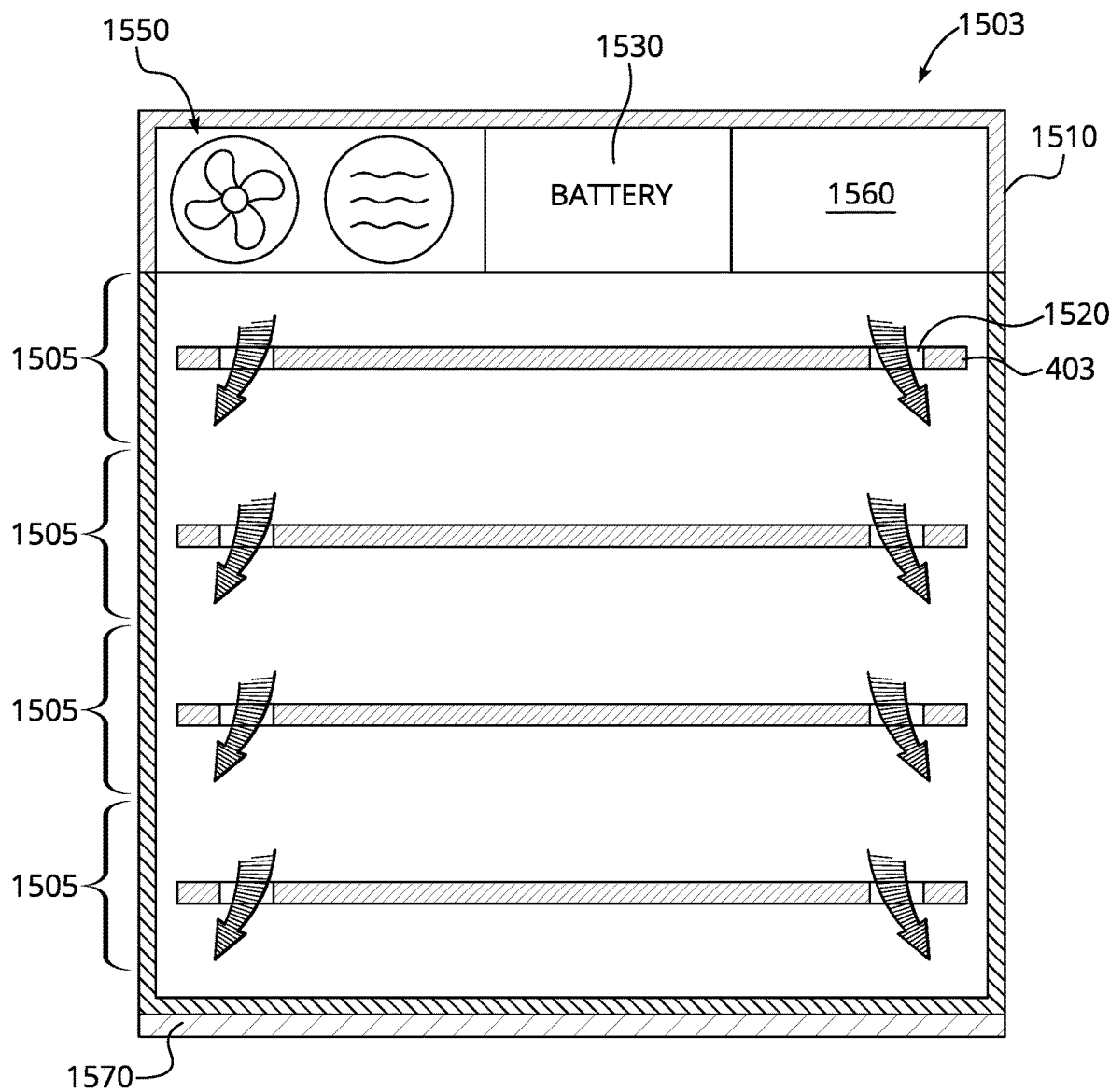

FIG. 15D illustrates the interior of the modular housing structure 1503 and also the airflow within the modular housing structure 1503. Modular housing structure 1503 represents one possible interior implementation of modular housing structures 1500, 1501 or 1502. The modular housing structure 1503 includes a climate controller 1550, a communication controller 1560, and optionally a battery 1530 in the capping structure 1510. These elements may alternatively be placed in the base structure 1570. The battery may be replaced by a connection to an outside power source such as an electrical grid, a generator, or another electric power source. The interior of the modular housing structure 1503 may also include landing pads 403 which define airflow openings 1520.

The climate controller 1550 may include at least one of a heater, a fan, an air conditioning unit, or a dehumidifier. The climate controller 1550 may control the air temperature using the heater and air conditioning unit. The climate controller 1550 may control the humidity within the modular housing structure 1503 using the dehumidifier. The fan may assist the heater, air conditioning unit and dehumidifier in controlling the climate throughout the modular housing structure 1503 by circulating the air within the modular housing structure. Accordingly, the climate controller 1550 may keep the UAVs operational by preventing the UAVs from having overheating, icing, or other climate related problems. The airflow openings 1520 allow the climate controller 1550 to more easily control the climate within the interior of the modular housing structure 1500 by allowing air to flow from the climate controller 1550 to each of the modular housing segments 1505.

The structure of the modular housing structure 1503 may also shelter the UAVs from wind, rain, snow, etc. and keep the climate controlled within the modular housing structure 1503. In this way, the modular housing structure 1503 may shelter the UAVs in the interior of the modular housing structure 1503 from weather and efficiently control the climate in the modular housing structure 1503.

The modular housing structures of FIGS. 15A-D are active housing structures that may communicate with the UAVs directly or indirectly. For example, the housing structure may use Wi-Fi or another Wireless Local Area Network ("WLAN") to communicate with the UAVs to facilitate the landing and storage of the UAVs in the modular housing structure. As another example, the modular housing structure may communicate via a control server over a wireless network to which the UAVs are connected. Restated, the UAVs or a control server may communicate with the modular housing structure (directly or indirectly) in order to request mechanical actuation of the landing pads 403 to facilitate landing or take off for the UAVs.

The communication controller 1560 may communicate with the UAVs and control the operations of the modular housing structure 1503. The communication controller 1560 may communicate with the UAV directly or indirectly. The communication controller 1560 may operate based on its communications with the UAV or may operate based on commands from a control server. For example, the communication controller 1560 may communicate with the UAV to determine that the UAV requesting to be stored in the modular housing structure 1503.

The communication controller 1560 may assign the UAV to one of the landing pads 403 and then cause the assigned landing pad 403 to be mechanically actuated to the exterior of the modular housing structure 1503. Once the communication controller 1560 senses that the UAV has landed on the landing pad 403 (such as by sensing that charging has commenced or by a detected change in weight of the landing pad), the communication controller 1560 may then cause the landing pad 403 to be mechanically actuated to an interior of the modular housing structure 1503. Alternatively, the communication controller 1560 may mechanically actuate the landing pad to an interior of the modular housing structure 1503 based on a communication form the UAV that the UAV has landed. As another example, the communication controller 1560 may receive a communication from the communication server indicating that a UAV stored in modular housing structure 1503 is to take off and the communication controller 1560 may cause the associated landing pad 403 to be mechanically actuated to an exterior of the modular housing structure 1503 such that the UAV may take off.

The communications controller 1560 may control an electric motor in order to mechanically actuate the landing pad 403. The communication controller 1560 may also control the climate controller 1550 to control the climate in the modular housing structure 1500 to cool or heat the UAV based on a sensed temperature of the UAV, a communication from the UAV indicating a temperature of the UAV, or received weather information. For example, the communication controller 1560 may receive weather information from the control server that the weather is below freezing and snowing and based on this weather information control the climate controller 1550 to deice a recently arrived UAV.

Photovoltaic devices may be disposed on the top of the structure to charge the UAVs contained within. Additionally, the battery 1530 may store power from the photovoltaic device. The communication controller 1560 may include communication electronics for communicating via Wi-Fi, radio, RFID, Bluetooth, or the like.

Figure 16A:
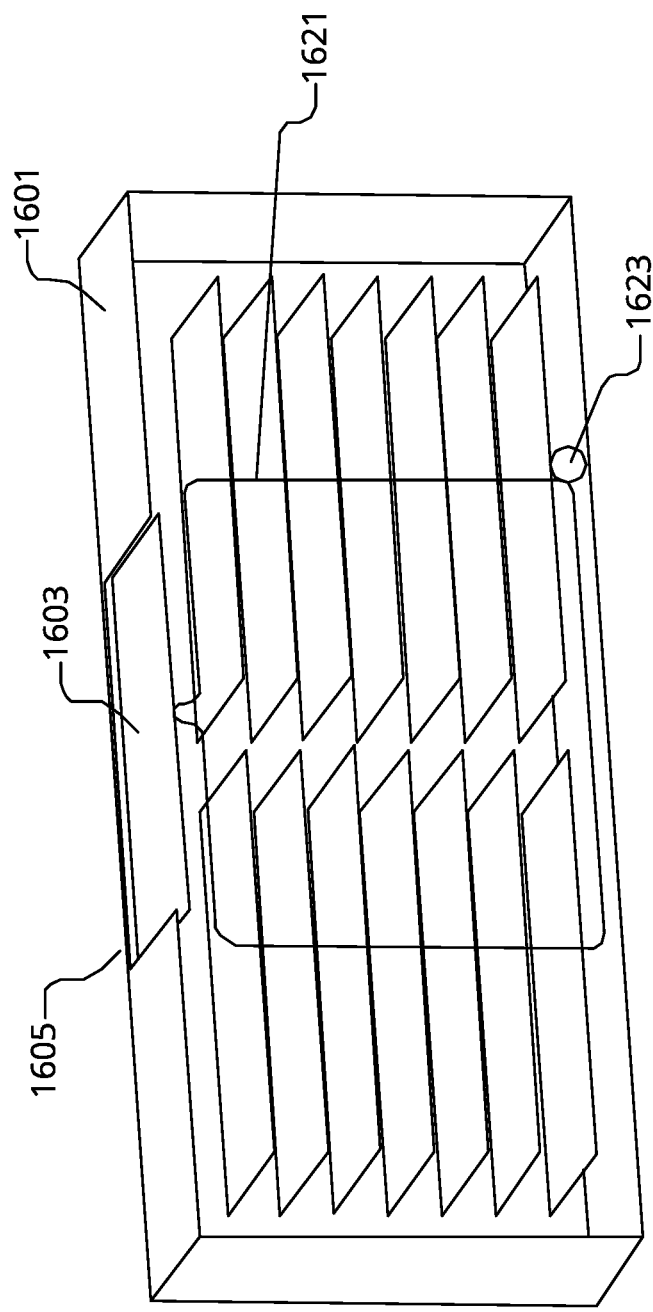

FIGS. 16A-16C illustrate rotating charging pads in a housing structure, in accordance with an embodiment of the disclosure. FIG. 16A shows a large rectangular receptacle 1601 with a plurality of landing pads 1603 disposed within which are sized and spaced to hold UAVs. As shown, rectangular receptacle 1601 has an opening 1605 in the top where UAVs can land and takeoff from. As shown, track 1621 is at least partially disposed within an interior of receptacle 1601. Motor 1623 is mechanically coupled to move one or more landing pads 1603 along track 1621 from inside receptacle 1601 to a takeoff and landing position (top), where the one or more UAVs land on the one or more landing pads 1603 from the takeoff and landing position.

In the depicted example, one or more landing pads 1603 are configured to mechanically couple to track 1621, to move one or more landing pads 1603 along the track. As shown, landing pads 1603 may include clasps to grasp onto a cable or chain (e.g., a tow line). Motor 1623 may be mechanically coupled to move the towline.

FIG. 16B depicts another embodiment of the housing structure. The housing structure in FIG. 16B has many of the same components as the housing structure in FIG. 16A. However, the structure in FIG. 16B includes a bypass structure 1625 disposed within receptacle 1601, where bypass structure 1625 is positioned along the track 1621 to prevent individual landing pads 1603 in the plurality of landing pads 1603 from being moved into the takeoff and landing position (top), when the one or more landing pads 1603 are moved along the track 1621. Put another way, the bypass structure may redirect pads from making it to the takeoff and landing position. This way pads with a UAV on them do not get moved into the takeoff position when an UAV is landing. Further, pads without an UAV on them do not get moved into the takeoff positon when an UAV needs to take off. The bypass system may route the landing pad onto a secondary track (similar to a train). Thus, track 1621 is one of a plurality of tracks at least partially disposed within an interior of receptacle 1601. In some embodiments, the landing pad may clip onto another cable to be pulled onto the secondary track. This functionality may be governed by a controller (e.g., controller 1631) that is informed by other components when UAVs need to land/takeoff. Put another way, the controller including logic that when executed by the controller causes the controller to perform operations including determining if an individual landing pad 1603 in the plurality of landing pads 1603 is occupied by the one or more automated aircraft. Then, based on determining if the individual landing pad 1603 is occupied, the controller may use the bypass structure 1625 to prevent the individual landing pad from being moved into the takeoff and landing position.

FIG. 16C illustrates the interior of a housing structure, like the other embodiments, individual landing pads 1603 are coupled to be moved on a track 1621 by motor 1623. Motor 1623 is coupled to controller 1631, communication system 1633 (e.g., to receive wired or wireless communication form the internet, radio sources or the like), and power supply 1635.

Controller 1631 is also electrically coupled to thermostat/thermometer 1627. Thermostat 1627 is positioned to measure a temperature of the interior of the receptacle 1601. Heating system 1641 (e.g., a thermoelectric heater, resistive heater or the like) is electrically coupled to controller 1631 and positioned to supply heat to the interior of the receptacle 1601. Cooling system 1643 (e.g., thermoelectric cooler) is electrically coupled to controller 1631 and posited to remove heat from the interior of the receptacle 1601. In response to thermostat 1627 measuring a first temperature that is greater than a first threshold temperature (e.g., >40° C.), thermostat 1627 activates cooling system 1643, and in response to thermostat 1627 measuring a second temperature that is less than a second threshold temperature (e.g., <5° C.), thermostat 1627 activates heating system 1641. This may keep UAVs electronics from overheating/cooling.

FIG. 17 illustrates a static wire charging station, in accordance with an embodiment of the disclosure. In the depicted example, one or more UAVs may land or be placed on charged wires strung between posts within the body of the housing structure. In the depicted example, the UAVs have conductive hooks to engage the wires (to charge the batteries) and hold the UAV in place. The roof of the housing structure may be a retractable awning made from fabric, plastic, or the like. Charging of the UAVs on the wires may be achieved with 24V DC power supply. In the depicted embodiment, 1-4 aircraft may hang from wires in an 8' housing structure. Additionally, a single 115 V AC outlet may be provided for charging, awning extension/retraction, infrared navigation, and communication with the UAV.

Figure 18:
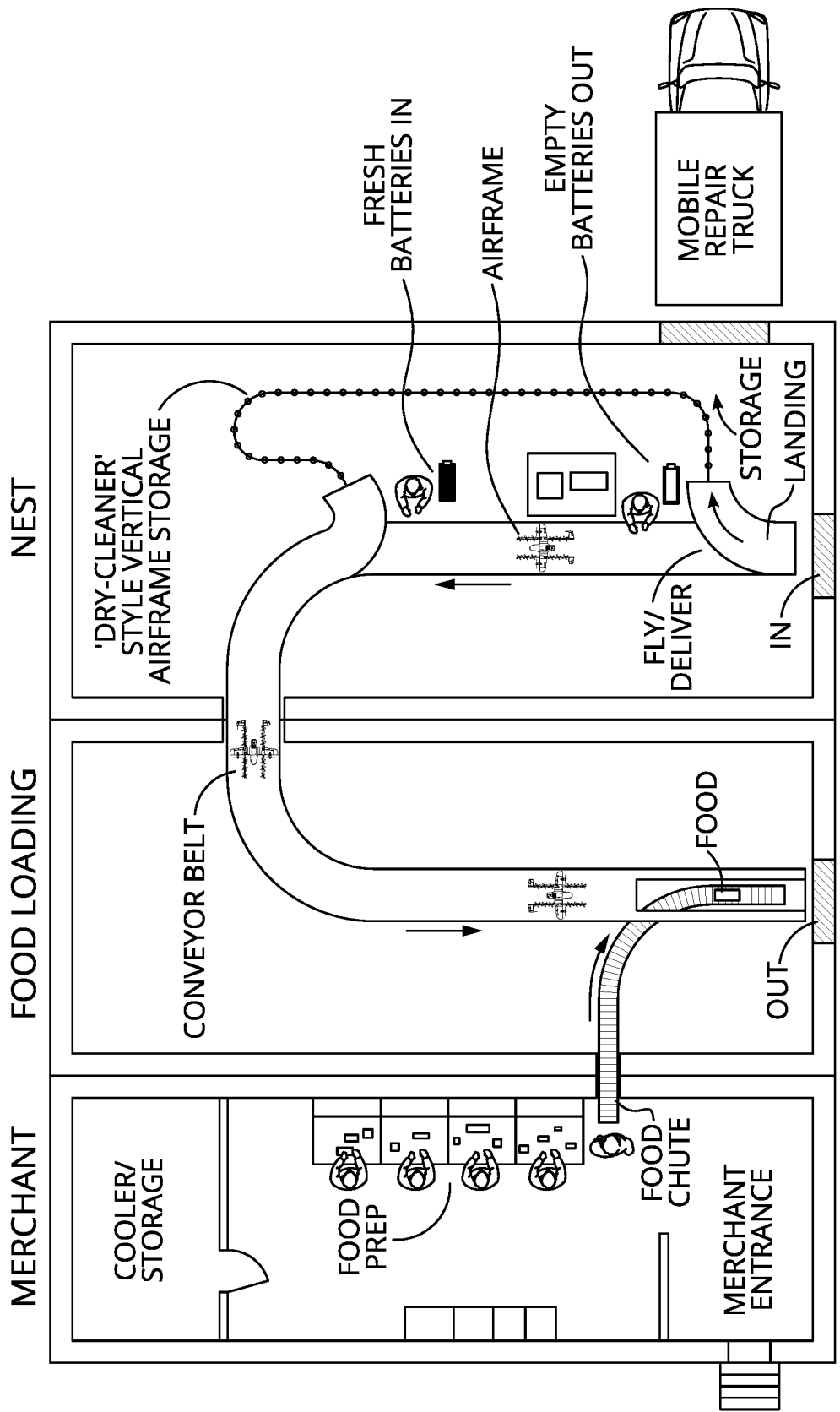
FIG. 18 illustrates a warehouse-based automated aircraft "nest", in accordance with an embodiment of the disclosure.

FIG. 18 illustrates a warehouse-based unmanned aerial vehicle (UAV) "nest", in accordance with an embodiment of the disclosure. As depicted, the warehouse based housing structure may have fly-in UAV functionality (e.g., through an opening in the building or the like). Guidance systems, described in association with other embodiments disclosed herein, may be used for UAVs to navigate into the building. After entering, the UAVs may be placed on a track or conveyor belt where some are diverted to storage, charging stations, or maintenance, and others (if they still have sufficient charge to complete a delivery) are rerouted to package pickup.

In the embodiment depicted, the warehouse is divided into three sections, a first section for UAV landing, a second section for UAV package loading and departure, and a third section for package prep (e.g., food prep if the package contains food). Prepared packages may be placed on a conveyor belt or track and moved to the UAV loading/departure zone. After the UAV is loaded, it may leave through one or more holes in the housing structure. The one or more holes/windows in the structure may have doors that are automated to open/close with an UAV departure or landing.

It is appreciated that the housing structure may include advanced computer systems (e.g., processors, memory, power supplies, and the like) to control the large number of UAVs flowing in and out of the warehouse. For example, the computer may communicate with incoming UAV to determine the charge level of the battery and assign the UAV a mission based on the charge level. The conveyor system may similarly be controlled with one or more computer systems coupled to motors and the like.

Figure 19:
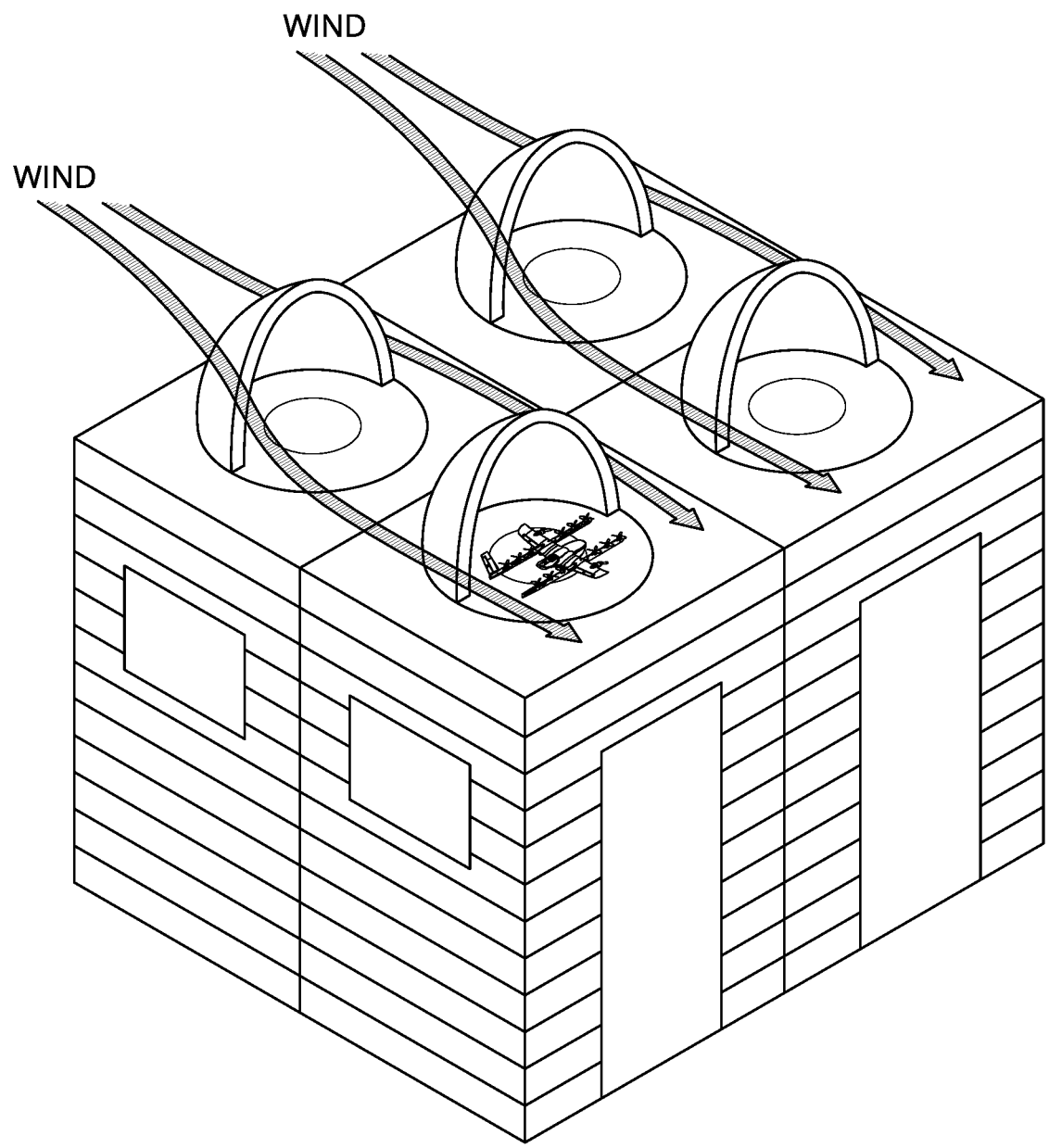
FIG. 19 illustrates wind reduction housing and landing structures, in accordance with an embodiment of the disclosure.

FIG. 19 illustrates wind reduction housing structures, in accordance with an embodiment of the disclosure. In the depicted example, the housing structure roofs are shells that are substantially quarter-spherical. The shells have landing pads disposed at least in part under the roof of the structure. The roof of the structure rotates (either passively or with controlled motorization) to block the UAVs from the wind. This way UAVs do not blow away while on the landing pads. Here the landing pads may be intermediary landing pads disposed on the top of a building or the like. This way if a mission end point is very far away (outside the maximum range of the UAV) the UAV can stop to charge at a midpoint or on its way back from completing a mission.

Alternatively or additionally, instead of having a landing pad in the shelter of the quarter-sphere roof structure, the area under the shelter could be an ingress point into a housing structure (e.g., the building depicted here). Thus, as the UAV approaches the building, it does not get knocked into the side of the building or the like due to wind while the UAV is trying to enter the housing structure since the shelter shields the UAV.

Figure 20A:
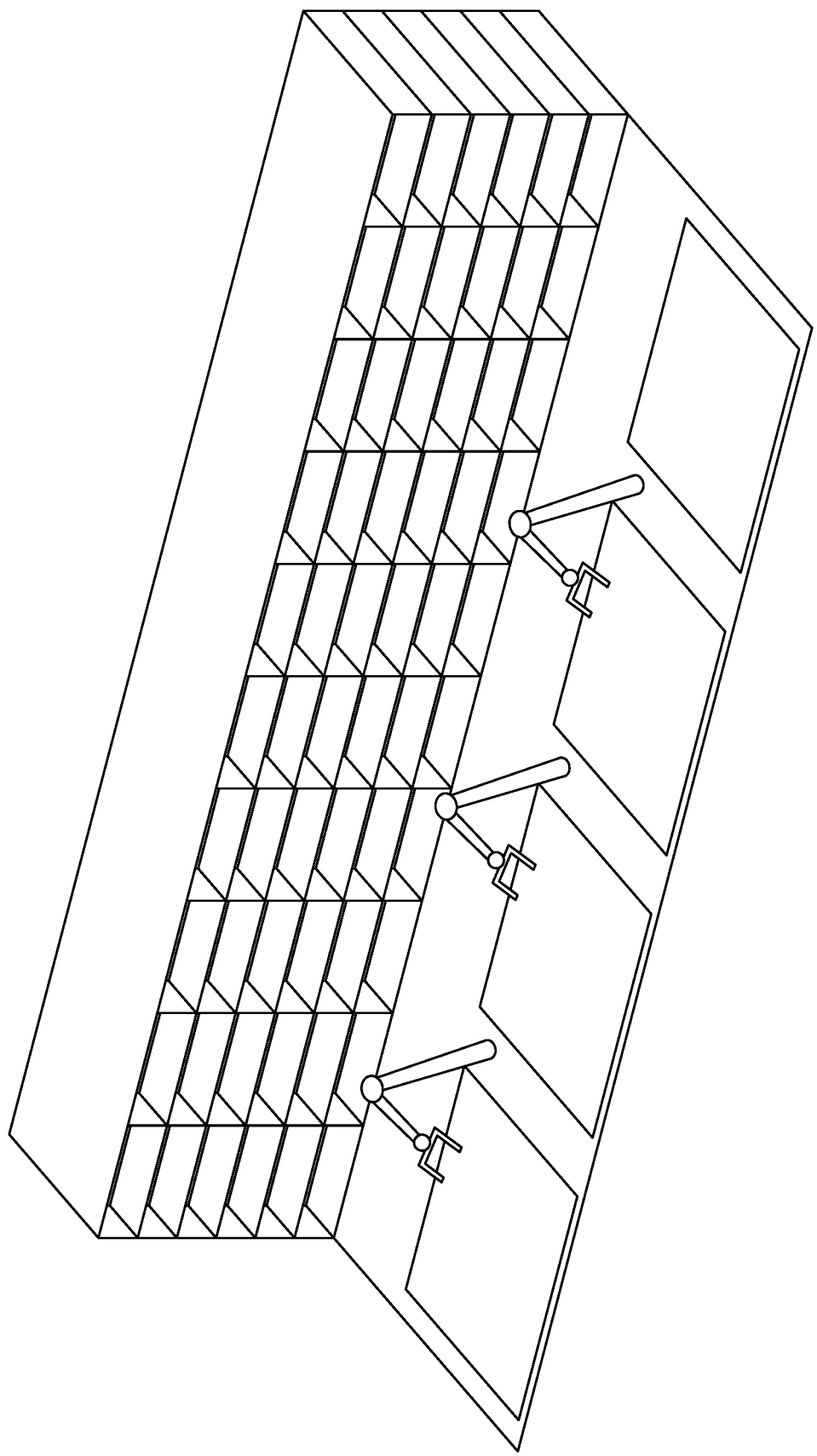
FIGS. 20A and 20B illustrate systems for automated aircraft handling and storage, in accordance with embodiments of the disclosure.
Figure 20B:
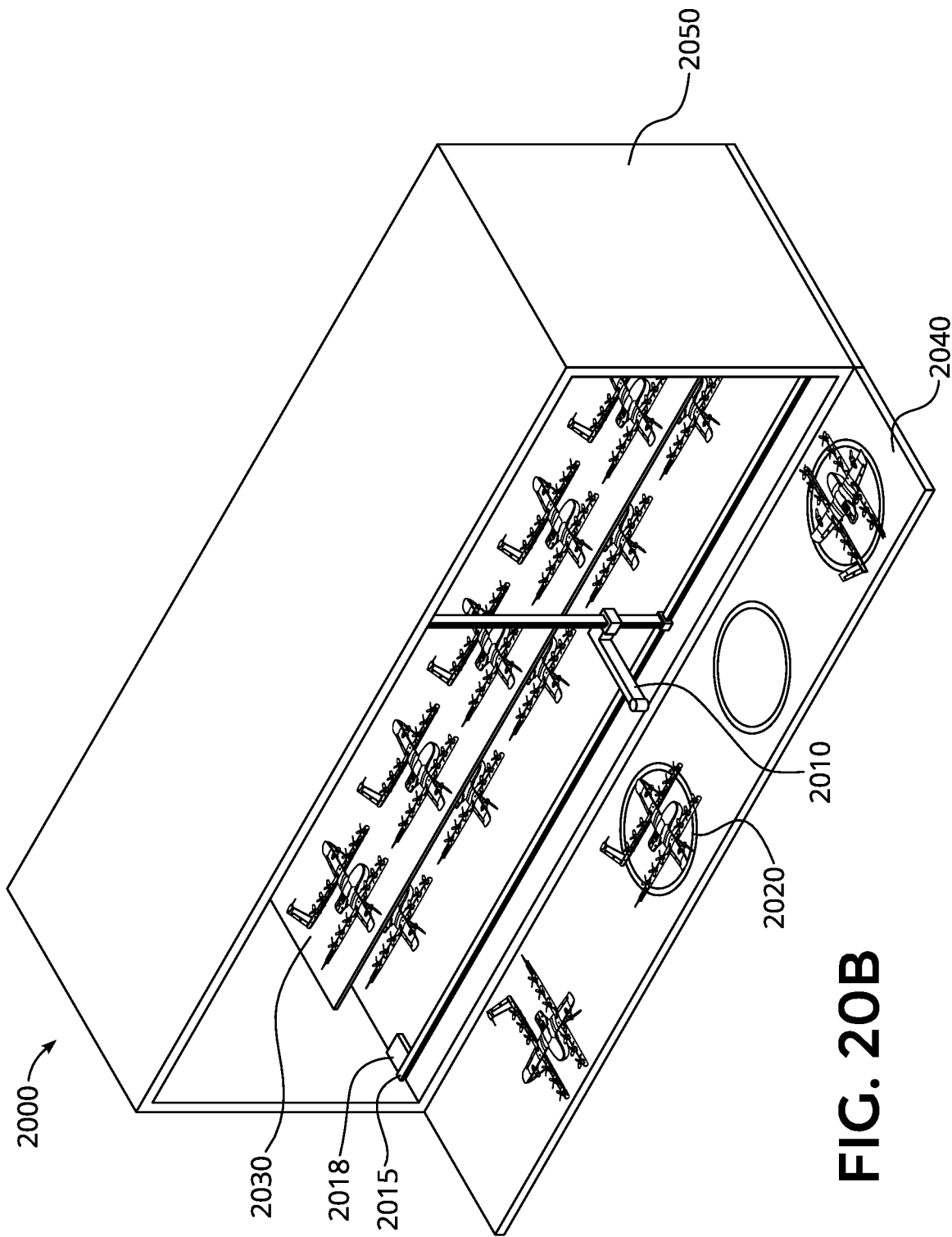

FIGS. 20A and 20B illustrate systems for automated aircraft handling and storage, in accordance with embodiments of the disclosure. FIG. 20A illustrates UAVs may land on the rectangular pads. Then robotic arms may be used to pick up the UAVs and put them in high-density charging and/or storage. Similarly, when an UAV is ready to complete a mission, the robotic arm may be used to place the UAV on the landing pad from storage shelves. After the robotic arm disengages from the UAV, the UAV may take off and complete its mission. The robotic arms may be coupled to a computer system, and move their position according to the takeoff and landing patterns of the UAVs. For example, incoming UAVs may communicate with the computer system controlling the robotic arms, to inform the arms to move out of the way of an incoming UAV, or to take an UAV out of its storage shelf because a mission was requested.

FIG. 20B also illustrates a system 2000 for UAV handling and storage, in accordance with an embodiment of the disclosure. The illustrated embodiment of system 2000 includes a storage body 2050, storage racks 2030, a robotic arm 2010 on a track 2015, a surface 2040 with landing pads 2020, and a controller 2018.

The robotic arm 2010 is controlled by the controller 2018. The controller 2018 may be a computer, CPU, processor, or other control circuitry. The controller 2018 controls the robotic arm 2010 to move the UAVs from a landing pad 2020 to the storage racks 2030 and from the storage racks 2030 to a landing pad 2020.

The storage body 2050 may be a framed box about the size of a storage container and capable of being loaded on a semi-truck trailer, or may be mounted to a vehicle. The surface 2040 may be a slat capable of folding up onto the open side of the storage body 2050 for transportation.

In some embodiments, there are separate landing and takeoff areas on the surface 2040 and similarly separate landing pads 2020 for landing and takeoff. In some example embodiments, the robotic arm 2010 may be fixed or move along the track 2015. In the depicted example the robotic arm 2010 is attached to the storage body 2050, and the arm can traverse vertically along a vertical beam of the robotic arm and also horizontally on the track 2015 to move in the x/y plane. This movement functionality allows the arm to place/remove the UAVs from their designated storage area in the storage body 2050. Although not shown, system 2000 may include navigational aids 407*a-c* similar to those described above to guide the UAVs to the landing pads 2020.

The storage racks 2030 may include charging circuitry 409 (not shown here) and mounts for securing the UAVs for transport while stored in the storage racks 2030.

Figure 21:
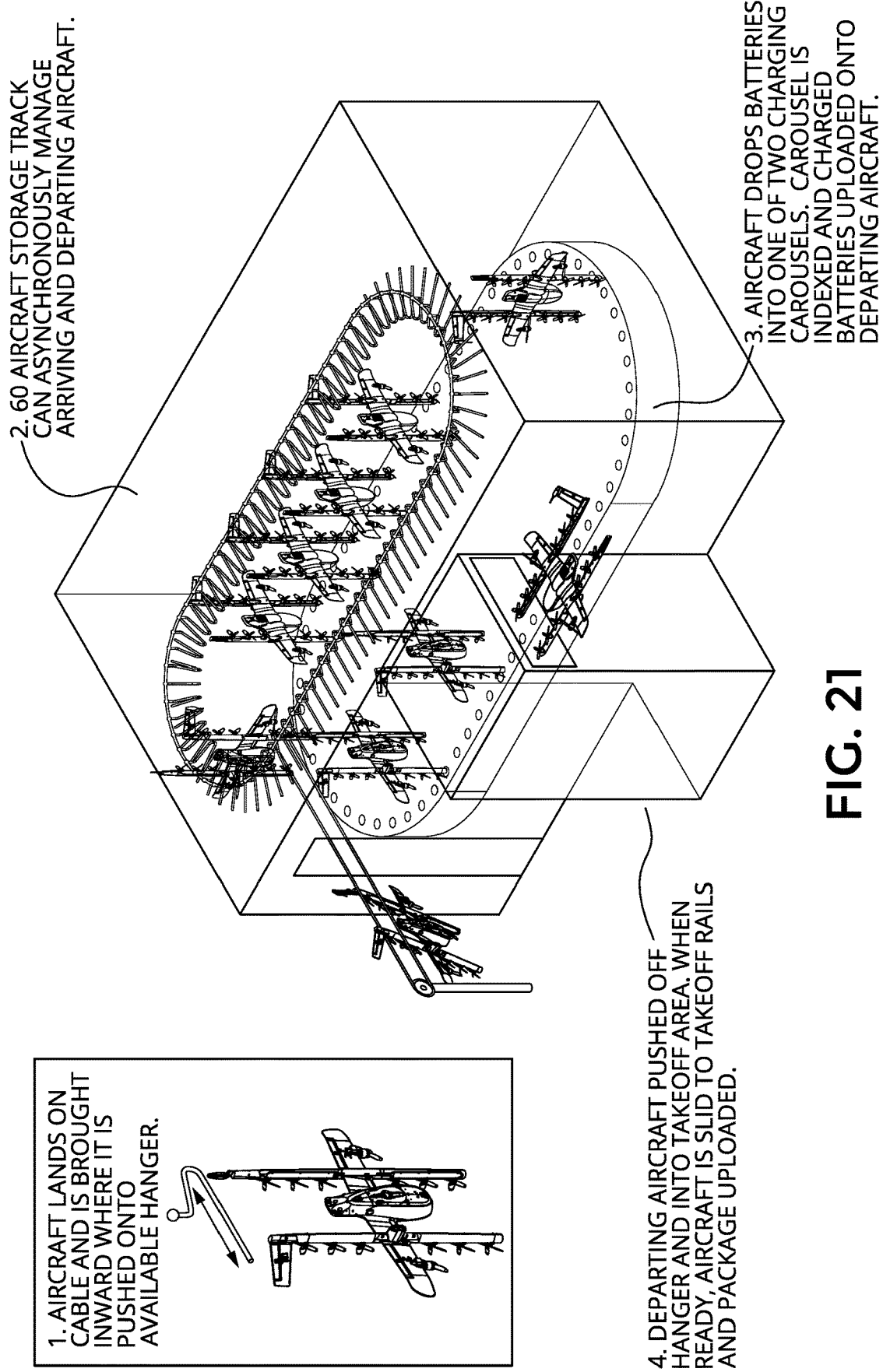
FIG. 21 illustrates a high-density wire charging housing, in accordance with an embodiment of the disclosure.

FIG. 21 illustrates a high-density wire charging housing, in accordance with an embodiment of the disclosure. In the depicted example, UAVs land on a cable, and are pushed onto an available hanger within the housing structure. The UAVs are hung like clothes on hangers. In the depicted embodiment 60, aircraft arriving and departing can be managed. The aircraft may be moved within the housing structure along a track similar to a clothes rack at a dry-cleaners. In the depicted embodiment, the UAVs drop their batteries into one of two charging carousels. The charging carousel is indexed and charged batteries are uploaded into departing aircraft. Departing UAVs enter a location within the housing structure where they are pushed off of the hanger and into a takeoff area. When ready, the UAV is slid off of the rails and a package is uploaded.

Figure 22B:
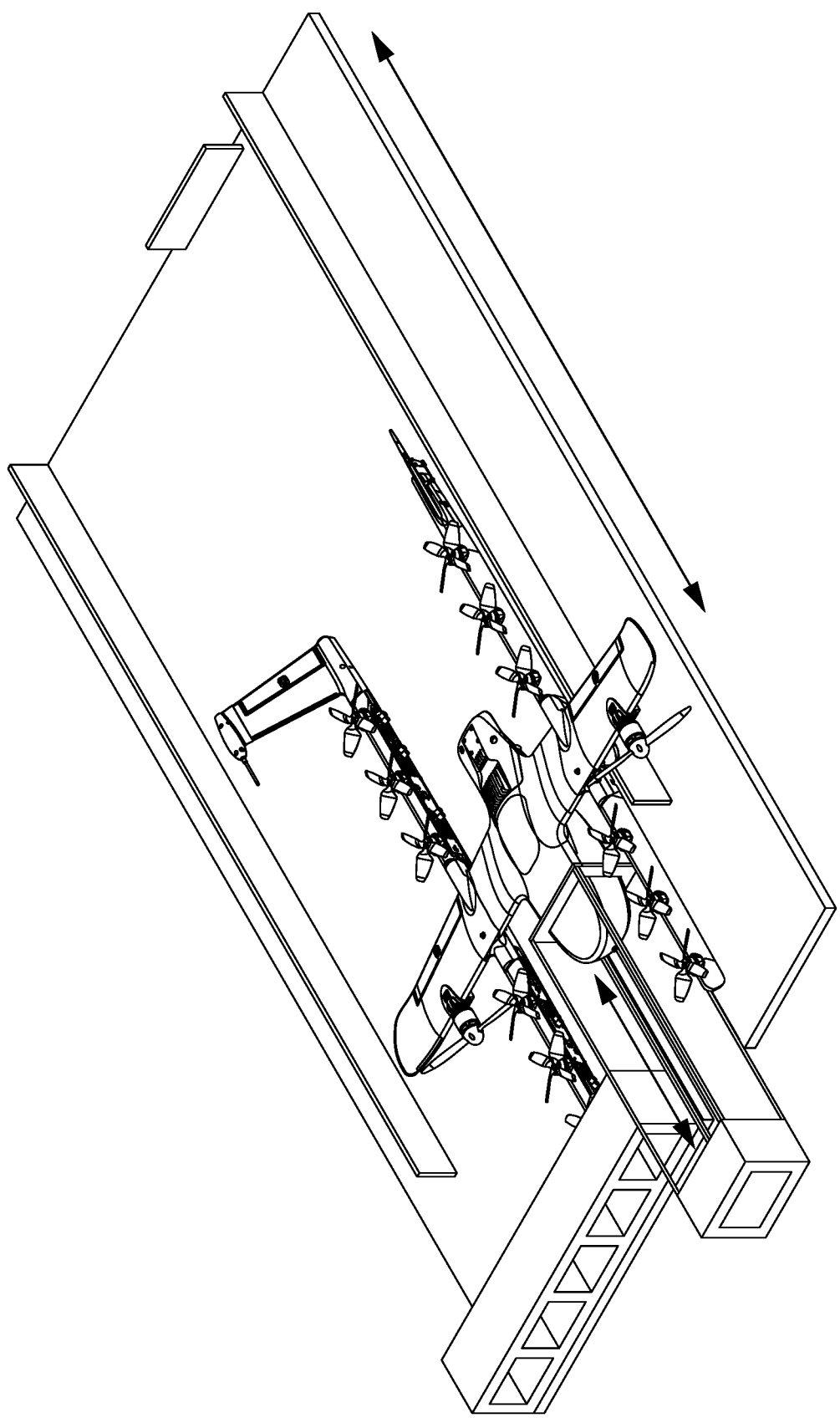

FIGS. 22A and 22B illustrate a housing with slide-out takeoff and landing racks, in accordance with an embodiment of the disclosure. In one embodiment, individual racks slide-out independently (e.g., each rack housing an aircraft slides in and out individually). It is appreciated that the racks may have UAV charging functionality. Their sliding may occur manually (e.g., when an operator wants to access an UAV) and/or automatically (e.g., when an UAV needs to take off or land). In some embodiments, all of the racks may slide-out at once to expose all of the aircraft. When all of the racks slide-out, the housing structure may be terraced (e.g., similar to bleacher seats) so all UAVs may take off or land at once (e.g., in high volume situations).

Figure 23A:
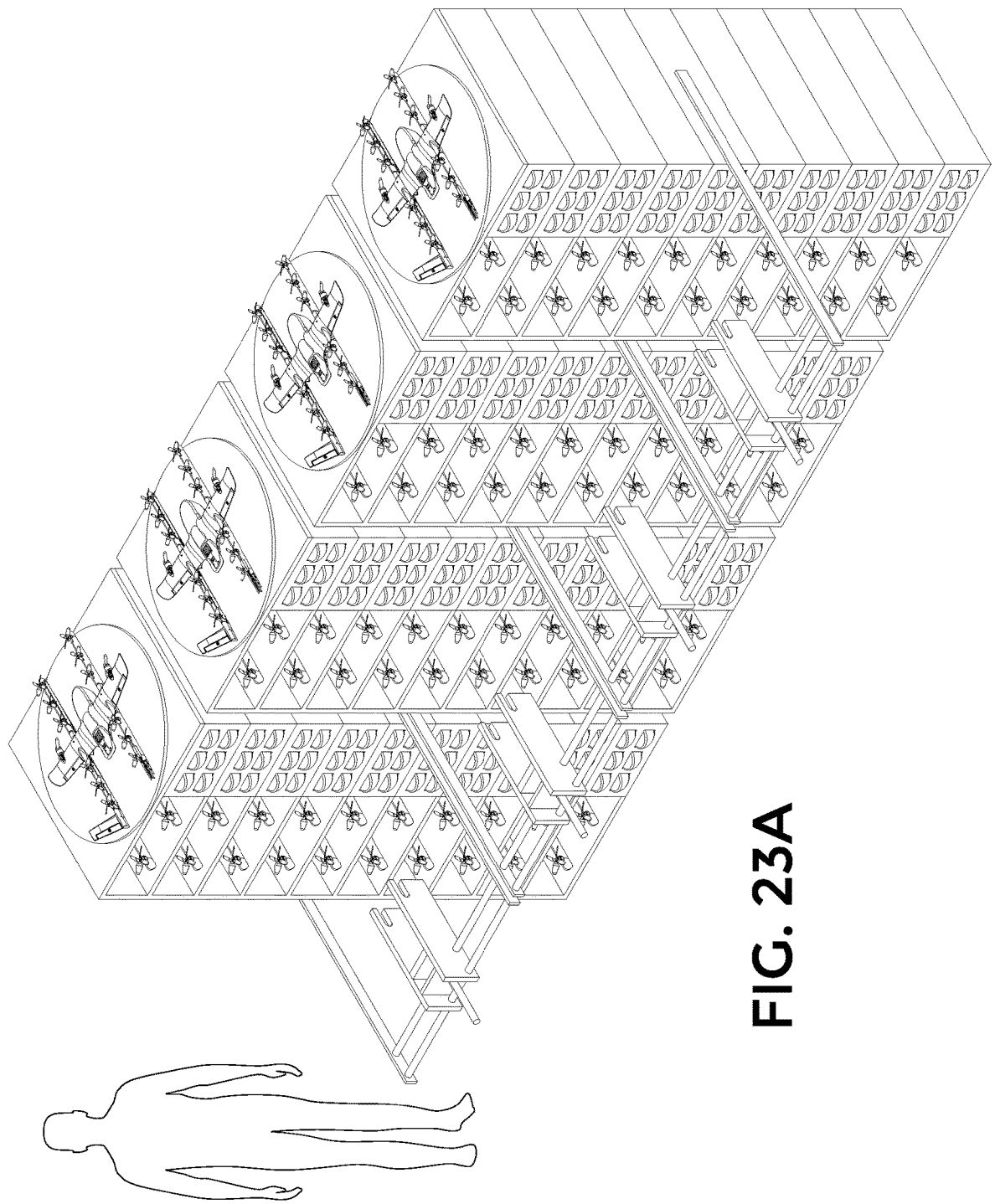
FIGS. 23A and 23B illustrate a housing structure with a turntable, in accordance with an embodiment of the disclosure.
Figure 23B:
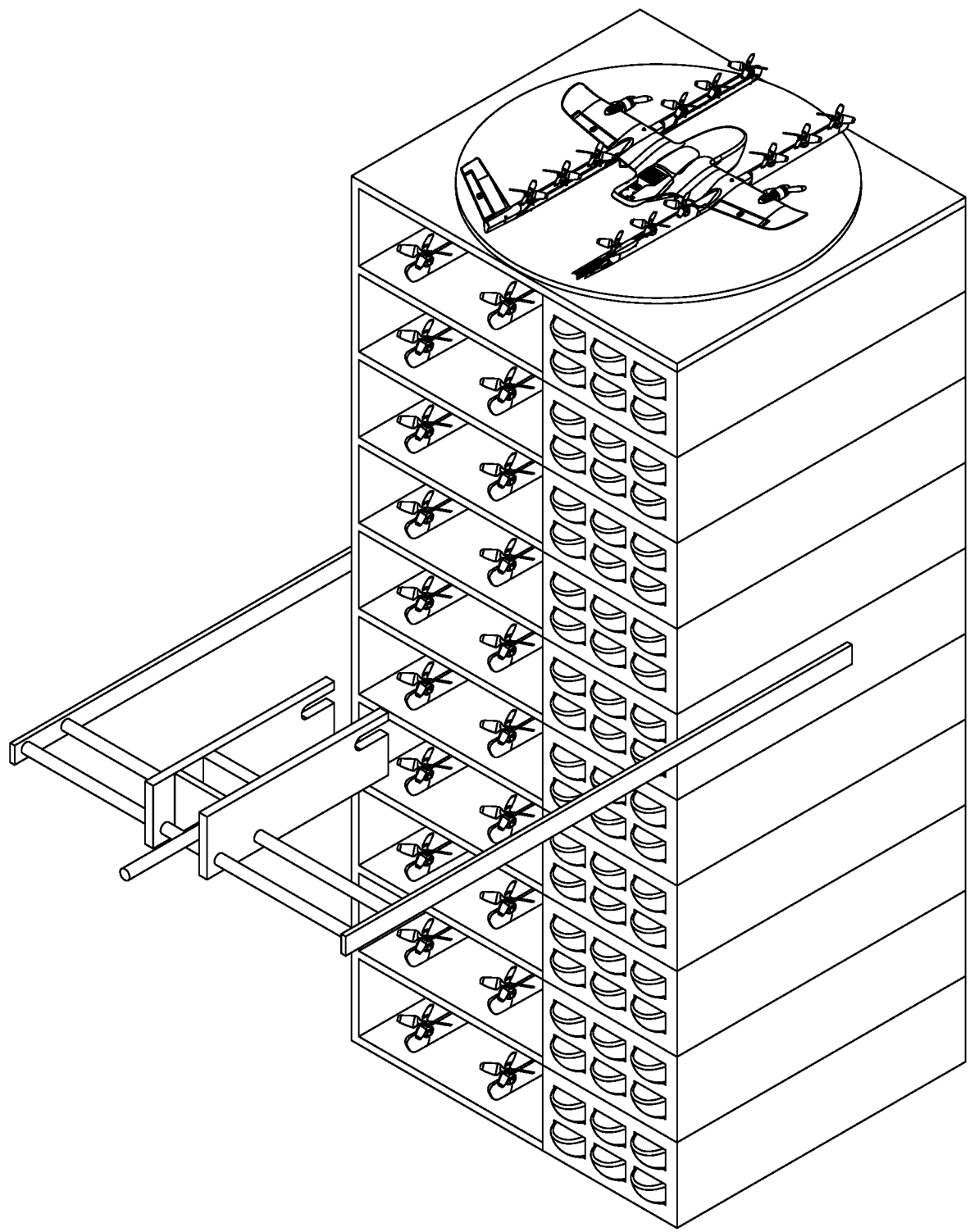

FIGS. 23A and 23B illustrate a housing structure with a turntable and gantry, in accordance with an embodiment of the disclosure. In the depicted embodiment, the UAVs may land on the top of the housing structure. The UAVs may be in any number of orientations due to landing conditions (e.g., wind blowing the UAVs off course). The turntable may be coupled to logic to turn the aircraft to a positon so it can be picked up by a mechanical arm/gantry coupled to the housing structure, and the mechanical arm puts the UAV in the proper slot for charging and/or storage. Similarly, when the UAV needs to take off, the arm may be sent instructions to pick up the aircraft and a battery pack and put it in a takeoff position on the turntable on top of the housing structure. The arm may be coupled to any number of actuators, sensors, and computer systems to enable this functionality.

FIGS. 24A and 24B illustrate a takeoff and landing pad with manual battery swap, in accordance with an embodiment of the disclosure. In the depicted embodiment, an UAV lands on the roof of a structure and a worker in the structure supplies the UAV with a package and additional power (e.g., battery swap). As shown, the UAV may land on tracks or a conveyor belt, which move the UAV across the top of the structure to allow the worker to attach a parcel and change the battery or perform other maintenance.

Figure 25:
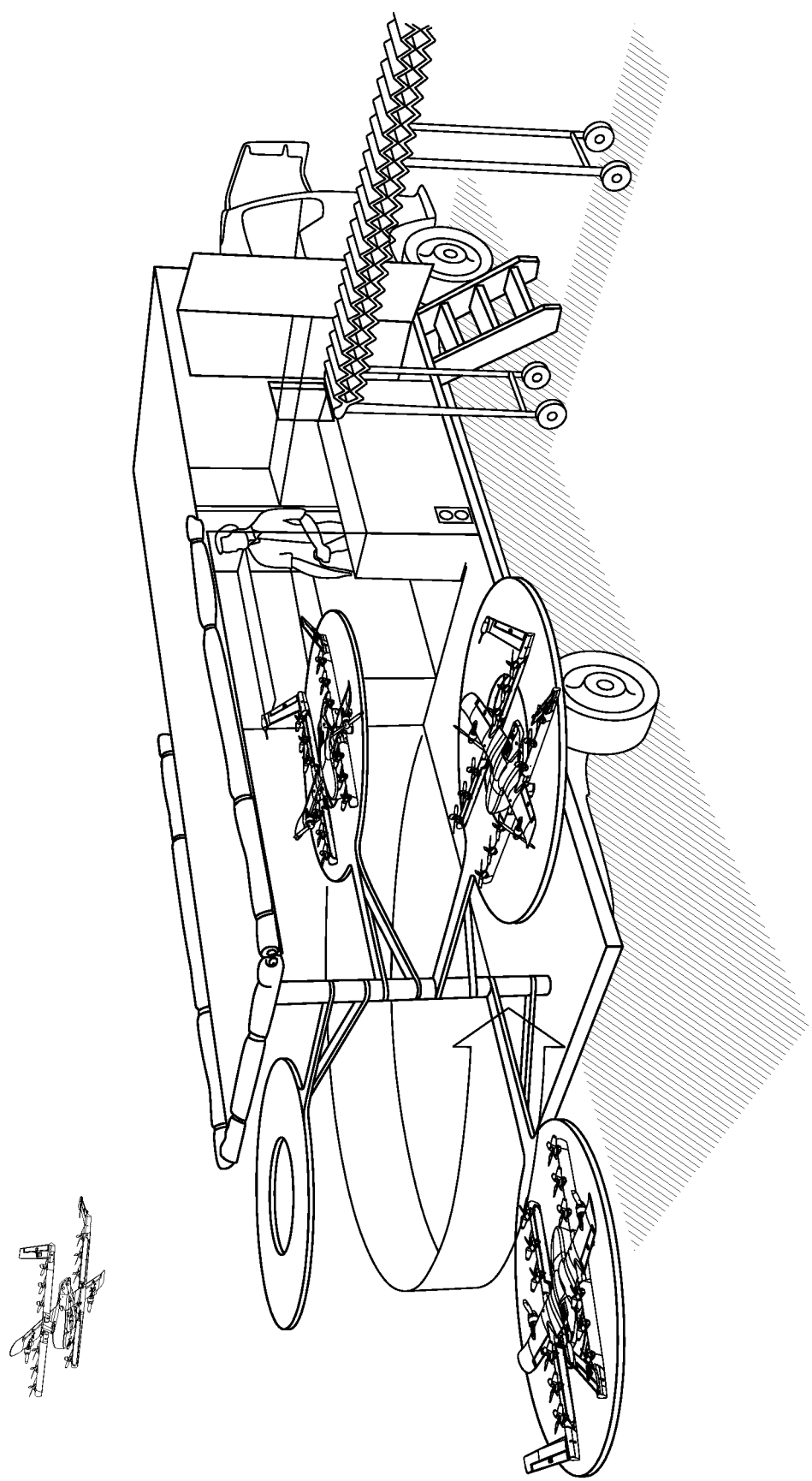
FIG. 25 illustrates a mobile charging station with swing-out landing pads, in accordance with an embodiment of the disclosure.

FIG. 25 illustrates a mobile charging station with swing-out landing pads, in accordance with an embodiment of the disclosure. The depicted example shows a spindle with a plurality of landing pads attached to the spindle, and the landing pads are coupled to the spindle to swing inward towards the cab of the truck. In the depicted embodiment, part of the truck has been converted to include an operator system. The operator may attach/remove batteries and packages from the UAVs. UAVs may land on the landing pads when the landing pad is extended away from the cab of the truck. Once the UAV is landed and secured, the landing pads may be rotated in towards the truck to receive a new package. When the UAV is ready to be deployed, it may once again be rotated out away from the truck cab.

Figure 26C:
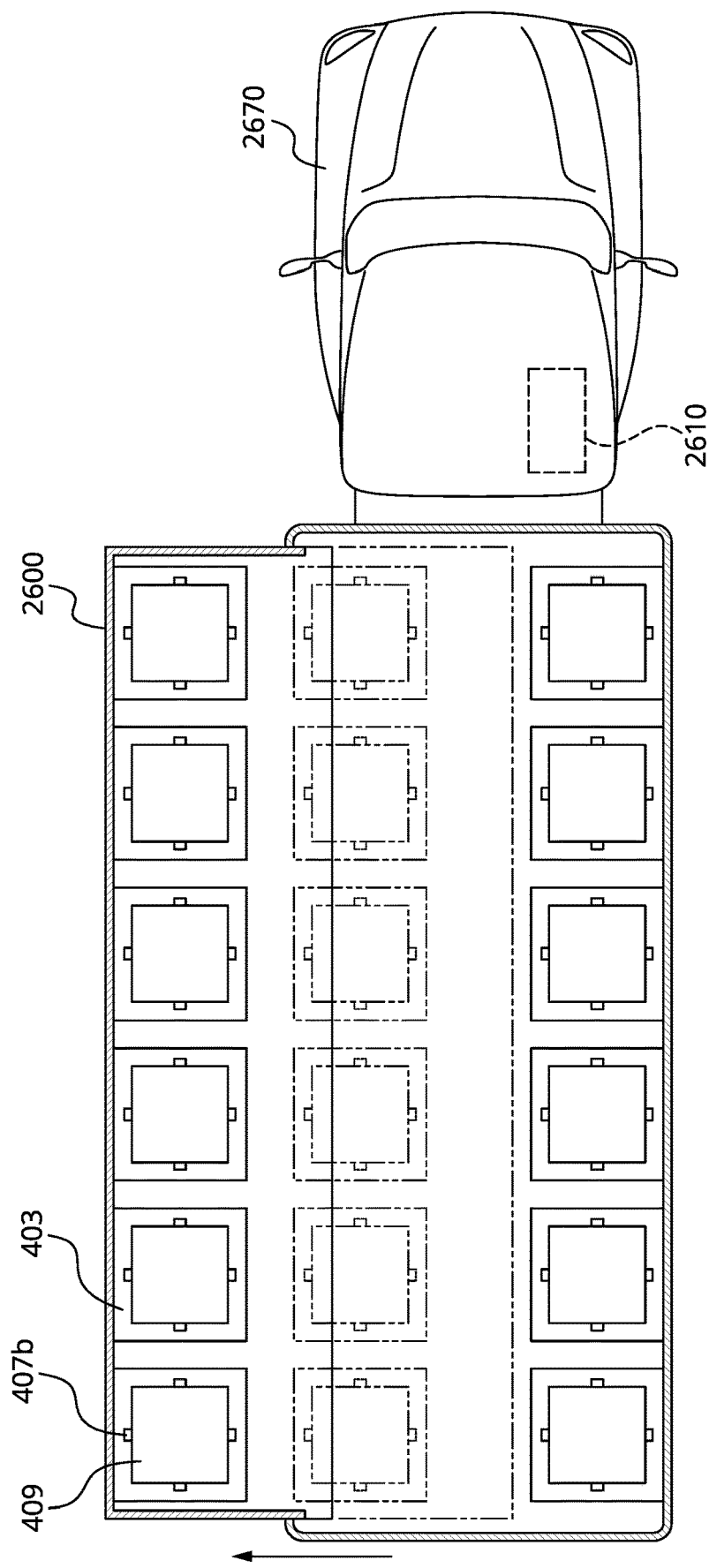

FIGS. 26A-26E illustrate mobile charging stations, in accordance with embodiments of the disclosure. In particular, FIGS. 26A and 26B illustrate an extendable, mobile charging station 2600, in accordance with an embodiment of the disclosure. The extendable, mobile charging station 2600 includes a main body 2640 and an extendable portion 2645. The main body 2640 and extendable portion 2645 may be mounted on a vehicle 2670 such as a trailer of a semi-truck or on any type of vehicle. The main body 2640 and extendable portion 2645 may be made of steel, aluminum, thermal plastic or otherwise. The extendable portion 2645 may move on tracks or other similar mechanisms.

The extendable, mobile charging station 2600 may also include an ingress point 2620 and first navigational aids 407*a* proximate to the ingress point 2620. The ingress point 2620 may be defined by the main body 2640 as shown in FIG. 26B. However, the ingress point may also be located at any point on the main body 2640 or extendable portion 2645, including the top, sides, or ends (illustrated).

When the vehicle 2670 is stopped, the extendable portion 2645 may extend from the main body 2640. The ingress point 2620 may be opened by the extendable portion 2645 extending, or may include a door or other mechanism for closing and opening the ingress point. The ingress point 2620 may be sized to allow UAVs to pass through the ingress point into or out of an interior of the extendable, mobile charging station 2600.

FIG. 26C is an aerial view of the extendable, mobile charging station 2600 with a view through its roof. As shown in FIG. 26C, the extendable, mobile charging station 2600 may also include a generator 2610 and a plurality of landing pads 403 within the interior of the extendable, mobile charging station 2600. The landing pads 403 may include charging circuitry 409 and second navigational aids 407*b* similar to those discussed with relation to other example embodiments of the invention.

FIG. 26D is a view of the extendable, mobile charging station 2600 from the rear of the vehicle looking through the rear wall of the extendable, mobile charging station 2600. The extendable, mobile charging station 2600 may include multiple levels of landing pads 403 such that some of the landing pads 403 are vertically above others of the landing pads 403. The landing pads 403 may include charging circuitry 409. The interior and exterior of the extendable, mobile charging station 2600 may include navigational aids 407*a-c* to guide the UAVs into the interior of the extendable, mobile charging station 2600 and to the landing pads 403.

Some of the landing pads 403 may move with the extendable portion 2645 when the extendable portion 2645 is extended. Thus, an aisle for the UAVs to move through may be opened up between the landing pads 403 when the extendable portion 2645 is extended. Restated, the landing pads 403 attached to the extendable portion 2645 may be too close to the landing pads connected to the main body 2640 for the UAVs to pass between when the extendable portion 2645 is not extended. By moving the extendable portion 2645 to the extended position, the landing pads 403 separate such that the UAVs may pass between the landing pads 403 to descend or ascend to a different level of landing pads 403.

Figure 26E:
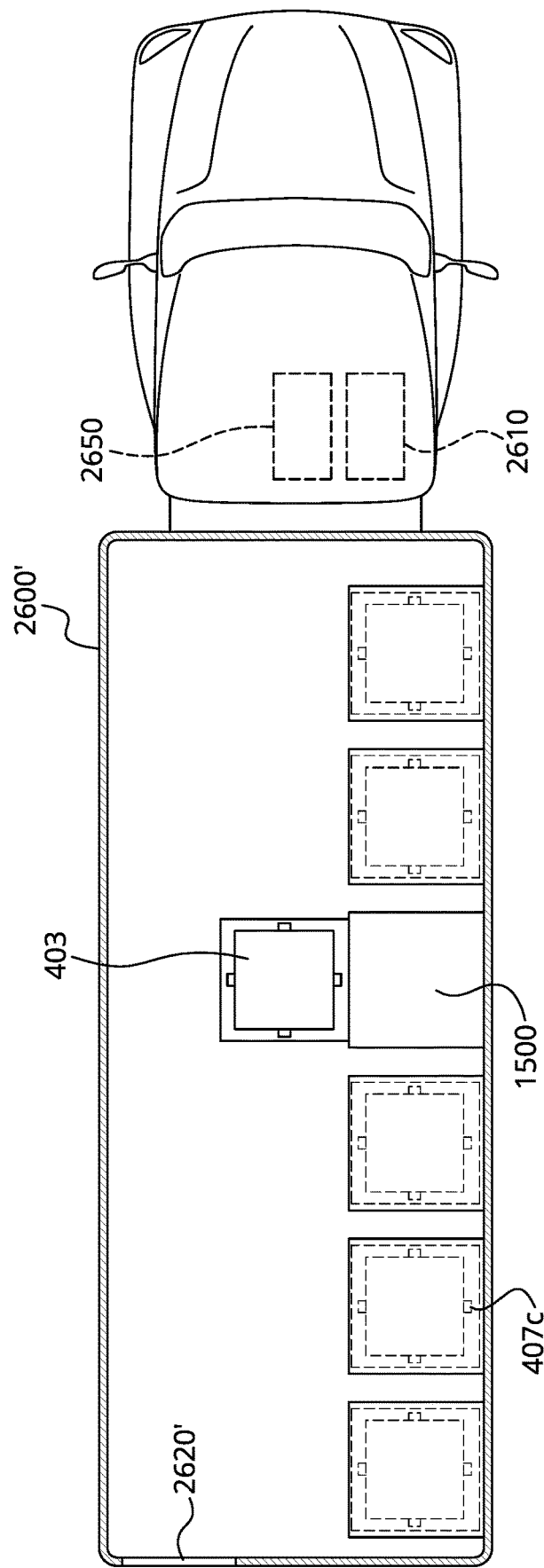

FIG. 26E is an alternative embodiment of the mobile charging station 2600'. The mobile charging station 2600' may not be extendable and may include modular housing structures 1500 (or 1501, 1502, 1503) as depicted in FIGS. The UAVs may enter and leave an interior of the mobile charging station 2600' by an ingress point 2620'. The mobile charging station 2600' may also include a generator 2610 and a communication controller 2650 for communicating with the UAVs either directly or indirectly. The communication controller 2650 may communicate with the communication controllers 1560 in the modular housing structures 1500 to control the storage of the UAVs.

It is appreciated that all of the mobile embodiments depicted herein may include a computer, generator 2610 (or other power source), and communication controller 2650 to communicate with the UAVs, perform mechanical operations, or the like.

Figure 27:
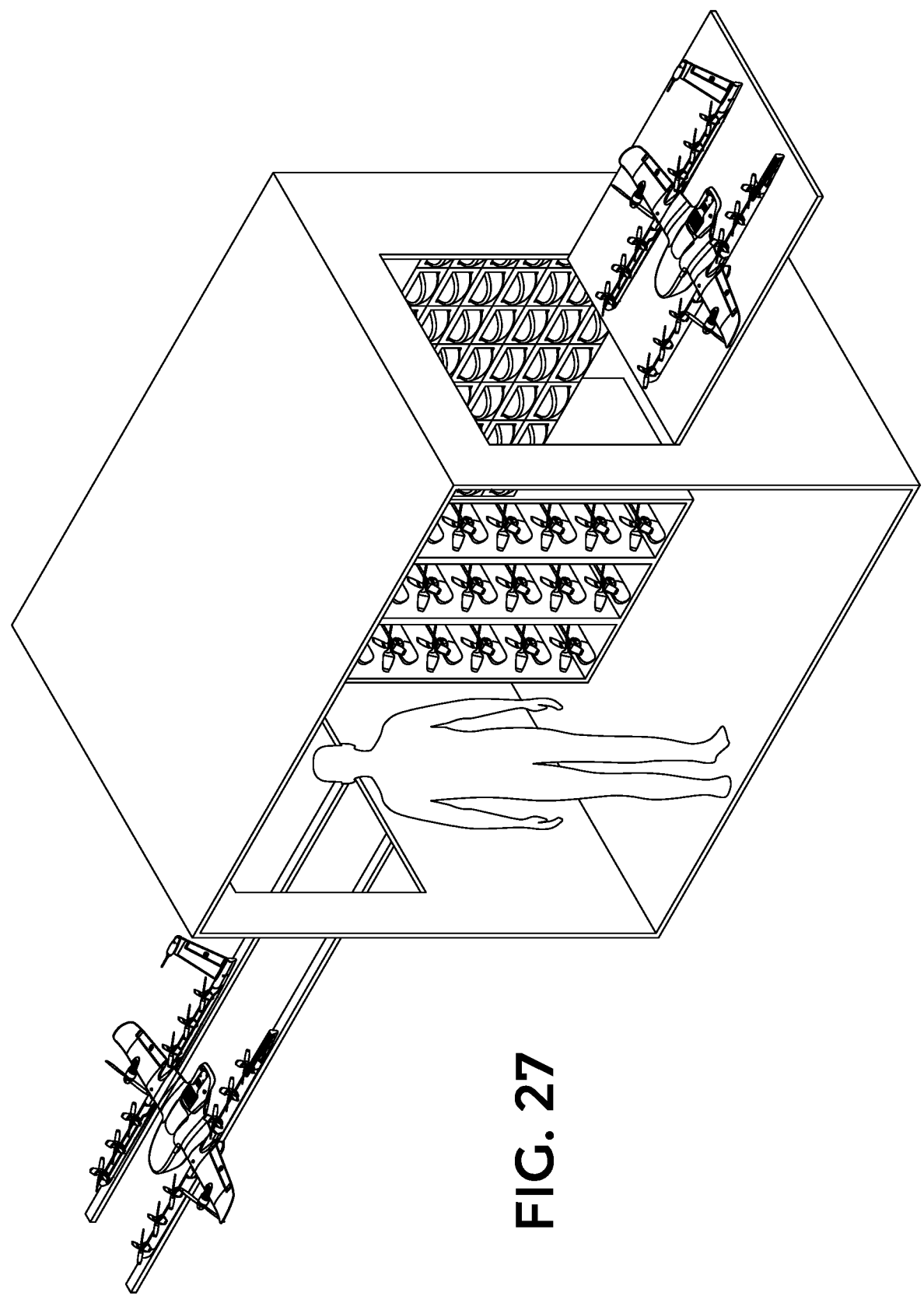
FIG. 27 illustrates a housing structure with manual battery swap and storage, in accordance with an embodiment of the disclosure.

FIG. 27 illustrates a housing structure with manual battery swap and storage, in accordance with an embodiment of the disclosure. As depicted, the housing structure includes battery charging stations and UAVS storage. In the depicted embodiment, housing structure is manned. The UAVS may fly up to one open window and the operator replaces the battery, attaches a package, or takes the UAVs in for service, or the like. When an UAV is launched, the operator may put the UAV on a launch pad out a second window.

FIG. 28 illustrates a housing structure with partially automated battery swap and storage, in accordance with an embodiment of the disclosure. In the depicted example, part of the UAVs throughput process is automated. The UAVs may land on wires or bars, which convey the UAVs into the kiosk. An operator may change batteries or put UAVs on a charging rack or remove them for maintenance. The operator may load a package and put the aircraft onto a wire where it is conveyed via pulleys to a takeoff area (left). The aircraft can takeoff directly from the wires, once the operator enters an "all clear" signal into a computer system (which may include pressing a button) to indicate the operator, and other objects, are clear of the UAVs.

Figure 29A:
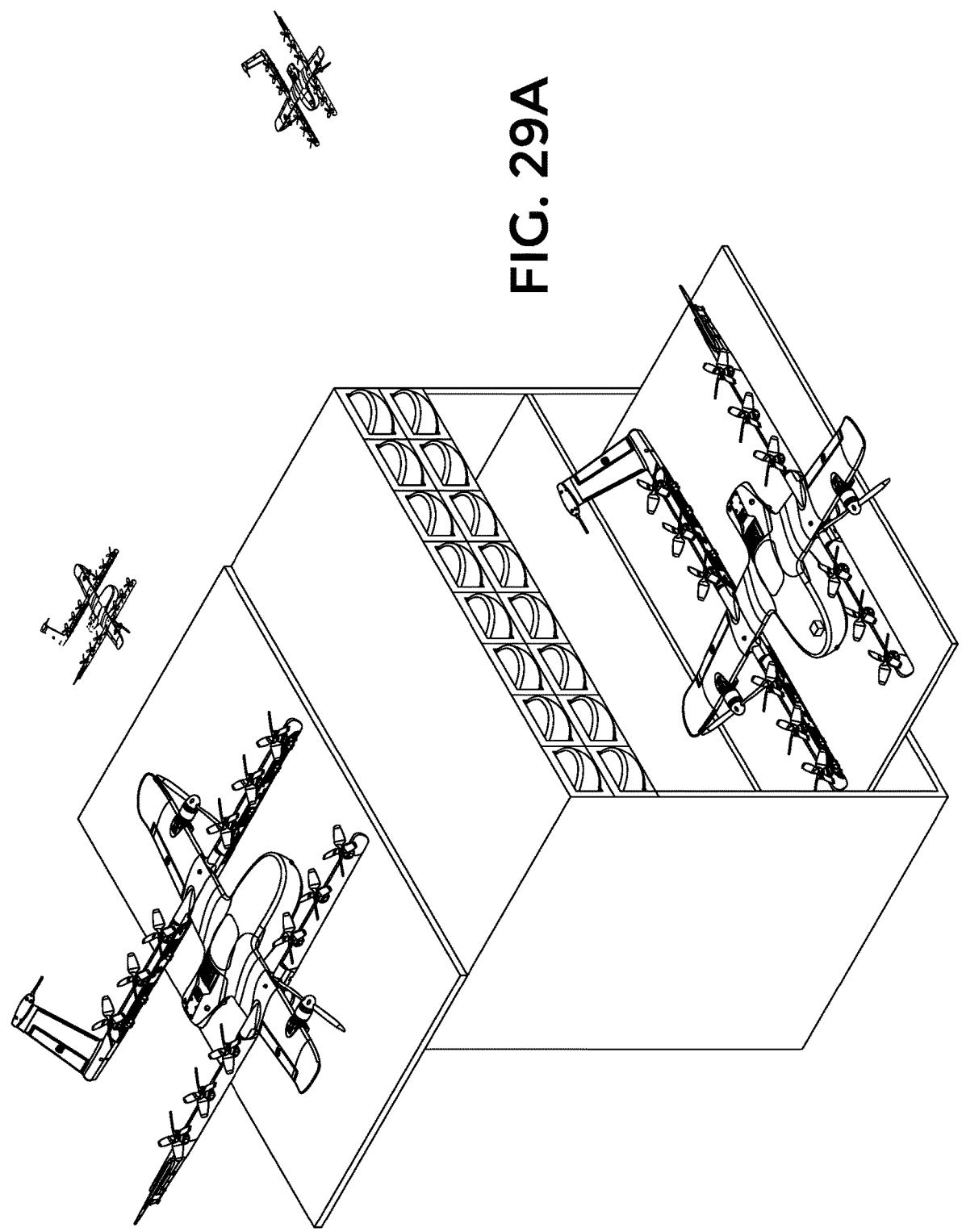
FIGS. 29A and 29B illustrate slide-out cabinets for manual battery swap and storage, in accordance with an embodiment of the disclosure.
Figure 29B:
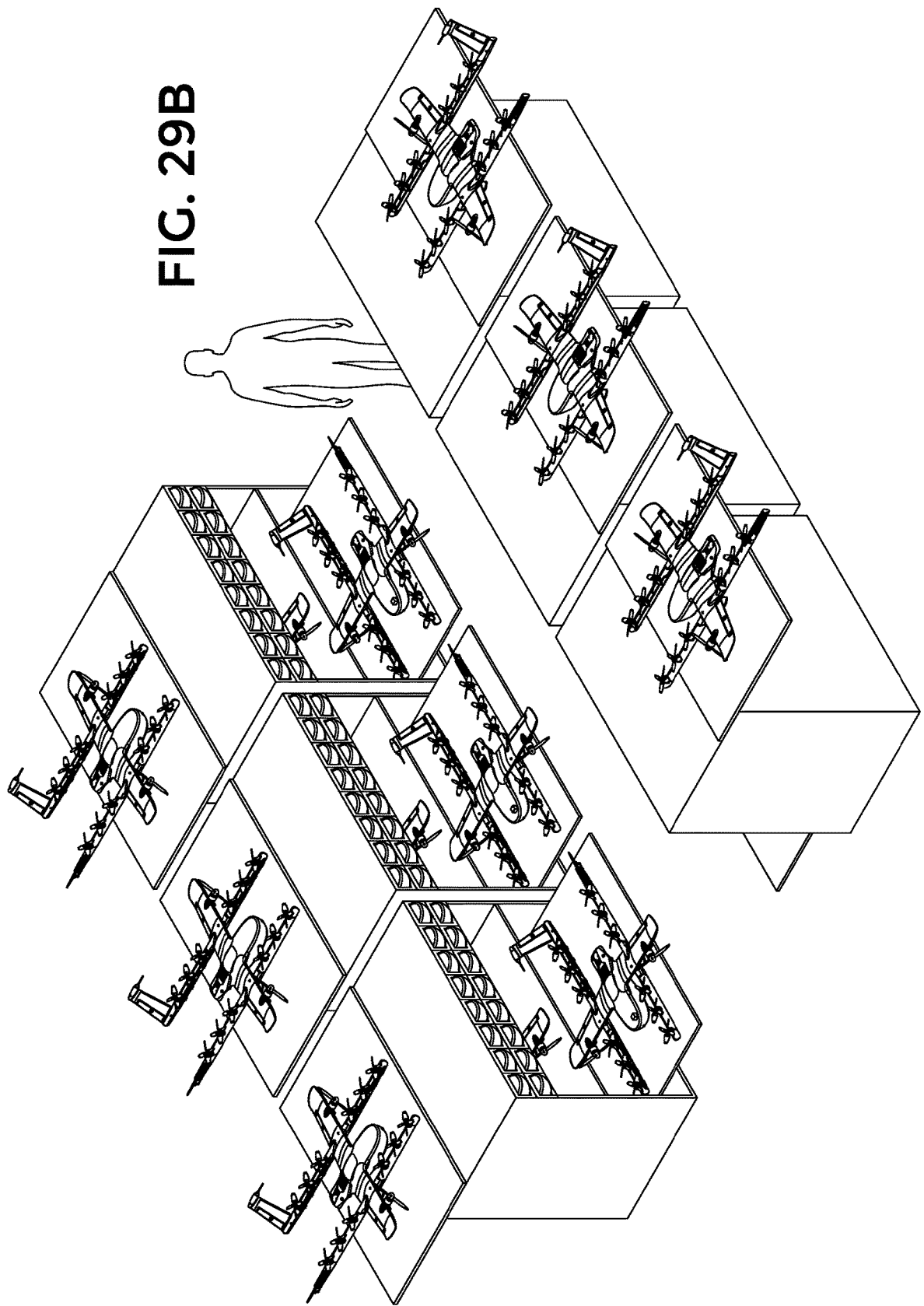

FIGS. 29A and 29B illustrate slide-out cabinets for manual battery swap and storage, in accordance with an embodiment of the disclosure. In the depicted example, a landing pad can be extended outward from the top of the cabinet. The UAVs can then be manually or automatically placed from the top into storage in the interior. As shown, the storage also includes a plurality of batteries that can be changed in and out of the UAVs. The housing structure depicted may be plugged into a power source to charge the batteries and the UAVs contained within.

FIG. 30A-C illustrates another example of slide-out cabinets for manual battery swap and storage, in accordance with an embodiment of the disclosure. The housing depicted in FIG. 30A is similar to the housing depicted in FIG. 29A but the slide-out landing pad configuration is different. Landing pads extend out of the backs of the cabinets, which slide into the cabinets for storage. The sliding may be manual or automatic.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A modular housing structure for housing a plurality of unmanned aerial vehicles (UAVs), comprising:
   a plurality of modular housing sections configured to hold a plurality of UAVs, the plurality of modular housing sections vertically stackable, each one of the modular housing sections including:
      a landing pad adapted to land a given UAV of the UAVs, the landing pad mechanically actuated to extend from an interior of a given modular housing section to receive and deploy the given UAV and withdraw into the interior; and
      charging electronics disposed in or on the landing pad and configured to charge the given UAV,
   wherein the modular housing structure supports a scalable number of the UAVs based on a number of the modular housing sections vertically stacked on each other at a time,
   wherein one of the modular housing sections includes first and second landing pads that are mechanically connected to each other and share a track that actuates the first and second landing pads together by sliding the first landing pad out a first side of the modular housing structure when deploying the first landing pad and sliding the second landing pad out a second side of the modular housing structure, opposite the first side, when deploying the second landing pad.

2. The modular housing structure of claim 1, wherein each of the modular housing sections further comprises:
   a plurality of navigational aids disposed about the landing pad to assist the UAVs when landing on the landing pad.

3. The modular housing structure of claim 1, further comprising:
   a climate controller disposed within the modular housing structure, the climate controller including a fan to force air around the UAVs stored within the plurality of modular housing sections.

4. The modular housing structure of claim 3, wherein the modular housing sections each include airflow openings to allow the air to flow between the modular housing sections from the fan.

5. The modular housing structure of claim 4, wherein the airflow openings are disposed peripherally around the landing pad of each of the modular housing sections.

6. The modular housing structure of claim 4, wherein the landing pad includes a grate or a mesh and the airflow openings are defined by the grate or the mesh in the landing pad.

7. A modular housing structure for housing a plurality of unmanned aerial vehicles (UAVs), comprising:
  a plurality of modular housing sections configured to hold a plurality of UAVs, the plurality of modular housing sections vertically stackable, each one of the modular housing sections including:
    a landing pad adapted to land a given UAV of the UAVs, the landing pad mechanically actuated to extend from an interior of a given modular housing section to receive and deploy the given UAV and withdraw into the interior; and
    charging electronics configured to charge the given UAV,
  wherein the modular housing structure supports a scalable number of the UAVs based on a number of the modular housing sections vertically stacked on each other at a time,
  wherein one of the modular housing sections includes first and second landing pads that are mechanically connected to each other and share a track that actuates the first and second landing pads together by sliding the first landing pad out a first side of the modular housing structure when deploying the first landing pad and sliding the second landing pad out a second side of the modular housing structure, opposite the first side, when deploying the second landing pad.

* * * * *